US007998635B2

(12) United States Patent
Akikusa et al.

(10) Patent No.: US 7,998,635 B2
(45) Date of Patent: Aug. 16, 2011

(54) FUEL CELL STRUCTURE FOR GAS SUPPLY

(75) Inventors: Jun Akikusa, Chiyoda-ku (JP); Koji Hoshino, Chiyoda-ku (JP)

(73) Assignee: Mitsubishi Materials Corporation, Tokyo (JP)

( * ) Notice: Subject to any disclaimer, the term of this patent is extended or adjusted under 35 U.S.C. 154(b) by 1285 days.

(21) Appl. No.: 10/297,320

(22) PCT Filed: Dec. 26, 2001

(86) PCT No.: PCT/JP01/11436
§ 371 (c)(1),
(2), (4) Date: Dec. 5, 2002

(87) PCT Pub. No.: WO02/054519
PCT Pub. Date: Jul. 11, 2002

(65) Prior Publication Data
US 2003/0134174 A1    Jul. 17, 2003

(30) Foreign Application Priority Data

Dec. 28, 2000 (JP) ................. 2000-402474
Mar. 16, 2001 (JP) ................. 2001-75145
Mar. 16, 2001 (JP) ................. 2001-75147
Mar. 16, 2001 (JP) ................. 2001-75148
Nov. 27, 2001 (JP) ................. 2001-360333
Nov. 27, 2001 (JP) ................. 2001-360334

(51) Int. Cl.
*H01M 8/24* (2006.01)
*H01M 2/18* (2006.01)
(52) U.S. Cl. ......... 429/457; 429/514; 429/479; 429/423

(58) Field of Classification Search ............... 429/12–52
See application file for complete search history.

(56) References Cited

U.S. PATENT DOCUMENTS

| 3,982,962 | A | * | 9/1976 | Bloomfield | 429/19 |
| 4,808,491 | A | * | 2/1989 | Reichner | 429/13 |
| 4,910,100 | A | * | 3/1990 | Nakanishi et al. | 429/32 |
| 5,338,621 | A | * | 8/1994 | Bossel | 429/18 |
| 5,856,035 | A | * | 1/1999 | Khandkar et al. | 429/32 |
| 5,972,530 | A | * | 10/1999 | Shelekhin et al. | 429/26 |
| 6,444,340 | B1 | * | 9/2002 | Jaffrey | 429/30 |
| 6,686,080 | B2 | * | 2/2004 | Farkash et al. | 429/26 |

(Continued)

FOREIGN PATENT DOCUMENTS
EP           519369        12/1992
(Continued)

*Primary Examiner* — Keith Walker
(74) *Attorney, Agent, or Firm* — Wenderoth, Lind & Ponack, L.L.P.

(57) ABSTRACT

A conductive and tabular separator is inserted into the gap between the fuel electrode layer of an i-th power generating cell and the oxidizer electrode layer of an (i+1)-th power generating cell adjacent to the fuel electrode layer. A fuel supply passage is so formed on one face of each of these separators that a fuel gas flows radially from almost the center of the fuel electrode layer to its edge. An oxidizer supply passage is so formed on the other face that an oxidizer gas outgoes almost uniformly in a shower toward the oxidizer polar layer. Thus, all of the surfaces of the power generating cells contribute to power generation to increase the frequency of collision between the fuel gas and the fuel electrode layer and that between the oxidizer gas and the oxidizer electrode layer, and to improve the generation efficiency.

23 Claims, 18 Drawing Sheets

U.S. PATENT DOCUMENTS

2002/0127443 A1* 9/2002 Breault .......................... 429/13
2003/0031902 A1* 2/2003 Balasubramanian et al. .. 429/22

FOREIGN PATENT DOCUMENTS

| | | |
|---|---|---|
| JP | 63-168972 | 7/1988 |
| JP | 3-274674 | 12/1991 |
| JP | 5-62698 | 3/1993 |
| JP | 6-196198 | 7/1994 |
| JP | 6-290804 | 10/1994 |
| JP | 7-153469 | 6/1995 |
| JP | 9-45347 | 2/1997 |
| JP | 11-16581 | 1/1999 |
| JP | 2000-3715 | 1/2000 |
| JP | 2000003715 A * | 1/2000 |
| JP | 2000-323154 | 11/2000 |

* cited by examiner

FUEL CELL STRUCTURE FOR GAS SUPPLY

BACKGROUND OF THE INVENTION

1. Technical Field of the Invention

The present invention relates to a solid oxide fuel cell module including a power generating cell constructed by sandwiching an electrolyte layer between a fuel electrode layer and an oxidant electrode layer.

Moreover, in a fuel cell including a power generating cell constructed by sandwiching a solid electrolyte layer between a fuel electrode layer and an oxidant electrode layer, the invention relates to a structure for supplying fuel gas to the fuel electrode layer and supplying oxidant gas to the oxidant electrode layer.

Moreover, the invention relates to a structure of a distributor for supplying the fuel gas and the oxidant gas to a power generating cell of a fuel cell module.

2. Description of Background Art

Conventionally, as this kind of fuel cell, a solid electrolyte fuel cell disclosed in Japanese Patent Laid-Open No. 13088/1994 is known. The publication discloses that in the solid electrolyte fuel cell, an aggregate of a laminate composed of an anode, a solid electrolyte body, and a cathode and a separator provided with a reaction gas supply pipe are alternately laminated, a groove along which fuel gas flows is formed on one surface of the separator, and a groove along which oxidant gas flows is formed on the other surface of the separator. In this fuel cell, the reaction gas supply pipe is composed of a fuel gas supply pipe and an oxidant supply pipe, at least part of which is made of a ceramic pipe such as an alumina porcelain pipe. A structure is adopted such that the fuel gas supply pipe is connected to a side surface of the separator and communicates with the groove along which the fuel gas flows, and the oxidant supply pipe is connected to a side surface of the separator and communicates with the groove along which the oxidant gas flows. Besides, the fuel gas supply pipe is connected to a fuel gas distributor made of ceramic, and the oxidant supply pipe is connected to an oxidant gas distributor made of ceramic.

In the solid oxide fuel cell constructed as stated above, since the reaction gas supply pipes are individually connected to the respective separators, a circular glass ring for sealing a circular gas manifold, which is conventionally formed for the aggregate and the separator, can be made unnecessary, and a quadrangular glass ring, which conventionally gas-seals the exterior between the aggregate and the separator, can be made unnecessary.

However, in the conventional solid electrolyte fuel cell disclosed in Japanese Patent Laid-Open No. 13088/1994, since a rib for guiding the reaction gas in a predetermined direction is formed in a ribbed porous base member of a separate plate, there has been a problem that a surface area of a power generating cell contributing to power generation is decreased by a contact area of the rib to the anode or the cathode, and power generation efficiency is lowered.

Besides, in the conventional solid electrolyte fuel cell disclosed in Japanese Patent Laid-Open No. 13088/1994, since the anode and the cathode are in contact with the ribbed porous substrate by only the rib, electron conductivity of the anode and the cathode with respect to the separate plate is low, and a reaction is apt to occur only in the vicinity of a portion where the anode and the cathode are in contact with the rib. That is, since the groove center portion between the ribs is not in contact with the anode and the cathode, electrons generated by the reaction disappear by electric resistance of the anode and the cathode before they reach the ribs, and there has also been a problem that it is difficult to make the reaction occur on the whole surface of the power generating cell.

Further, in the conventional solid electrolyte fuel cell disclosed in Japanese Patent Laid-Open No. 13088/1994, since part of or the whole of the reaction gas supply pipe is made of the relatively brittle ceramic pipe, the assembling operation must be performed carefully, so that an assembling operation time is increased, and there is a fear that the reaction gas supply pipe is damaged by thermal stress exerted on the reaction gas supply pipe by repetition of heat generation and cooling of the fuel cell.

An object in a first embodiment of the invention is therefore to provide a fuel cell module in which the whole surface of a power generating cell is made to contribute to the power generation so that power generation efficiency can be improved; to provide a fuel cell module in which oxidant gas is substantially uniformly made to flow to the whole of an oxidant electrode layer so that a power generating cell can be uniformly heated and cooled; to provide a fuel cell module in which the flow of fuel gas in a fuel electrode layer is controlled and a collision frequency between the fuel gas and the fuel electrode layer is increased, so that power generation efficiency can be improved; to provide a fuel cell module in which a heating-up time at start-up can be shortened, and damage of a power generating cell can be prevented by uniform temperature rising; to provide a fuel cell module in which fuel gas and oxidant gas are supplied to respective power generating cells at temperature suitable for power generation, so that power generation efficiency can be improved; to provide a fuel cell module in which one of or both of a fuel electrode current collecting body and an oxidant electrode current collecting body are joined to a separator made of stainless steel, an oxidant end plate, and a fuel end plate, and joined portions are welded to prevent oxidation of the joined portions, so that long electrical continuity between the separator, the oxidant end plate or the fuel end plate and the fuel electrode current collecting body or the oxidant electrode current collecting body can be obtained; and to provide a fuel cell module in which a reformer for reforming fuel gas is made unnecessary so that the number of parts can be decreased and miniaturization can be realized.

Besides, as the related art, there is disclosed a separator for a fuel cell formed into a shell structure in which the inside of a peripheral portion becomes hollow by integrally joining two thin separate plates each of which includes a center portion of a flat surface capable of receiving an electrode, and a peripheral portion bent to rise to one surface side (Japanese Patent Laid-Open No. 266776/1988). In this separator for the fuel cell, a supply and exhaust flow path hole of fuel gas and a supply and exhaust flow path hole of oxidizing gas are provided at the peripheral portions of the two separate plates. Besides, a structure is adopted such that the fuel gas flows to the flat surface of the center portion in the one separate plate, and the oxidizing gas flows to the flat surface of the center portion in the other separate plate. In the separator for the fuel cell constructed as stated above, the two separate plates are formed by press molding of thin plates, and these separate plates are integrated as one pair to form the separator, so that weight lightening can be realized. Besides, since the peripheral portion of the separator has the shell structure, mass production is easy, an error of an electrode size can be absorbed, and the sealing property of the fuel gas and the oxidizing gas can be improved.

However, since the separator for the fuel cell disclosed in Japanese Patent Laid-Open No. 266776/1988 has the shell structure having the hollow at the peripheral portion of the separator, there is a defect that the thickness of the separator becomes thick. An object of second and third embodiments of the invention is therefore to provide a structure for supplying gas to a fuel cell which can be made compact in a laminating direction of power generating cells by thinning a separator; and to provide a structure for supplying gas to a fuel cell in which fuel gas and oxidant gas supplied to a power generating cell can be controlled to have an optimum temperature for power generation.

Further, as the related art, there is disclosed a solid electrolyte fuel cell constituted by a base part in which a fuel electrode and an air electrode are provided on both surfaces of a solid electrolyte film, and a distributor is made of a material having the same composition as the solid electrolyte film, and a conductive part provided on a surface of the base part and made of a conductive material, wherein the solid electrolyte film is connected to an interconnector through the base part, and the air electrode and the fuel electrode are electrically connected to the interconnector through the conductive part (Japanese Patent Laid-Open No. 182680/1993).

In the solid electrolyte fuel cell constructed as stated above, since the base part of the distributor shows the same shrinkage behavior as the solid electrolyte film, separation of the distributor from the solid electrolyte film can be prevented against temperature rising/falling at the time of cosintering or operation, and warp of the distributor with respect to the solid electrolyte film can be prevented. Besides, since the same material as the material of the solid electrolyte film and mainly containing zirconia is used for the base part, it becomes an electric insulator. As a result, continuity between the front and back of the distributor is performed through the conduction part.

However, in the conventional solid electrolyte fuel cell, since the base part of the distributor which does not contribute to power generation is joined to the solid electrolyte film, there has been a defect that a surface area of the solid electrolyte film contributing to power generation is narrowed and power generation efficiency is lowered.

In order to solve this point, there is disclosed a solid electrolyte fuel cell in which an aggregate of a laminate composed of an anode, a solid electrolyte body, and a cathode and a separator provided with a reaction gas supply pipe are alternately laminated, a groove along which fuel gas flows is formed on one surface of the separator, and a groove along which oxidant gas flows is formed on the other surface of the separator (Japanese Patent Laid-Open No, 13088/1994). In this fuel cell, the reaction gas supply pipe is composed of a fuel gas supply pipe and an oxidant supply pipe, at least part of which is made of a ceramic pipe such as an alumina porcelain pipe. A structure is adopted such that the fuel gas supply pipe is connected to a side surface of the separator and communicates with the groove along which the fuel gas flows, and the oxidant supply pipe is connected to a side surface of the separator and communicates with the groove along which the oxidant gas flows. Alternatively, the fuel gas supply pipe is connected to a fuel gas distributor made of ceramic, and the oxidant supply pipe is connected to an oxidant gas distributor made of ceramic.

In the solid oxide fuel cell constructed as stated above, since the reaction gas supply pipes are individually connected to the respective separators, a circular glass ring or sealing a circular gas manifold formed for the aggregate and the separator can be made unnecessary, and a quadrangular glass ring for performing gas sealing between the aggregate and the separator can be made unnecessary.

However, in the solid oxide fuel cell disclosed in Japanese Patent Laid-Open No. 13088/1994, since part of or the whole of the reaction gas supply pipe is made of the relatively brittle ceramic pipe, the assembling operation must be carefully performed, the assembling operation time is increased, and there is a fear that the reaction gas supply pipe is damaged by thermal stress exerted on the reaction gas supply pipe by repetition of heat generation and cooling of the fuel cell.

Besides, in the conventional solid oxide fuel cell, there has also been a problem that it is very difficult to form the fuel gas distributor and the oxidant gas distributor out of ceramic, and further, they are easily affected by thermal expansion and thermal shock and are apt to be broken.

An object of a fourth embodiment of the invention is therefore to provide a distributor structure of a fuel cell module in which the whole surface of a power generating cell can be made to contribute to power generation, and respective separators connected to a distributor are electrically insulated by a comparatively simple structure, and further, an assembling operation time of a fuel short pipe and an oxidant short pipe can be prevented from increasing, and damage of the fuel short pipe due to thermal stress can be prevented.

SUMMARY OF THE INVENTION

The fuel cell module of the first embodiment is, as shown in FIGS. 1 and 2, a fuel cell module in which a fuel cell is constructed by laminating (n+1) (n is a positive integer) power generating cells 12, each of which is composed of an electrolyte layer 12a, and a fuel electrode layer 12b and an oxidant electrode layer 12c disposed on both surfaces of the electrolyte layer 12a, and which is characterized in that n separators 16 in total are provided, each of which is made of a conductive material to have a plate shape and is interposed between the fuel electrode layer 12b of the ith (i=1, 2, . . . , n) power generating cell 12 and the oxidant electrode layer 12c of the (i+1)th power generating cell 12 adjacent to the fuel electrode layer 12b, a porous fuel electrode current collecting body 17 having conductivity is interposed between the fuel electrode layer 12b of the ith power generating cell 12 and the j th (j=1, 2, . . . , n) separator 16, a porous oxidant electrode current collecting body 18 having conductivity is interposed between the oxidant electrode layer 12c of the (i+1)th power generating cell 12 and the jth separator 16, a single oxidant end plate 21 made of a conductive material to have a plate shape is laminated on the oxidant electrode layer 12c of the first power generating cell 12 through the oxidant electrode current collecting body 18, a single fuel end plate 22 made of a conductive material to have a plate shape is laminated on the fuel electrode layer 12b of the (n+1)th power generating cell 12 through the fuel electrode current collecting body 17, each of the n separators 16 includes a fuel supply passage 23 for introducing fuel gas from an outer peripheral surface of the separator 16 and discharging it from an almost central part of the separator 16 toward the fuel electrode current collecting body 17, and an oxidant supply passage 24 for introducing oxidant gas from an outer peripheral surface of the separator 16 and discharging it from a surface of the separator 16 to the oxidant electrode current collecting body 18. The single oxidant end plate 21 includes an oxidant supply passage 27 for discharging the oxidant gas from a surface of the oxidant end plate 21 to the oxidant electrode current collecting body 18. The single fuel end plate 22 includes a fuel supply passage 26 for discharging the fuel gas from an almost central part of the fuel end plate 22 toward the fuel electrode current collecting body 17. A fuel distributor 13 for supplying the fuel gas to the fuel supply passages 23 and 26 is provided near a fuel cell 11, and an oxidant distributor 14 for supplying the oxidant gas to the oxidant supply passages 24 and 27 is provided near the fuel cell 11. Also, a pair of electrode terminals 41 and 42 are electrically connected to the oxidant end plate 21 and the fuel end plate 22, respectively.

In the fuel cell module described above, when the fuel gas is introduced into the fuel distributor 14, the fuel gas passes through the fuel supply passages 23 and 26 of the 10 separator 16 and the fuel end plate 22, and is discharged from the almost central parts of the separator 16 and the fuel end plate 22 toward the center of the fuel electrode current collecting body 17. The discharged fuel passes through the inside of the fuel electrode current collecting body 17 and flows from the almost central part of the fuel electrode layer 12*b* toward the outer peripheral edge. When the oxidant gas is introduced into the oxidant distributor 14 at the same time, the oxidant gas passes through the oxidant supply passages 24 and 27 of the separator 16 and the oxidant end plate 21, and is discharged from the almost central parts of the separator 16 and the oxidant end plate 21 toward the center of the oxidant electrode current collecting body 18. The discharged oxidant gas passes through the inside of the oxidant electrode current collecting body 18 and flows in the oxidant electrode layer 12*c* along the solid electrolyte layer 11*a*.

The oxidant gas receives electrons from the oxidant electrode layer 12*c* of a portion in contact with the oxidant electrode current collecting body 18 over the whole surface of the power generating cell 12 and is ionized into oxide ions, and the oxide ions are diffused and moved in the solid electrolyte layer 12*a* to reach the vicinity of an interface with the fuel electrode layer 12*b*. By this, the oxide ions react with the fuel gas to produce reaction products, and release the electrons to the fuel electrode layer 12*b*, so that a large current is generated by extracting the electrons from the whole surface of the fuel electrode current collecting body 17, and the electric power can be obtained. The (n+1) power generating cells 12 are connected in series through the separator 16 made of conductive material, the fuel electrode current collecting body 17, and the air plate current collecting body 18, and the oxidant end plate 21 and the fuel end plate 22 made of conductive material are provided on both ends, so that large electric power can be extracted from the pair of electrode terminals 41 and 42.

As shown in FIGS. 1 to 3, each of the oxidant supply passages 24 formed in the n separators 16 introduces the oxidant gas from the outer peripheral surface of the separator 16 and substantially uniformly discharges it like a shower from a surface of the separator 16 to the oxidant electrode current collecting body 18, and the oxidant supply passage 27 formed in the single oxidant end plate 21 substantially uniformly discharges the oxidant gas like a shower from a surface of the oxidant end plate 21 to the oxidant electrode current collecting body 18.

In the fuel cell, since the oxidant gas is substantially uniformly discharged like a shower toward the oxidant electrode current collecting body 18 from the oxidant supply passages 24 and 27, the power generating cell 12 can be uniformly heated and cooled by this oxidant gas. Besides, when the power generating cell 12 is heated and exceeds a set temperature by generation of Joule heat during the power generation of the fuel cell 11, the oxidant gas having a temperature lower than this set temperature is discharged from the oxidant supply passages 24 and 27, so that the power generating cell 12 can be uniformly cooled, and therefore, damage of the power generating cell 12 due to local heating or cooling can be prevented.

The invention is further characterized in that, as shown in FIGS. 2 and 3, plural insertion holes 16*a* are formed in one of or not less than two of the n separators 16, the single oxidant end plate 21, and the single fuel end plate 22 so that they do not communicate with any of the fuel supply passages 23 and 26 and the oxidant supply passages 24 and 27, and one of or both of a first heater 31 and a temperature sensor are inserted in the plural insertion holes 16*a*.

In the fuel cell module described above, since the power generating cell 12 can be quickly heated by energizing the first heater 31 at the time of start-up of the fuel cell 11, the heating-up time can be shortened. Besides, since the power generating cell 12 is uniformly heated, and a temperature difference between the center and the outer periphery of the power generating cell 12 disappears to perform uniform thermal expansion, damage of the power generating cell 12 can be prevented. In case the first heater is further controlled on the basis of the detection output of the temperature sensor, the temperature of the separator and the like can be finely controlled.

The invention is further characterized in that plural weight lightening holes are formed in one of or not less than two of the n separators, the single oxidant end plate, and the single fuel end plate so that they do not communicate with any of the fuel supply passages and the oxidant supply passages.

In the fuel cell described above, since the weight of the separator, the oxidant end plate or the fuel end plate can be decreased by the formation of the weight lightening holes, the fuel cell can be made lightweight.

The invention is further characterized in that, as shown in FIGS. 2 and 4, plural slits 16*b* and 22*b* spirally extending from the center of each of the separators 16 and the fuel end plate 22 are formed on surfaces of the n separators 16 opposed to the fuel electrode current collecting bodies 17 and on a surface of the single fuel end plate 22 opposed to the fuel electrode current collecting body 17.

In the fuel cell described above, since the plural slits 16*b* and 22*b* are spirally formed on the surfaces of the separators 16 opposed to the fuel electrode current collecting bodies 17 and on the surface of the fuel end plate 22 opposed to the fuel electrode current collecting body 17, the fuel gas spirally flows along the slits 16*b* and 22*b*, and the reaction passage of the fuel gas becomes long. As a result, a collision frequency between the fuel gas and the fuel electrode layer 12*b* is increased, and the output of the fuel cell 11 can be improved.

The invention is further characterized in that, as shown in FIG. 1, a fuel short pipe 28 is inserted in the fuel distributor 13 through a fuel insulating pipe 36, a gap of an insertion portion between the fuel insulating pipe 36 and the fuel short pipe 28 is sealed with a fuel sealing member 37 having electrical insulation, an oxidant short pipe 29 is inserted in the oxidant distributor 14 through an oxidant insulating pipe 38, and a gap of an insertion portion between the oxidant insulating pipe 38 and the oxidant short pipe 29 is sealed with an oxidant sealing member 39 having electrical insulation.

In the fuel cell module, the power generating cell 12 can be electrically insulated from the fuel distributor 13 and the oxidant distributor 14, and further, it is possible to prevent the fuel gas from leaking from the fuel distributor 13, and it is possible to prevent the oxidant gas from leaking from the oxidant distributor 14.

The invention is further characterized in that, as shown in FIG. 1, a fuel preheating pipe 43 for supplying the fuel gas to the fuel distributor 13 is wound around an outer peripheral surface of the fuel cell 11, an oxidant preheating pipe 44 for supplying the oxidant gas to the oxidant distributor 14 is wound around the outer peripheral surface of the fuel cell 11, the fuel cell 11, together with the fuel preheating pipe 43 and the oxidant preheating pipe 44, is received in an inner case 46, and an exhaust pipe 51 for exhausting the fuel gas and the oxidant gas exhausted from the power generating cell 12 to the outside of the inner case 46 is connected to the inner case 46.

In the fuel cell module described above, the fuel gas passing through the inside of the fuel preheating pipe 43 is heated by the high temperature exhaust gas (water vapor or $CO_2$ produced from the fuel gas and the oxidant gas) exhausted from the power generating cell 12 and is supplied to the fuel distributor 13, and the oxidant gas passing through the inside of the oxidant preheating pipe 44 is also heated by the high temperature exhaust gas exhausted from the power generating cell 12 and is supplied to the oxidant distributor 14. Thus, since the fuel gas and the oxidant gas having temperature suitable for power generation are supplied to the respective power generating cells 12, the power generation efficiency can be improved.

The invention is further characterized in that, as shown in FIG. 1, the oxidant preheating pipe 44 is connected to an almost central part of the oxidant distributor 14 in a longitudinal direction.

In the fuel cell module described above, since Joule heat is generated during power generation by the inner resistance of the fuel cell 11, and the center portion of the fuel cell 11 in the laminating direction becomes highest, the oxidant gas having a relatively low temperature is supplied to this portion through the oxidant preheating pipe 44 and the oxidant distributor 14, so that the uniform heat of the power generating cell 12 can be held.

The invention as shown in FIG. 1, further includes a second heater 32 wound around the outer peripheral surface of the fuel cell 11 and received in the inner case 46.

In the fuel cell module described above, the fuel gas passing through the inside of the fuel preheating pipe 43 is heated by the high temperature exhaust gas exhausted from the power generating cell 12 or by the second heater 32 and is supplied to the fuel distributor 13, and the oxidant gas passing through the inside of the oxidant preheating pipe 44 is also heated by the high temperature exhaust gas exhausted from the power generating cell 12 or the second heater 32 and is supplied to the oxidant distributor 14. Thus, since the fuel gas and the oxidant gas having the temperature more suitable for the power generation are supplied to the respective power generating cells 12, and the power generation efficiency can be further improved.

The invention is further characterized in that, as shown in FIG. 1, at least an inner surface of the inner case 46 is subjected to silver plating, silver plating through nickel first plating, or platinum plating.

In the fuel cell module described above, the heat insulating effect of the power generating cell 12 and the separator 16 can be further improved by using radiation heat generated by the power generating cell 12 during the operation of the fuel cell 11.

The invention is further characterized in that, as shown in FIG. 1, the outer surface of the inner case 46 is coated with a heat insulating material 47, the fuel preheating pipe 43, the oxidant preheating pipe 44 and the exhaust pipe 51 are wound around the outer peripheral surface of the inner case 46, and the inner case 46, together with the fuel preheating pipe 43, the oxidant preheating pipe 44, and the exhaust pipe 51, is received in an outer case 48. In the fuel cell module, before the fuel gas in the fuel preheating pipe 43 and the oxidant gas in the oxidant preheating pipe 44 are introduced into the inner case 46, they are heated by the high temperature exhaust gas passing through the inside of the exhaust pipe 51 wound around the outer peripheral surface of the inner case 46. Thus, since the fuel gas and the oxidant gas are further preheated before they are preheated in the inner case 46, the power generation efficiency can be further improved.

The invention is further characterized in that, as shown in FIG. 1, at least an inner surface of the outer case 48 is subjected to silver plating, silver plating through nickel first plating, or platinum plating.

In the fuel cell module described above, the heat insulating effect of the power generating cell 12 and the separator 16 can be further improved by using the radiation heat generated by the power generating cell 12 during the operation of the fuel cell 11.

The invention is further characterized in that reforming particles are filled in the fuel preheating pipe at such a density that the fuel gas can flow.

In the fuel cell module described above, since the fuel gas is reformed in the fuel preheating pipe by the reforming particles, a reformer, which has been conventionally provided at the outside of the fuel cell module, becomes unnecessary.

Besides, it is preferable that the reforming particle is made of one kind of or not less than two kinds elements or oxides selected from a group consisting of Ni, NiO, $Al_2O_3$, $SiO_2$, MgO, CaO, $Fe_2O_3$, $Fe_3O_4$, $V_2O_3$, $NiAl_2O_4$, $ZrO_2$, SiC, $Cr_2O_3$, $ThO_2$, $Ce_2O_3$, $B_2O_3$, $MnO_2$, ZnO, Cu, BaO, and $TiO_2$.

The invention is further characterized in that, as shown in FIG. 2, the fuel electrode current collecting body 17 is made of stainless steel, nickel base alloy, or chromium base alloy, subjected to nickel plating, silver plating, silver plating through nickel first plating, or copper plating, or nickel, silver, silver alloy, platinum, or copper, the n separators 16 and the fuel end plate 22 are made of stainless steel, nickel base alloy, or chromium base alloy, and the fuel electrode current collecting bodies 17 are joined to the respective separators 16 and the fuel end plate 22.

In the fuel cell described above, electrical continuity between the separator 16 and the fuel electrode current collecting body 18, and electrical continuity between the fuel end plate 22 and the fuel electrode current collecting body 17 can be held through the joined portions for a long period. Besides, since the fuel electrode current collecting bodies 17 are joined to the respective separators 16 and the fuel end plate 22, the assembling operation time of the fuel cell 11 can be shortened and the assembling operation property can be improved.

The invention is further characterized in that, as shown in FIG. 2, the oxidant electrode current collecting body 18 is made of stainless steel, nickel base alloy or chromium base alloy, subjected to silver plating, silver plating through nickel first plating, or platinum plating, or silver, silver alloy, or platinum, the n separators 16 and the oxidant end plate 21 are made of one of stainless steel, nickel base alloy, or chromium base alloy, and the oxidant electrode current collecting bodies 18 are joined to the respective separators 16 and the oxidant end plate 21.

In the fuel cell described above, even if the separator 16 and the oxidant end plate 21 are exposed to the oxidant gas (high temperature oxidizing atmosphere) at a high temperature, since the joined portion between the separator 16 and the oxidant electrode current collecting body 18, and the welded joined portion between the oxidant end plate 21 and the oxidant electrode current collecting body 18 are welded, oxidization of the joined portions can be prevented. As a result, electrical continuity between the separator 16 and the oxidant electrode current collecting body 18, and electrical continuity between the oxidant end plate 21 and the oxidant electrode current collecting body 18 can be held for a long period through the joined portions. Besides, since the oxidant electrode current collecting bodies 18 are previously joined to the respective separators 16 and the oxidant end plate 21, the assembling operation time of the fuel cell 11 can be shortened and the assembling operation property can be improved.

The invention is further characterized in that, as shown in FIG. 1, one surface or not less than two surfaces of the n separators 16, the single oxidant end plate 21, and the single fuel end plate 22 are subjected to nickel plating, chromium plating, silver plating, or silver plating through nickel first plating.

In the fuel cell described above, electrical continuity between the separators 16, the oxidant end plate 21 or the fuel end plate 22 and the fuel electrode current collecting body 17 or the oxidant electrode current collecting body 18 can be further held for a long period.

The invention is further characterized in that, as shown in FIG. 1, one of or not less than two of the fuel preheating pipe 43, the fuel distributor 13, the fuel short pipe 28, the oxidant preheating pipe 44, the oxidant distributor 14, and the oxidant short pipe 27 are made of stainless steel, nickel base alloy or chromium base alloy, and inner surfaces are subjected to silver plating, silver plating through nickel first plating, or platinum plating.

In the fuel cell module described above, the inner parts of the oxidant preheating pipe 44, the oxidant distributor 14, and the oxidant short pipe 27 are not oxidized, and production of oxide scale (powder oxide) can be suppressed. On the other hand, although water vapor exists in the inner portions of the fuel preheating pipe 43, the fuel distributor 13 and the fuel short pipe 28 as the reducing atmosphere, production of oxide scale due to the water vapor can be suppressed.

The invention is further characterized in that, as shown in FIG. 1, one of or not less than two of the fuel preheating pipe 43, the fuel distributor 13, the fuel short pipe 28, the oxidant preheating pipe 44, the oxidant distributor 14, and the oxidant short pipe 27 are made of stainless steel, nickel base alloy, or chromium base alloy, and outer surfaces are subjected to silver plating, silver plating through nickel first plating, or platinum plating.

In the fuel cell module described above, the heat insulating effect of the power generating cell 12 and the separator 16 can be further increased by using radiation heat generated by the power generating cell 12 during the operation of the fuel cell 11.

The invention is further characterized in that, as shown in FIG. 1, the inner surfaces of the fuel preheating pipe 43, the fuel distributor 13, and the fuel short pipe 28 are plated with nickel.

In the fuel cell module described above, a reforming reaction of hydrocarbon is enabled in the inner portions of the fuel preheating pipe 43, the fuel distributor 13, and the fuel short pipe 28.

The invention is further characterized in that, a tip of a water supply pipe is inserted in an upper part of the fuel preheating pipe, and a spray or a pump is connected to a base end of the water supply pipe.

In the fuel cell module described above, water supplied to the fuel cell preheating pipe is vaporized while it goes down the fuel preheating pipe. As a result, a vaporizer for supplying water vapor to the fuel preheating pipe becomes unnecessary.

The invention is further characterized in that, as shown in FIG. 1, a water separator 53 is connected to a lowermost end of the fuel preheating pipe 43.

In the fuel cell module described above, when the fuel cell module 10 is stopped, the temperature is lowered, and the water vapor is liquefied into water, the water is gathered in the water separator 53. As a result, even when the fuel cell module 10 is restarted, since water is not supplied as a liquid to the power generating cell 12, the performance of the power generating cell 12 is not lowered, and the power generating cell 12 is not damaged.

The invention is further characterized in that, as shown in FIG. 1, exhaust pipes 51 and 52 for guiding the fuel gas and the oxidant gas exhausted from the power generating cell 12 to the outside of the inner case 46 and the outer case 48 are connected to a water vapor turbine.

In the fuel cell module described above, water is heated by a high temperature exhaust gas exhausted from the fuel cell module 10 to generate compressed water vapor, and the compressed water vapor is jetted to the turbine to rotate it, so that an electric generator is rotated to convert heat energy into electric energy. The system of the fuel cell and the water vapor turbine has power generation efficiency higher than a single fuel cell.

The invention is, as shown in FIGS. 2 and 3, a separator or an oxidant end plate constructed such that the oxidant supply passages 24 and 27 introduce the oxidant gas from an outer peripheral surface and substantially uniformly discharges it like a shower from a surface opposed to the oxidant electrode current collecting body 18.

In the separator or the oxidant end plate described above, since the oxidant gas is substantially uniformly discharged like the shower from the oxidant supply passages 24 and 27 toward the oxidant electrode current collecting body 18, the power generating cell 12 can be uniformly heated and cooled by the oxidant gas. Besides, when the power generating cell 12 is heated and exceeds a set temperature by generation of Joule heat during the power generation of the fuel cell 11, the power generating cell 12 can be uniformly cooled by discharging the oxidant gas having a temperature slightly lower than the set temperature from the oxidant supply passages 24 and 27, so that damage of the power generating cell 12 due to local heating or cooling can be prevented.

A gas supply structure to a fuel cell according to a second embodiment of the present invention is, as shown in FIGS. 5 and 6, a structure for supplying gas to a fuel cell in which a fuel cell is such that (n+1) (n is a positive integer) power generating cells 111, each including a solid electrolyte layer 111a, and a fuel electrode layer 111b and an oxidant electrode layer 111c disposed on both surfaces of the solid electrolyte layer 111a, are laminated, n separators in total are provided, each of which is made of a conductive material to have a plate shape and is interposed between the fuel electrode layer 111b of the ith (i=1, 2, . . . , n) power generating cell 111 and the oxidant electrode layer 111c of the (i+1)th power generating cell 111 adjacent to the fuel electrode layer 111b, and each of the n separators 112 includes a separator fuel passage 118 for introducing fuel gas from a separator fuel introduction hole 118a formed in an outer peripheral surface of the separator 112 and discharging it through a separator fuel continuous hole 118c formed in the separator 112 from a separator fuel discharge hole 118b formed in a surface of the separator 112 opposed to the fuel electrode layer 111b, and a separator oxidant passage 119 for introducing oxidant gas from a separator oxidant introduction hole 119a formed in an outer peripheral surface of the separator 112 and discharging it through a separator oxidant continuous hole 119c formed in the separator 112 from a separator oxidant discharge hole 119b formed in a surface of the separator 112 opposed to the oxidant electrode layer 111c. The separator 112 includes a separator substrate 121 having one surface on which a separator fuel concave groove 121a to turn into the separator fuel introduction hole 118a and the separator fuel continuous hole 118c is formed, and the other surface on which a separator oxidant concave groove 121b to turn into the separator oxidant introduction hole 119a and the separator oxidant continuous hole 119c is formed, a separator fuel cover 122, which covers the separator fuel concave groove 121a and in which the separator fuel discharge hole 118b is formed, and a separator oxidant cover 123 which covers the separator oxidant concave groove 121b and in which the separator oxidant discharge hole 119b is formed.

In the structure for supplying the gas to the fuel cell, the separator fuel concave groove 121a and the separator oxidant concave groove 121b of the separator substrate 121 are covered with the separator fuel cover 122 and the separator oxidant cover 123, so that the separator fuel passage 118 along which the fuel gas flows, and the separator oxidant passage 119 along which the oxidant gas flows are formed. Thus, since the thickness of each of the separators 112 can be made very thin, the fuel cell 110 can be made compact in the laminating direction of the power generating cells 111.

The invention is further characterized in that, as shown in FIGS. 5 and 6, the separator fuel discharge hole 118b is formed in the separate fuel cover 122 such that it is positioned at the center of the separator substrate 121, and the separator oxidant discharge hole 119b is formed in the separate oxidant cover 123 such that the oxidant gas is substantially uniformly discharged like a shower toward the oxidant electrode layer 111c opposed to the separate substrate 121.

The invention is further characterized in that, as shown in FIGS. 5 and 6, plural slits spirally extending from the separator fuel discharge hole 118b are formed on a surface of the separator 112 opposed to the fuel electrode layer 111b.

In the structure for supplying the gas to the fuel cell, when the fuel gas is introduced into the separator fuel passage 118, the fuel gas is discharged from the separator fuel discharge hole 118b toward the center of the fuel electrode layer iiib, and spirally flows along the slits from the center of the fuel electrode layer ilib. By this, the reaction passage of the fuel gas becomes long, a collision frequency between the fuel gas and the fuel electrode layer 111b is increased, and the output of the fuel cell can be improved. When the oxidant gas is introduced into the separator oxidant passage 119 at the same time, the oxidant gas is substantially uniformly discharged like a shower from the separator oxidant discharge hole 119b toward the oxidant electrode layer lllc, and flows along the solid electrolyte layer iila in the oxidant electrode layer 111c. By this, the power generating cell 111 can be uniformly heated and cooled by the oxidant gas, and damage of the power generating cell 111 due to local heating or cooling can be prevented.

The invention is further characterized in that, the separator fuel discharge hole is formed in the separate fuel cover such that it is positioned at the center of the separator substrate, and the separator oxidant discharge hole is formed in the separator oxidant cover such that it is positioned at the center of the separator substrate.

The invention is further characterized in that plural slits spirally extending from the separator oxidant discharge hole are formed on a surface of the separator opposed to the oxidant electrode layer.

In the structure for supplying the gas to the fuel cell, when the fuel gas is introduced into the separator fuel passage, the fuel gas is discharged from the separator fuel discharge hole toward the center of each of the oxidant electrode layers, and spirally flows from the center of the fuel electrode layer along the slits. By this, the reaction passage of the fuel gas becomes long, and a collision frequency between the fuel gas and the fuel electrode layer is increased. When the oxidant gas is introduced into the separator oxidant passage at the same time, the oxidant gas is discharged from the separator oxidant discharge hole toward the center of each of the oxidant electrode layers, and spirally flows along the slits from the center of the oxidant electrode layer. By this, the reaction passage of the oxidant gas becomes long, and a collision frequency between the oxidant gas and the oxidant electrode layer is increased. As a result, the output of the fuel cell can be improved.

Besides, it is preferable that the separator 112 is made of stainless steel, nickel base alloy, or chromium base alloy, and the surface of the separator 112 is plated with one of or both of nickel and silver.

Besides, it is also possible to fill reforming particles into the separator fuel supply passage 118 at such a density that the fuel gas can flow.

The invention is further characterized in that, as shown in FIG. 6, a thermocouple insertion groove 121g in which a thermocouple 136 can be inserted and a heater insertion groove 121h in which a heater 137 can be inserted are formed in the separator substrate 121.

In the structure for supplying the gas to the fuel cell, the heater 137 is operated at the time of start-up of the fuel cell 110, so that the separator 112 is heated and the temperature of the fuel cell 110 is raised to a starting temperature. When the fuel cell reaches the starting temperature, the heater 137 is stopped on the basis of the detection output of the thermocouple 136 for detecting the starting temperature. Besides, since Joule heat is generated in the fuel cell 110 during power generation of the fuel cell 110, and the temperature of the fuel cell 110 is raised, the oxidant gas having a temperature slightly lower than the operation temperature of the fuel cell 110 is supplied on the basis of the detection output of the thermocouple 136. By this, temperature control of the separator 112 is carried out.

A gas supply structure to a fuel cell according to a third embodiment of the present invention is, as shown in FIG. 12, a gas supply structure of a fuel cell in which a fuel cell 210 is such that (n+1) (n is a positive integer) power generating cells 211 are laminated, each of which includes a solid electrolyte layer 211a, and a fuel electrode layer 211b and an oxidant electrode layer 211c disposed on both surfaces of the solid electrolyte layer 211a, n separators are provided in total, each of which is made of a conductive material to have a plate shape and is interposed between the fuel electrode layer 211b of the ith (i=1, 2, . . . , n) power generating cell 211 and the oxidant electrode layer 211c of the (i+1)th power generating cell 211 adjacent to the fuel electrode layer 211b, and each of the n separators 212 includes a separator fuel passage 218 for introducing fuel gas from a separator fuel introduction hole 218a formed in an outer peripheral surface of the separator 212 and discharging it from a separator fuel discharge hole 218b formed in a surface of the separator 212 opposed to the fuel electrode layer 211b, and a separator oxidant passage 219 for introducing oxidant gas from a separator oxidant introduction hole 219a formed in an outer peripheral surface of the separator 212 and discharging it from a separator oxidant discharge hole 219b formed in a surface of the separator 212 opposed to the oxidant electrode layer 211c. The separator 212 includes a separator fuel thin plate 221 in which the separator fuel discharge hole 218b is formed, a separator oxidant thin plate 222 in which the separator oxidant discharge hole 219b is formed, and a separator grooved thin plate 223 which is sandwiched between the separator fuel thin plate 221 and the separator oxidant thin plate 222 and in which a separator fuel groove 223c to become the separator fuel passage 218, and a separator oxidant groove 223d to become the separator oxidant passage 219 are formed.

In the gas supply structure of the fuel cell described above, the separate grooved thin plate 223 in which the separator fuel groove 223c and the separator oxidant groove 223d are formed is sandwiched between the separator fuel thin plate 221 in which the separator fuel discharge hole 218b is formed and the separator oxidant thin plate 222 in which the separator oxidant discharge hole 219b is formed, so that the separator fuel passage 218 along which the fuel gas flows and the separator oxidant passage 219 along which the oxidant gas flows are formed. Thus, since the thickness of each of the separators 212 can be made very thin, the fuel cell 210 can be made compact in the laminating direction of the power generating cells 211.

The invention is further characterized in that, as shown in FIGS. 12 and 13, the separator fuel discharge hole 218b is formed at the center of the separator fuel thin plate 221, and the separator oxidant discharge hole 219b is formed at the center of the separator oxidant thin plate 222.

The invention is further characterized in that, as shown in FIGS. 12 and 13, plural slits spirally extending from the separator fuel discharge hole 218b are formed on a surface of the separator fuel thin plate 221.

The invention is further characterized in that, as shown in FIGS. 12 and 13, plural slits spirally extending from the separator oxidant discharge hole 219b are formed on a surface of the separator oxidant thin plate 222.

In the gas supply structure of the fuel cell, when the fuel gas is introduced into the separator fuel passage 218, the fuel gas is discharged from the separator fuel discharge hole 218b toward the center of each of the fuel electrode layers 211b, and spirally flows along the slits from the center of the fuel electrode layer 211b. By this, the reaction passage of the fuel gas becomes long, and the collision frequency between the fuel gas and the fuel electrode layer 211b is increased. When the oxidant gas is introduced into the separator oxidant passage 219 at the same time, the oxidant gas is discharged from the separator oxidant discharge hole 219b toward the center of each of the oxidant electrode layers 211c, and spirally flows along the slits from the center of the oxidant electrode layer 211c. By this, the reaction passage of the oxidant gas becomes long, and the collision frequency between the oxidant gas and the oxidant electrode layer 211c is increased. As a result, the output of the fuel cell 210 can be improved.

The invention is further characterized in that, the separator fuel discharge hole is formed at the center of the separator fuel thin plate, and the separator oxidant discharge hole is formed in the separator oxidant thin plate so that the oxidant gas is substantially uniformly discharged like a shower toward the oxidant electrode layer opposed to the separator oxidant thin plate.

In the gas supply structure described above, when the fuel gas is introduced into the separator fuel passage, the fuel gas is discharged from the separator fuel discharge hole toward the center of each of the oxidant electrode layers, and spirally flows along the slits from the center of the fuel electrode layer. By this, the reaction passage of the fuel gas becomes long, and the collision frequency between the fuel gas and the fuel electrode layer is increased, so that the output of the fuel cell can be improved. When the oxidant gas is introduced into the separator oxidant passage at the same time, the oxidant gas is substantially uniformly discharged like a shower from the separator oxidant discharge hole toward the oxidant electrode layer, and flows in the oxidant electrode layer along the solid electrolyte layer. By this, the power generating cell can be uniformly heated and cooled by the oxidant gas, and damage of the power generating cell due to local heating or cooling can be prevented.

Besides, it is preferable that the separator 212 is made of stainless steel, nickel base alloy, or chromium base alloy, and a surface of the separator 212 is plated with one of or both of nickel and silver.

Besides, it is preferable to fill reforming particles into the separator fuel supply passage 218 at such a density that the fuel gas can flow.

The invention is further characterized in that, as shown in FIG. 13, a thermocouple insertion groove 223e in which a thermocouple 236 can be inserted, and a heater insertion groove 223f in which a heater 237 can be inserted are formed in the separator grooved thin plate 223.

In the gas supply structure of the fuel cell described above, the heater 237 is operated at the time of start-up of the fuel cell 210, so that the separator 212 is heated and the temperature of the fuel cell 210 is raised to a starting temperature. When the fuel cell reaches the starting temperature, the heater 237 is stopped on the basis of the detection output of the thermocouple 236 for detecting the starting temperature. Besides, since Joule heat is generated in the fuel cell 210 during the power generation of the fuel cell 210, and the temperature of the fuel cell 210 is raised, the oxidant gas having a temperature slightly lower than the operation temperature of the fuel cell 210 is supplied on the basis of the detection output of the thermocouple 236. By this, temperature control of the separator 212 is carried out.

A distributor structure of a fuel cell module according to a fourth embodiment of the present invention is, as shown in FIGS. 16 and 17, an improvement of a fuel cell module comprising a fuel cell 310 including a power generating cell 311, fuel supply passages 318 and 322 capable of supplying fuel gas to the power generating cell 311, and oxidant supply passages 319 and 321 capable of supplying oxidant gas to the power generating cell 311, a fuel distributor 323 provided near the fuel cell 310, for supplying the fuel gas to the fuel supply passages 318 and 322 through a fuel short pipe 331, and an oxidant distributor 324 provided near the fuel cell 310, for supplying the oxidant gas to the oxidant supply passages 319 and 321 through an oxidant short pipe 332.

The characteristic structure is that the fuel distributor 323 includes a fuel distributor main body 326 made of a box-like or tube-like metal material, and a single plate-like fuel cover 327 which closes a fuel side opening 326a of the fuel distributor main body 326, is directly connected with plural fuel short pipes 331, and is made of am electrical insulation material, and the oxidant distributor 324 includes an oxidant distributor main body 328 made of a box-like or tube-like metal material, and a single plate-like oxidant cover 329 which closes an oxidant side opening 328a of the oxidant distributor main body 328, is directly connected with plural oxidant short pipes 332, and is made of an electrical insulation material.

In the distributor structure of the fuel cell described above, in the fuel distributor 323, since the fuel cover 327 connected with the fuel short pipe 331 is made of the electrical insulation material, the respective separators 312 are not electrically short-circuited by the fuel distributor 323. Besides, with respect to the fuel distributor 323, since the fuel side opening 326a of the fuel distributor main body 326 made of the metal material has only to be closed by the fuel cover 327 made of the electrical insulation material, the structure is simple and the assembling steps can be decreased.

On the other hand, in the oxidant distributor 324, since the oxidant cover 329 connected with the oxidant short pipe 332 is made of the electrical insulation material, the respective separators 312 are not electrically short-circuited by the oxidant distributor 324. Besides, with respect to the oxidant distributor 324, since the oxidant side opening 328a of the oxidant distributor main body 328 made of the metal material has only to be closed with the oxidant cover 329 made of the electrical insulation material, the structure is simple and the assembling steps can be reduced. The invention is further characterized in that, as shown in FIGS. 16 and 17, the power generating cell 311 includes a solid electrolyte layer 311a, and a fuel electrode layer 311b and an oxidant electrode layer 311c disposed on both surfaces of the solid electrolyte layer 311a, the fuel cell 310 is constituted by laminating (n+1) (n is a positive integer) power generating cells 311, n separators 312 are provided in total, each of which is made of a metal material to have a plate shape and is interposed between the fuel electrode layer 311b of the ith (i=1, 2, . . . , n) power generating cell 311 and the oxidant electrode layer 311c of the (i+1)th power generating cell 311 adjacent to the fuel electrode layer 311b, each of the n separators 312 includes a separator fuel passage 318 for introducing the fuel gas from an outer peripheral surface of the separator 312 and discharging it from a surface of the separator 312 opposed to a fuel electrode current collecting body 313, and a separator oxidant passage 319 for introducing the oxidant gas from an outer peripheral surface of the separator 312 and discharging it from a surface of the separator 312 opposed to an oxidant electrode current collecting body 314. The fuel distributor 323 is provided to extend in a laminating direction of the power generating cells, and the oxidant distributor 324 is provided to extend in the laminating direction of the power generating cells 311.

In the distributor structure of the fuel cell module described above, since the fuel distributor and the oxidant distributor are provided in the laminating direction of the fuel cells at the sides of the solid oxide fuel cell in which the power generating cell and the separator are alternately laminated, the fuel distributor and the oxidant distributor can be constructed to be simple and compact.

The invention is further characterized in that, as shown in FIG. 17, a fuel side tapped hole 326b is formed in the fuel distributor main body 326, a fuel side open hole 327b is formed in the fuel cover 327, a fuel side fixing screw 333 inserted through the fuel side open hole 327b is fitted to the fuel side tapped hole 326b so that the fuel cover 327 is fixed to the fuel distributor main body 326, and a hole diameter of the fuel side open hole 327b is formed to be larger than the fuel side fixing screw 333 so as to absorb a difference in the amount of deformation due to thermal expansion and thermal contraction between the fuel distributor main body 326 and the fuel cover 327.

In the distributor structure of the fuel cell module described above, although a heat cycle of a large temperature difference is exerted on the fuel distributor 323 by the repetition of start and stop of a power generation operation, since the hole diameter of the fuel side open hole 327b is formed to be larger than the fuel side fixing screw 333, the difference in the amount of deformation due to thermal expansion and thermal contraction between the fuel distributor main body 326 and the fuel cover 327 can be absorbed by a relatively large gap formed between the fuel side open hole 327b and the fuel side fixing screw 333. As a result, a large force is not exerted on the fuel cover 327, and the fuel cover 327 is not damaged.

The invention is further characterized in that, as shown in FIG. 17, an oxidant side tapped hole 328b is formed in the oxidant distributor main body 328, an oxidant side open hole 329b is formed in the oxidant cover 329, an oxidant side fixing screw 334 inserted through the oxidant side open hole 329b is fitted to the oxidant side tapped hole 328b so that the oxidant cover 329 is fixed to the oxidant distributor main body 328, and a hole diameter of the oxidant side open hole 329b is formed to be larger than the oxidant side fixing screw 334 so as to absorb a difference in the amount of deformation due to thermal expansion and thermal contraction between the oxidant distributor main body 328 and the oxidant cover 329.

In the distributor structure of the fuel cell module described above, although a heat cycle of a large temperature difference is exerted on the oxidant distributor 324 by the repetition of start and stop of a power generation operation, since the hole diameter of the oxidant side open hole 329b is formed to be larger than the oxidant side fixing screw 334, the difference in the amount of deformation due to thermal expansion and thermal contraction between the oxidant distributor main body 328 and the oxidant cover 329 can be absorbed by a relatively large gap formed between the oxidant side open hole 329b and the oxidant side fixing screw 334. As a result, a large force is not exerted on the oxidant cover 329, and the oxidant cover 329 is not damaged.

The invention is further characterized in that, as shown in FIG. 19, a fuel side through hole 376b is formed in the fuel distributor main body 376, a fuel side open hole 327b is formed in the fuel cover 327, a fuel side fixing screw 383 inserted through the fuel side open hole 327b and the fuel side through hole 326b is fitted to a fuel side nut 386 so that the fuel cover 327 is fixed to the fuel distributor main body 376, and a hole diameter of the fuel side open hole 327b or the fuel side through hole 376b is formed to be larger than the fuel side fixing screw 383 so as to absorb a difference in the amount of deformation due to thermal expansion and thermal contraction between the fuel distributor main body 376 and the fuel cover 327.

In the distributor structure of the fuel cell module described above, although a heat cycle of a large temperature difference is exerted on the fuel distributor 373 by the repetition of start and stop of a power generation operation, since the hole diameter of the fuel side open hole 327b or the fuel side through hole 376b is formed to be larger than the fuel side fixing screw 383, the difference in the amount of deformation due to thermal expansion and thermal contraction between the fuel distributor main body 376 and the fuel cover 327 can be absorbed by a relatively large gap formed between the fuel side open hole 327b or the fuel side through hole 376b and the fuel side fixing screw 383. As a result, a large force is not exerted on the fuel cover 327, and the fuel cover 327 is not damaged.

The invention is further characterized in that, as shown in FIG. 19, an oxidant side through hole 378b is formed in the oxidant distributor main body 378, an oxidant side open hole 329b is formed in the oxidant cover 329, an oxidant side fixing screw 384 inserted through the oxidant side open hole 329b and the oxidant side through hole 378b is fitted to an oxidant side nut 387 so that the oxidant cover 329 is fixed to the oxidant distributor main body 378, and a hole diameter of the oxidant side open hole 329b or the oxidant side through hole 378b is formed to be larger than the oxidant side fixing screw 384 so as to absorb a difference in the amount of deformation due to thermal expansion and thermal contraction between the oxidant distributor main body 378 and the oxidant cover 329.

In the distributor structure of the fuel cell module described above, although a heat cycle of a large temperature difference is exerted on the oxidant distributor 374 by the repetition of start and stop of a power generation operation, since the hole diameter of the oxidant side open hole 329b or the oxide side through hole 378b is formed to be larger than the oxidant side fixing screw 384, the difference in the amount of deformation due to thermal expansion and thermal contraction between the oxidant distributor main body 378 and the oxidant cover 329 can be absorbed by a relatively large gap formed between the oxidant side open hole 329b or the oxidant side through hole 378b and the oxidant side fixing screw 384. As a result, a large force is not exerted on the oxidant cover 329, and the oxidant cover 329 is not damaged.

The invention is further characterized in that, a fuel seal member made of glass or cement is filled between a periphery of a fuel side opening of the fuel distributor main body and a periphery of the fuel cover.

In the distributor structure of the fuel cell module described above, a seal effect of the fuel gas in the fuel distributor becomes high.

The invention is further characterized in that, an oxidant seal member made of glass or cement is filled between a periphery of an oxidant side opening of the oxidant distributor main body and a periphery of the oxidant cover.

In the distributor structure of the fuel cell module described above, a seal effect of the oxidant gas in the oxidant distributor becomes high.

The invention is further characterized in that, as shown in FIG. 19, a fuel side slit 376d for exposing a screw portion 383a of the fuel side fixing screw 383 inserted through the fuel side through hole 376b is formed in the fuel distributor main body 376. When the fuel cell and the fuel distributor 373 are heated to a high temperature so as to operate the fuel cell in a state where the fuel cover 327 is fixed to the fuel distributor main body 376 by using the fuel side fixing screw 383 and the fuel side nut 386, there is a case where the fuel side fixing screw 383 and the fuel side nut 386 are burned and the fuel side nut 386 can not be removed from the fuel side fixing screw 383. At this time, since the fuel side fixing screw 383 is easily drawn from the fuel side through hole 376b and the fuel side open hole 327b by cutting the fuel side fixing screw 383 exposed from the fuel side slit 376d by use of a metal-working saw or the like, the fuel cover 327 can be removed from the fuel distributor main body 376.

The invention is further characterized in that, as shown in FIG. 19, an oxidant side slit 378d for exposing a screw portion 384a of the oxidant side fixing screw 384 inserted through the oxidant side through hole 378b is formed in the oxidant distributor main body 378.

When the fuel cell and the oxidant distributor 374 are heated to a high temperature so as to operate the fuel cell in a state where the oxidant cover 329 is fixed to the oxidant distributor main body 378 by using the oxidant side fixing screw 384 and the oxidant side nut 387, there is a case where the oxidant side fixing screw 384 and the oxidant side nut 387 are burned and the oxidant side nut 387 can not be removed from the oxidant side fixing screw 384. At this time, since the oxidant side fixing screw 384 is easily drawn from the oxidant side through hole 378b and the oxidant side open hole 329b by cutting the oxidant side fixing screw 384 exposed from the oxidant side slit 378d by use of a metal-working saw or the like, the oxidant cover 329 can be removed from the oxidant distributor main body 378.

The invention is further characterized in that, as shown in FIG. 19, a pair of fuel permeation holes 326c and 326c for introducing the fuel gas into the fuel distributor main body 376 are respectively formed on an upper and a lower surfaces of the fuel distributor main body 376.

In the distributor structure of the fuel cell module described above, the fuel gas can be substantially uniformly supplied to the respective separators.

The invention is further characterized in that, as shown in FIG. 19, a pair of oxidant permeation holes 328c and 328c for introducing the oxidant gas into the oxidant distributor main body 378 are respectively formed on an upper and a lower surfaces of the oxidant distributor main body 378.

In the distributor structure of the fuel cell module described above, the oxidant gas can be substantially uniformly supplied to the respective separators.

DETAILED DESCRIPTION OF THE INVENTION

Figure 1:
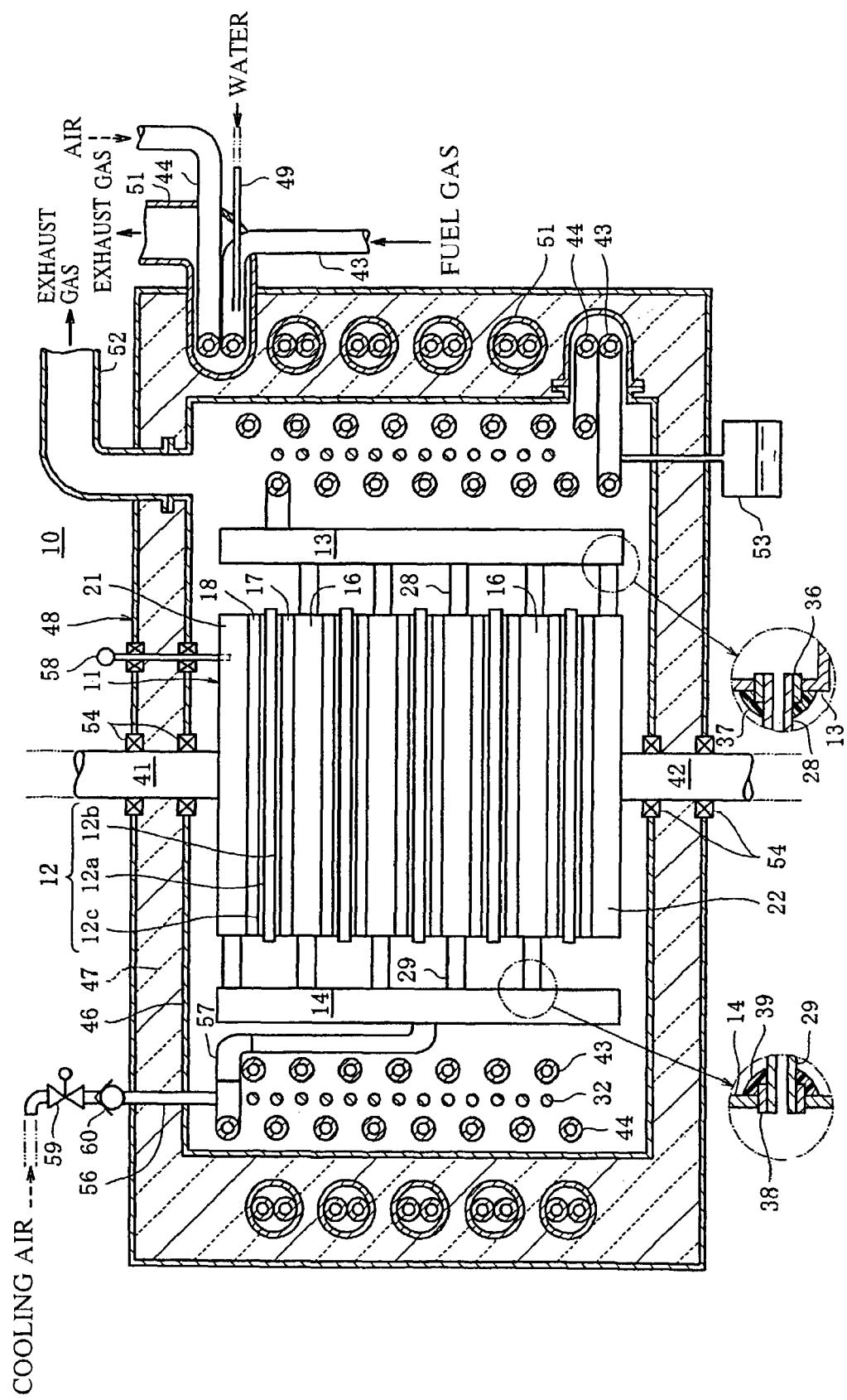
FIG. 1 is a longitudinal sectional view of a fuel cell module according to a first embodiment of the invention.

A fuel cell module of a first embodiment of the present invention will be described on the basis of the drawings. As shown in FIG. 1, a fuel cell module 10 is equipped with a fuel cell 11 including (n+1) laminated power generating cells 12, and a single fuel distributor 13 and a single air distributor 14 (oxidant distributor) respectively provided in the vicinity of the fuel cell 11. Here, n is a positive integer. The power generating cell 12 is constituted by a disk-like solid electrolyte layer 12a, and a disk-like fuel electrode layer 12b and an air electrode layer 12c (oxidant electrode layer) disposed on both surfaces of the solid electrolyte layer 12a. N separators 16 in total are provided, each of which is made of a conductive material in the form of a square plate shape and is interposed between the fuel electrode layer 12b of the ith (i=1, 2, . . . , n) power generating cell 12 from above and the air electrode layer 12c of the (i+1)th power generating cell 12 from above, which is adjacent to the fuel electrode layer 12b. Besides, a porous fuel electrode current collecting body 17 formed into a disk shape and having conductivity is interposed between the fuel electrode layer 12b of the ith power generating cell 12 from above and the j th (j=1, 2, . . . , n) separator 16 from above, and a porous air electrode current collecting body 18 (oxidant electrode current collecting body) formed into a disk shape and having conductivity is interposed between the air electrode layer 12c of the (i+1)th power generating cell 12 from above and the jth separator 16 from above. The jth separator indicates a separator between the ith power generating cell and the (i+1)th power generating cell. Further, a single air end plate 21 (oxidant end plate) made of a conductive material to have a square plate shape is laminated on the air electrode layer 12c of the first (uppermost stage) power generating cell 12 from above through the air electrode current collecting body 18, and a single fuel end plate 22 made of a conductive material to have a square plate shape is laminated on the fuel electrode layer 12b of the (n+1)th (lowermost stage) power generating cell 12 from above through the fuel electrode current collecting body 17.

Incidentally, the solid electrolyte layer, the fuel electrode layer, the air electrode layer, the fuel electrode current collecting body, and the air electrode current collecting body may be formed into a polygonal plate shape such as a tetragonal plate shape, a hexagonal plate shape, or an octagonal plate shape, not the disk shape. Besides, the separator, the air end plate, and the fuel end plate may be formed into a disk shape, or a polygonal plate shape such as a rectangular plate shape, a hexagonal plate shape, or an octagonal plate shape, not the square plate shape. In this case, in order to cause the fuel gas to uniformly flow in an outer peripheral direction from an almost central part of the power generating cell 12, the number of second fuel holes 23b of a fuel supply passage 23 described later is not limited to one, but two or not less than three holes may be provided at the almost central part.

Besides, in the case where the fuel cell is installed so that the laminating direction of the power generating cells coincides with the vertical direction, that is, the respective power generating cells extend in the horizontal direction, it is preferable that the fuel gas is discharged from the almost central part of the separator, however, in the case where the fuel cell is installed so that the laminating direction of the power generating cells coincides with the horizontal direction, that is, the respective power generating cells extend in the vertical direction, it is preferable that the fuel gas is discharged from a portion somewhat lower than the center of the separator. The reason is that if the fuel gas of hydrogen or methane is discharged from the center of the separator in the state where the fuel cell is installed so that the respective power generating cells extend in the vertical direction, hydrogen or methane rises by the influence of gravity, and a cell reaction at an upper part of the power generating cell becomes active as compared with a lower part. Then, in the case where the fuel cell is installed so that the respective power generating cells extend in the vertical direction, in order to cause the whole surface of the power generating cell to uniformly generate electric power as described above, it is preferable to shift the second fuel hole to a position somewhat lower than the center of the separator.

Further, in the case where a third air hole 24c of an air supply passage 24 is formed like a shower (state where a large number of holes are arranged horizontally and vertically), in order to cause air to uniformly flow to the whole surface of the power generating cell 11, it is preferable that more (denser) third air holes 24c are formed at the center portion as compared with the outer peripheral portion of the separator 16. This is because if the shower-like third air holes 24c are formed at equal intervals, more air is discharged at the outer peripheral portion than at the center portion of the separator 16.

The solid electrolyte layer 12a is made of an oxide ion conductor. Specifically, it is an oxide ion conductor expressed by a general formula (1): $Ln_1AGaB_1B_2B_3O$. In the general formula (1), $Ln_1$ denotes one kind of or not less than two kinds of elements selected from a group consisting of La, Ce, Pr, Nd and Sm, and is contained at a content of 43.6 to 51.2 wt. %, A denotes one kind of or not less than two kinds of elements selected from a group consisting of Sr, Ca and Ba, and is contained at a content of 5.4 to 11.1 wt. %, Ga is contained at a content of 20.0 to 23.9 wt. %, Bi denotes one kind of or not less than two kinds of elements selected from a group consisting of Mg, Al and In, B2 denotes one kind of or not less than two kinds of elements selected from a group consisting of Co, Fe, Ni and Cu, and B3 denotes one kind of or not less than two kinds of elements selected from a group consisting of Al, Mg, Co, Ni, Fe, Cu, Zn, Mn and Zr. When B1 and B3 or B2 and B3 are not the same element, Bi is contained at a content of 1.21 to 1.76 wt. %, B2 is contained at a content of 0.84 to 1.26 wt. %, and B3 is contained at a content of 0.23 to 3.08 wt. %, and when B1 and B3 or B2 and B3 are the same element, the total of a B1 content and a B3 content is 1.41 to 2.70 wt. %, and the total of a B2 content and a B3 content is 1.07 to 2.10 wt. %.

Besides, the solid electrolyte layer 12a may be made of an oxide ion conductor expressed by a general formula (2): $Ln1_{1-x}A_xGa_{1-y-z-w}B1_yB2_zB3_wO_{3-d}$. In the general formula (2), Ln1 denotes one kind of or not less than two kinds of elements selected from a group consisting of La, Ce, Pr, Nd and Sm, A denotes one kind of or not less than two kinds of elements selected from a group consisting of Sr, Ca and Ba, Bi denotes one kind of or not less than two kinds of elements selected from a group consisting of Mg, Al and In, B2 denotes one kind of or not less than two kinds of elements selected from a group consisting of Co, Fe, Ni and Cu, B3 denotes one kind of or not less than two kinds of elements selected from a group consisting of Al, Mg, Co, Ni, Fe, Cu, Zn, Mn and Zr, x denotes 0.05 to 0.3, y denotes 0.025 to 0.29, z denotes 0.01 to 0.15, w denotes 0.01 to 0.15, y+z+w denotes 0.035 to 0.3, and d denotes 0.04 to 0.3. By forming the solid electrolyte layer 12a of the oxide ion conductor as mentioned above, it becomes possible to carry out a power generation operation at a relatively low temperature of 650±50° C. without lowering the power generation efficiency of the fuel cell 11.

The fuel electrode layer 12b is made of a metal such as Ni, made of cermet such as Ni—YSZ, or made of a mixture of Ni and a compound expressed by a general formula (3): $Ce1_{-m}DmO2$ to be porous. In the above general formula (3), D denotes one kind of or not less than two kinds of elements selected from a group consisting of Sm, Gd, Y and Ca, and m denotes an atomic ratio of D element and is set within the range of 0.05 to 0.4, preferably 0.1 to 0.3.

The air electrode layer 12c is made of an oxide ion conductor expressed by a general formula (4): $Ln2_{1-x}Ln3_xE_{1-y}Co_yO_{3+d}$ to be porous. In the above general formula (4), Ln2 denotes one of or both of elements of La and Sm, Ln3 denotes one of or both of elements of Ba, Ca and Sr, E denotes one of or both of elements of Fe and Cu, and x denotes an atomic ratio of Ln3 and is set within the range of over 0.5 and less than 1.0. Besides, y denotes an atomic ratio of Co element and is set within the range of over 0 and not higher than 1.0, preferably within the range of not less than 0.5 and not higher than 1.0. Besides, d is set within the range of not less than −0.5 and not higher than 0.5.

An example of a manufacturing method of the power generating cell 12 will be described below. First, as raw material powder, respective powders of La2O3, SrCO3, Ga2O3, MgO, and CoO are weighed and mixed so as to form La0.8Sr0.2Ga0.8MgO.15Co0.05O2.8, and then, they are prebaked at 1100° C. to form a calcinated material. Next, after this calcinated material is pulverized, slurry is prepared by adding a predetermined binder, solvent and the like and mixing them, and a green sheet is formed from this slurry by a doctor blade method. Next, this green sheet is sufficiently dried in the air, and is cut into a predetermined size, and then, it is sintered at 1450° C., so that the solid electrolyte layer 12a is obtained. After a NiO powder and (Ce0.8Sm0.2) 02 powder are mixed so that a volume ratio of Ni and (Ce0_8Sm0.2)02 becomes 6:4, this mixed powder is sintered at 1100° C. onto one surface of the solid electrolyte layer 12a, so that the fuel electrode 20 layer 12b is formed. Further, (Sm0.5Sr0.5)Co03 is sintered at 1000° C. onto the other surface of the solid electrolyte layer 12a so that the air electrode layer 12c is formed. In this way, the power generating cell 12 is formed.

Incidentally, the solid electrolyte layer may be formed of an ion exchange resin film, and the fuel electrode layer and the air electrode layer may be formed of a mixture of a catalytic metal powder or platinum support carbon powder, polytetrafluoroethylene, and ion exchange resin. A fuel cell including a power generating cell constructed in this way is called a solid polymer electrolyte fuel cell.

Figure 2:
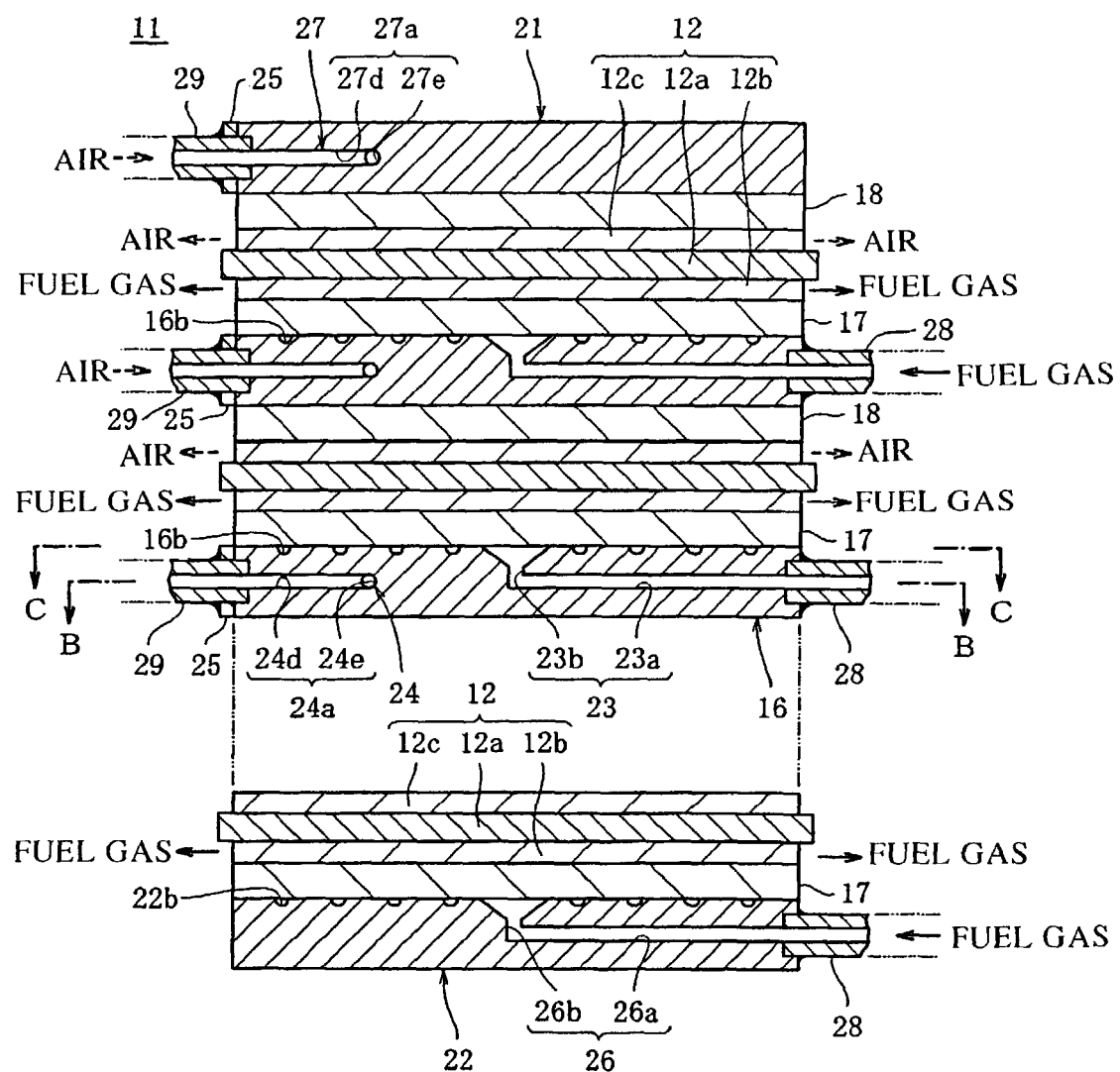
FIG. 2 is a sectional view showing a fuel cell and taken along line A-A of FIG. 3.
Figure 3:
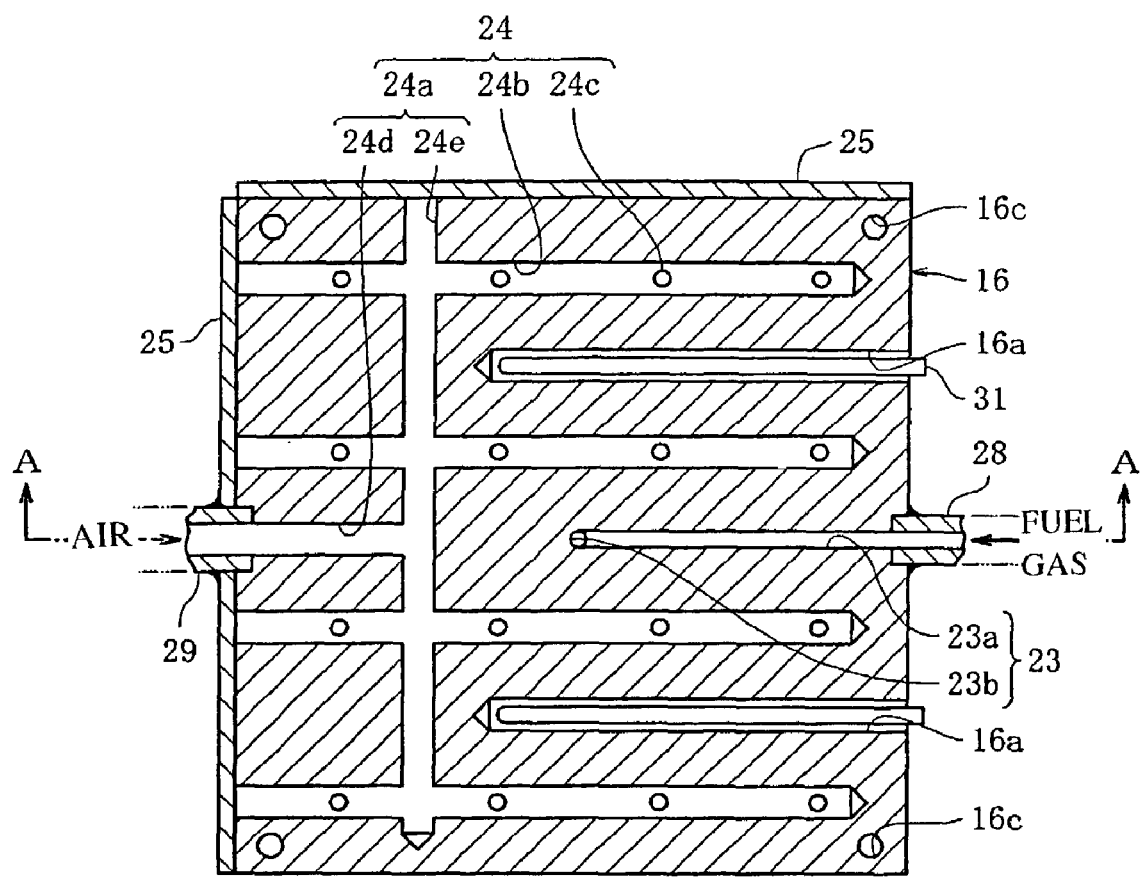
FIG. 3 is a sectional view taken along line B-B of FIG. 2

It is preferable that the separator 16 is made of one of stainless steel, nickel base alloy and chromium base alloy. For example, SUS 316, SUS 430, Inconel 600, Hastelloy X (trade name of Haynes Stellite Co.), Heynes alloy 214, etc. can be listed. Besides, a fuel supply passage 23, an air supply passage 24 (oxidant supply passage), and plural insertion holes 16a are formed in the separator 16 (FIGS. 2 and 3). The fuel supply passage 23 includes a first fuel hole 23a directed toward an almost central part from the outer peripheral surface of the separator 16, and a second fuel hole 23b communicating with the first fuel hole 23a and facing the fuel electrode current collecting body 17 from the almost central part of the separator 16. Besides, the air supply passage 24 includes a substantially T-shaped first air hole 24a in which it is formed to extend in the direction orthogonal to the thickness direction of the separator 16, a base end is open at the outer peripheral surface of the separator 16, and a tip end is closed, plural second air holes 24b extending in the direction orthogonal to the thickness direction of the separator 16, formed at predetermined intervals with each other, communicating with the first air hole 24a, and having both ends closed, and a large number of third air holes 24c formed on the surface of the separator 16 opposed to the air electrode current collecting body 18 at predetermined intervals, and communicating with the second air holes 24b.

The first air hole 24a is constituted by a base hole (base passage) 24d having the same hole core as the first fuel hole 23a, and a distribution hole (first air passage) 24e communicating with the base hole 24d, communicating with the plural second air holes (second air passages) 24b, and having both ends closed. With respect to the distribution hole 24e, after a hole is formed to be orthogonal to the base hole 24d from a side adjacent to one side of the separator 16 in which the base end of the base hole 24d is formed, a closing plate 25 is joined to the adjacent side so that it becomes a long hole the both ends of which are closed. Besides, with respect to the plural second air holes 24b, after holes are formed in parallel with the base hole 24d from one side of the separator 16 in which the base end of the base hole 24d is formed, a closing plate 25 is joined to the side so that they become plural long holes the both ends of which are closed. The plural insertion holes 16a are formed to be parallel with the first fuel hole 23a and the second air hole 24b so as not to communicate with any of the fuel supply passage 23 and the air supply passage 24, and first heaters 31 are respectively inserted in the insertion holes 16a (FIG. 3). Besides, three slits 16b are spirally formed on the surface of the separator 16 opposed to the fuel electrode current collecting body 17 from the almost central part of the separator 16 (FIG. 4), and the depths of the slits 16b are formed to equal over the whole length. Incidentally, the number of the slits may be two or not less than four, not three. Besides, the depth of the slit may be formed to become deep or shallow as it goes away from the center of the separator.

The plural insertion holes 16a are formed to be parallel with the first fuel hole 23a and the second air hole 24b so as not to communicate with any of the fuel supply passage 23 and the air supply passage 24, and first heaters 31 are respectively inserted in the insertion holes 16a (FIG. 3). Besides, three slits 16b are spirally formed on the surface of the separator 16 opposed to the fuel electrode current collecting body 17 from the almost central part of the separator 16 (FIG. 4), and the depths of the slits 16b are formed to equal over the whole length. Incidentally, the number of the slits may be two or not less than four, not three. Besides, the depth of the slit may be formed to become deep or shallow as it goes away from the center of the separator.

Returning to FIG. 2, the fuel electrode current collecting body 17 is made of stainless steel, nickel base alloy, chromium base alloy, nickel, silver, silver alloy, platinum or copper to be porous, and in the case where it is formed of stainless steel, nickel base alloy, or chromium base alloy, it is preferable to perform nickel plating, silver plating, silver plating through nickel first plating, or copper plating. The air electrode current collecting body 18 is made of stainless steel, nickel base alloy, or chromium base alloy, subjected to silver plating, silver plating through nickel first plating, or platinum plating, or silver, silver alloy or platinum to be porous, and in the case where it is made of stainless steel, nickel base alloy, or chromium base alloy, it is preferable to perform silver plating, silver plating through nickel first plating, or platinum plating. Incidentally, in the case where hydrocarbon is used as the fuel gas, the fuel electrode current collecting body is made of stainless steel, nickel base alloy or chromium base alloy, subjected to nickel plating, or nickel, and in the case where hydrogen is used as the fuel gas, the fuel electrode current collecting body is made of stainless steel, nickel base alloy or chromium base alloy, subject to silver plating, silver plating through nickel first plating, or copper plating, or silver, silver alloy, platinum or copper. An example of a manufacturing method of the fuel electrode current collecting body 17 will be described below. First, after an atomized powder of stainless steel or the like and HPMC (water soluble resin binder) are kneaded, distilled water and an additive (n-hexane (organic solvent), DBS (surfactant), glycerin (plasticizer), etc.) are added and kneaded to prepare a mixed slurry. Next, after a molded body is formed from the mixed slurry by a doctor blade method, foaming, degreasing and sintering are carried out under predetermined conditions to obtain a porous plate. Further, the porous plate is cut into a piece of a predetermined size to prepare the fuel electrode current collecting body 17. Incidentally, in the case where the atomized powder of stainless steel is used, the surface is subjected to nickel plating, chromium plating, silver plating, or silver plating through nickel first plating. Besides, the air electrode current collecting body 18 is also formed in substantially the same manner as the fuel electrode current collecting body 17. The air end plate 21 and the fuel end plate 22 are made of the same material as the separator 16 to have the same shape (square plate shape). The air supply passage 27 and plural insertion holes (not shown) are formed in the air end plate 21, and the fuel supply passage 26 and plural insertion holes (not shown) are formed in the fuel end plate 22. The air supply passage 27 is formed in the same manner as the air supply passage 23, and includes a T-shaped first air hole 27a formed to extend in the direction orthogonal to the thickness direction of the air end plate 21, having a base end open at an outer peripheral surface of the air end plate 21, and having a closed tip, plural second air holes (not shown) extending in the direction orthogonal to the thickness direction of the air end plate 21, formed to be arranged at predetermined intervals, communicating with the first air hole 27a, and having both ends closed, and a large number of third air holes (not shown) formed in the surface of the air end plate 21 opposed to the air electrode current collecting body 18 at predetermined intervals and communicating with the second air holes. Besides, the fuel supply passage 26 is formed in the same manner as the fuel supply passage 23, and includes a first fuel hole 26a directed toward the almost central part from the outer peripheral surface of the fuel end plate 22, and a second fuel hole 26b communicating with the first fuel hole 26a and facing the fuel electrode current collecting body 17 from the almost central part of the fuel end plate 22. The first air hole 27a formed in the air end plate 21 is constituted by a base hole 27d and a distribution hole 27e communicating with the base hole 27d, communicating with the plural second air holes, and having both ends closed. With respect to the distribution hole 27e, after a hole is formed to be orthogonal to the base hole 27d from a side adjacent to one side of the air end plate 21 in which the base end of the base hole 27d is formed, a closing plate 25 is joined to the adjacent side, so that it becomes a long hole both ends of which are closed. With respect to the plural second air holes, after holes are formed to be parallel with the base hole 27d from one side of the air end plate 21 in which the base end of the base hole 27d is formed, a closing plate is joined to the side so that they become plural long holes both ends of which are closed. Besides, the plural insertion holes of the air end plate 21 are formed to be parallel with the second air holes so as not to communicate with the air supply passage 27, and heaters (not shown) are respectively inserted in the insertion holes. The plural insertion holes of the fuel end plate 22 are formed to be parallel with the first fuel hole 26a so as not to communicate with the fuel supply passage 26, and heaters (not shown) are respectively inserted in the insertion holes. Three slits 22b are spirally formed from an almost central part of the fuel end plate 22 on the surface of the fuel end plate 22, that is, the surface of the fuel end plate 22 opposed to the fuel electrode current collecting body 17 (FIG. 2). The depths of the slits 22b are formed to be identical over the whole length. Incidentally, the number of the slits may be two or not less than four, not three. Besides, the depth of the slit may be formed to become deep or shallow as it goes away from the center of the separator.

Figure 4:
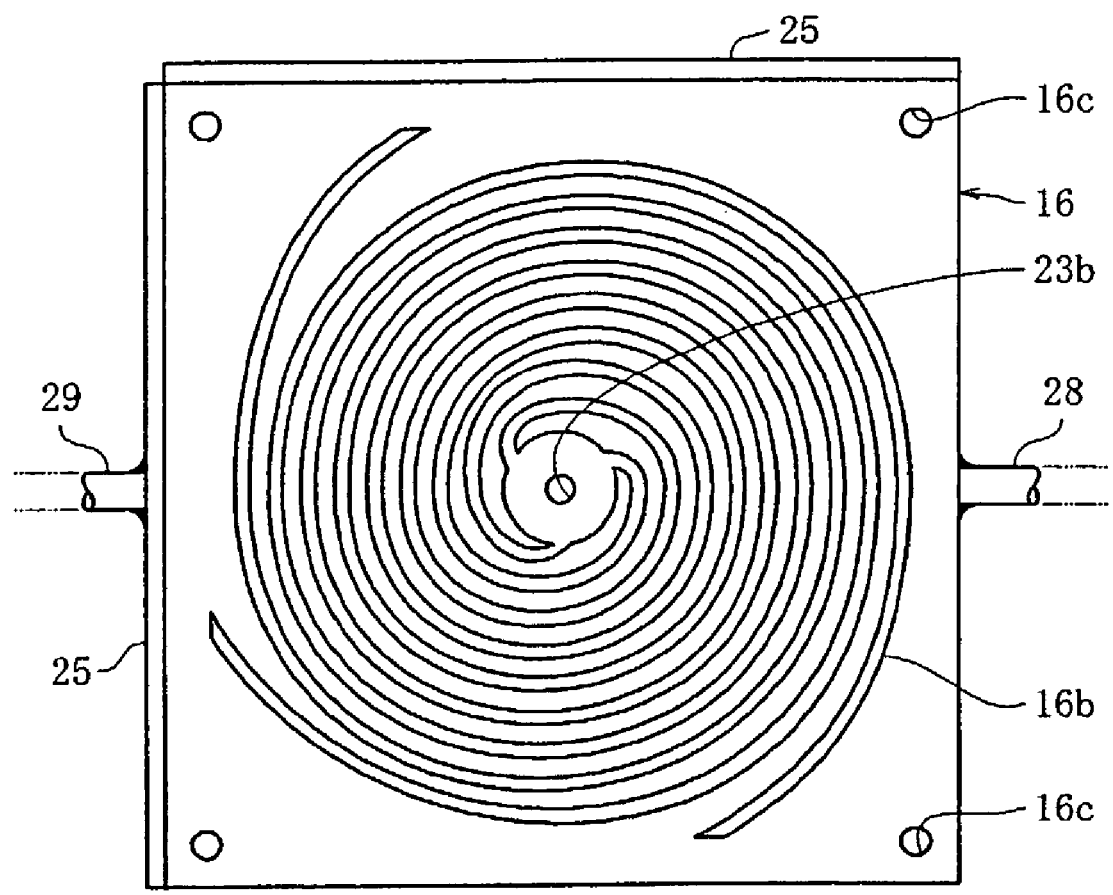
FIG. 4 is a sectional view taken along line C-C of FIG. 2.

Further, through holes 16c through which bolts (not shown) can be inserted are formed at four corners of the separator 16, the air end plate 21 and the fuel end plate 22 (FIGS. 3 and 4). When the (n+1) power generating cells 12, the separators 16, the (n+1) fuel electrode current collecting bodies 17, the (n+1) air electrode current collecting bodies 18, the single air end plate 21, and the single fuel end plate 22 are laminated, after bolts are inserted through the open holes 16c formed at the four corners of the separator 16, the air end plate 21 and the fuel end plate 22, nuts are fitted to the tips of the bolts, so that the fuel cell 11 is fixed in the laminated state.

Returning to FIG. 1, the fuel distributor 13 and the air distributor 14 extend in the laminating direction of the power generating cells 12 to be respectively provided, and are formed into a tube shape both ends of which are closed. The fuel distributor 13 are connected with the first fuel holes 23a of the fuel supply passages 23 of the n separators 16 and the first fuel hole 26a of the fuel supply passage 26a of the single fuel end plate 22 through the (n+1) fuel short pipes 28, and the air distributor 14 is connected with the first air holes 24a of the air supply passages 24 of the n separators 16 and the first air hole 27a of the air supply passage 27 of the single air end plate 21 through the (n+1) air short pipes 29. In this embodiment, the fuel distributor 13, the air distributor 14, the fuel short pipe 28, and the air short pipe 29 are made of conductive material such as stainless steel, nickel base alloy or chromium base alloy.

In order to secure the electrical insulation between the fuel short pipe 28 and the fuel distributor 13, a fuel insulating pipe 36 made of electrical insulation material such as alumina is interposed between the fuel short pipe 28 and the fuel distributor 13, and the gap between them is sealed by a fuel sealing member 37 having electrical insulation, such as glass or cement. Besides, in order to secure the electrical insulation between the air short pipe 29 and the air distributor 14, an air insulating pipe 38 made of electrical insulation material such as alumina is interposed between the air short pipe 29 and the air distributor 14, and the gap between them is sealed by an air sealing member 39 having electrical insulation, such as glass or cement. A pair of electrode terminals 41 and 42 (electrode rod in this embodiment) are electrically connected to the center of an upper surface of the air end plate 21 and the center of a lower surface of the fuel end plate 22. A fuel preheating pipe 43 is connected to an upper outer peripheral surface of the fuel distributor 13, and the fuel preheating pipe 43 is spirally wound with a predetermined interval from an outer peripheral surface of the fuel cell 11 and with an axial line of the pair of electrode terminals 41 and 42 as the center. Besides, an air preheating pipe 44 (oxidant preheating pipe) is connected to an outer peripheral surface of the air distributor 14, and the air preheating pipe 44 is spirally wound with a predetermined interval from an outer peripheral surface of the fuel cell 11 and with an axial line of the pair of electrode terminals 41 and 42 as the center. Further, a second heater 32 is spirally wound around the outer peripheral surface of the fuel cell 11 with a predetermined interval from the outer peripheral surface of the fuel cell 11 and with the axial line of the pair of electrode terminals 41 and 42 as the center. The spiral diameter of the fuel preheating pipe 43 is formed to be smaller than the spiral diameter of the air preheating pipe 44, and the spiral diameter of the second heater 32 is formed to have an intermediate value between the spiral diameter of the fuel preheating pipe 43 and the spiral diameter of the air preheating pipe 44. In this embodiment, the fuel preheating pipe 43 and the air preheating pipe 44 are made of stainless steel, nickel base alloy, chromium base alloy or the like. Besides, the air preheating pipe 44 is connected to the almost central part of the air distributor 14 in the longitudinal direction. This object is such that Joule heat is generated by inner resistance of the fuel cell 11 during power generation, the center portion of the fuel cell 11 in the laminating direction becomes hottest, and the relatively low temperature oxidant gas is supplied to this portion through the air preheating pipe 44 and the air distributor 14 so that uniform heating of the power generating cell 12 is held.

The fuel cell 11, together with the spiral fuel preheating pipe 43, the spiral air preheating pipe 44, and the spiral second heater 32, is received in an inner case 46. A first exhaust pipe 51 and a second exhaust pipe 52 for guiding the fuel gas and the air exhausted from the power generating cell 12 to the outside of the inner case 46 are connected to a lower outer peripheral surface and an upper surface of the inner case 46. The outer surface of the inner case 46 is covered with a heat insulating material 47, and the fuel preheating pipe 43, the air preheating pipe 44, and the first exhaust pipe 51 are spirally wound around the outer peripheral surface of the inner case 46. In this embodiment, the first exhaust pipe 51 is formed to have a diameter larger than the fuel preheating pipe 43 and the air preheating pipe 44, and are spirally wound with a predetermined interval from the outer peripheral surface of the inner case 46 in a state where the fuel preheating pipe 43 and the air preheating pipe 44 are loosely inserted therein. Incidentally, the fuel preheating pipe and the air preheating pipe are not loosely inserted in the inside of the first exhaust pipe, but may be spirally wound around the outer peripheral surface of the inner case in a state where they are put into close contact with the outer peripheral surface of the first exhaust pipe.

The inner case 46, together with the spiral first exhaust pipe 51, the fuel preheating pipe 43 and the air preheating pipe 44 loosely inserted in the first exhaust pipe 51, and the heat insulating material 47, is received in an outer case 48. The first exhaust pipe 51, together with the fuel preheating pipe 43 and the air preheating pipe 44 loosely inserted in the first exhaust pipe 51, protrudes outside of the outer case 48 from the upper outer peripheral surface of the outer case 48, and the fuel preheating pipe 43 and the air preheating pipe 44 protrude outside of the first exhaust pipe 51 through this protruding portion. A tip of a water supply pipe 49 for mixing water vapor with the fuel gas in the fuel preheating pipe 43 is inserted in the fuel preheating pipe 43 protruding from the first exhaust pipe 51, and a spray (not shown) is connected to the water supply pipe 49. It is preferable that the tip of the water supply pipe 49 is positioned in the outer case 48. Incidentally, as the fuel gas, for example, methane gas ($CH_4$) can be mentioned. Although not shown, a structure is adopted such that misty water jetted from the spray is vaporized by heat of the exhaust gas passing through the second exhaust pipe 52 and becomes water vapor. Reforming particles (not shown) are filled in the fuel preheating pipe 43 at such a density that the fuel gas can flow. It is preferable that the reforming particle is made of one kind of or not less than two kinds of elements or oxides selected from a group consisting of Ni, NiO, $Al_2O_3$, $SiO_2$, MgO, CaO, $Fe_2O_3$, $Fe_3O_4$, $V_2O_3$, $NiAl_2O_4$, $ZrO_2$, SiC, $Cr_2O_3$, $ThO_2$, $Ce_2O_3$, $B_2O_3$, $MnO_2$, ZnO, Cu, BaO, and $TiO_2$.

A water separator 53 is connected to the lowermost end, positioned in the inner case 46, of the fuel preheating pipe 43 spirally wound around the fuel cell 11. This structure is such that when the fuel cell module 10 is stopped, the temperature is lowered, and water vapor is liquefied into water, this water is stored in the water separator 53. As a result, even when the fuel cell module 10 is restarted, since water is not supplied to the power generating cell 12 while it is liquid, the performance of the power generating cell 12 is not lowered, and the power generating cell 12 is not damaged. Incidentally, the water separator may be connected to the fuel preheating pipe outside of the inner case.

Besides, a cooling pipe 56 capable of supplying cooling air (cooling oxidant gas) to the air preheating pipe 44 is connected to an upper end, positioned in the inner case 46, of the air preheating pipe 44 spirally wound around the fuel cell 11. Besides, in the air preheating pipe 44, a mixing portion for mixing the air in the air preheating pipe 44 and the cooling air in the cooling pipe 56 is connected between a connection portion of the cooling pipe 56 and a connection portion of the air distributor 14. Although not shown, a baffle plate, an agitator and the like, for mixing the air and the cooling air, are incorporated in this mixing portion.

Besides, a temperature sensor 58 for detecting the temperature of the fuel cell 11 is inserted in the fuel cell 11, and a flow regulating valve 59 for regulating the flow rate of the cooling air is provided in the cooling pipe 56. The detection output of the temperature sensor 58 is connected to the control input of a controller (not shown), and the control output of the controller is connected to the flow regulating valve 59. Incidentally, reference numeral 54 of FIG. 1 designates insulating rings for electrically insulating the inner case 46 and the outer case 48 from the pair of electrode terminals 41 and 42.

The operation of the fuel cell module 10 constructed as stated above will be described. The fuel gas (for example, methane gas ($CH_4$)) is supplied to the fuel preheating pipe 43, water ($H_2O$) is supplied from the water supply pipe 49 to the fuel preheating pipe 43 to form water vapor, and this water vapor is mixed with the fuel gas. On the other hand, air (oxidant gas) is supplied to the air preheating pipe 44. The fuel gas including the water vapor is heated in the fuel preheating pipe 43 inserted in the first exhaust pipe 51 by heat exchange with high temperature exhaust gas (mixture gas of the fuel gas and the oxidant gas exhausted from the power generating cell 12) while spirally going around the outer peripheral surface of the inner case 46, and the air is heated in the air preheating pipe 44 inserted in the first exhaust pipe 51 by heat exchange with the high temperature exhaust gas while spirally going around the outer peripheral surface of the inner case 46. Besides, since the first exhaust pipe 51 in which the fuel preheating pipe 43 and the air preheating pipe 44 are loosely inserted is covered with the heat insulating material 47, the exhaust gas passing through the inside of the first exhaust pipe 51 is hard to cool.

When the fuel gas and the air heated while spirally going around the outer peripheral surface of the inner case 46 enters the inner case 46, they go out of the first exhaust pipe 51 and spirally go around the outer peripheral surface of the fuel cell 11. At this time, the fuel gas passing through the inside of the fuel preheating pipe 43 is heated by the high temperature exhaust gas exhausted from the power generating cell 12 and the second heater 32. Since the reforming particles are filled in the fuel preheating pipe 43, when the fuel gas including the water vapor is heated as described above, the fuel gas including the water vapor is reformed by the reforming particles (for example, reformed into hydrogen gas ($H_2$)), and is supplied to the fuel distributor 13. Besides, the air passing through the inside of the air preheating pipe 44 is also heated by the high temperature exhaust gas and the second heater 32, and is supplied to the air distributor 14.

When the fuel gas heated to the temperature optimum for power generation and reformed is introduced to the fuel distributor 13, the fuel gas passes through the fuel short pipe and the fuel supply passages 23 and 26, and is discharged from the separator 16 and the almost central part of the fuel end plate 22 toward the center of the fuel electrode current collecting body 17. By this, the fuel gas passes through pores in the fuel electrode current collecting body 17, and is quickly supplied to the almost central part of the fuel electrode layer 12b, and is further guided by the slits 16b and 22b to spirally flow from the almost central part of the fuel electrode layer 12b toward the outer peripheral edge. When the air heated to the optimum temperature for the power generation is introduced into the air distributor 14 at the same time, the air passes through the air short pipe 29 and the air supply passages 24 and 27, and is discharged like a shower toward the air electrode current collecting body 18 from the many third air holes 24c of the separator 16 and the many third air holes of the air end plate 21. By this, the air passes through the pores in the air electrode current collecting body 18 and is substantially uniformly supplied to the air electrode layer 12c.

The air supplied to the air electrode layer 12c passes through pores in the air electrode layer 12c to reach the vicinity of the interface with the solid electrolyte layer 12a, and oxygen in the air receives electrons from the air electrode layer 12c and is ionized into an oxide ion ($O^{2-}$). The oxide ion diffuses and moves in the solid electrolyte layer 12a in the direction toward the fuel electrode layer 12b, and when reaching the vicinity of the interface with the fuel electrode layer 12b, the ion reacts with the fuel gas at this portion to produce a reaction product (for example, $H_2O$), and releases electrons to the fuel electrode layer 12b.

Current is generated by extracting the electrons by the fuel electrode current collecting body 17, and the electric power is obtained. As described above, since the fuel gas is discharged from the almost central part of the separator 16 and the almost central part of the fuel end plate 22 and is guided by the slits 16b and 22b, the reaction passage of the fuel gas becomes long. As a result, since the fuel gas collides with the fuel electrode layer 12b extremely many times until the fuel gas reaches the outer peripheral edges of the separator 16 and the fuel end plate 22, the number of the reactions is increased, and the performance of the fuel cell 11 can be increased. Accordingly, as the outer diameters of the separator 16 and the fuel end plate 22 become large, the reaction passage of the fuel gas becomes long, and the number of the reactions is increased in accordance with this, which results in the improvement of the output of the fuel cell 11. Incidentally, the (n+1) power generating cells 12 are connected in series through the separators 16 made of conductive material, the fuel electrode current collecting body 17, and the air electrode current collecting body 18, and the pair of electrode terminals 41 and 42 are provided on the air end plate 21 and the fuel end plate 22 at both ends of the fuel cell 11, so that large electric power can be extracted from the electrode terminals 41 and 42.

Besides, as compared with a conventional fuel cell, that is, as compared with a fuel cell in which a reaction occurs only in the vicinity of a portion where an anode is in contact with a cathode, power generation efficiency is lowered, and an air electrode current collecting body and a fuel electrode current collecting body are not included, in the fuel cell module 10 of the invention, since the entire surface of the power generating cell 12 contributes to power generation, the power generation efficiency is improved. Besides, at the time of start-up of the fuel cell module 10, since the temperature of the power generating cell 12 can be quickly raised by energizing the first heater 31, a heating-up time can be shortened, and further, since the temperature of the power generating cell 12 is uniformly raised, and a temperature difference between the center and the outer peripheral edge of the power generating cell 12 disappears to cause uniform thermal expansion, damage of the power generating cell 12 can be prevented. Incidentally, in the case where the heater is not inserted in the insertion hole, that is, in the case where the insertion hole is made a weight lightening hole, since the weight of the separator, the air end plate and the fuel end plate can be reduced, weight lightening of the fuel cell can be realized.

Besides, it is preferable that both surfaces of the inner case 46 and the inner surface of the outer case 48 are subjected to silver plating, silver plating through nickel first plating, or platinum plating, and further, the outer surfaces of the fuel short pipe 28, the fuel distributor 13, the fuel preheating pipe 43, the air short pipe 29, the air distributor 14, and the air preheating pipe 44 are subjected to silver plating, silver plating through nickel first generated by the power generating cell 12 during the operation of the fuel cell 11 can be used for heat insulation of the plating, or platinum plating. By this, radiation heat fuel preheating pipe 43 and the oxidant preheating pipe 44, and the heat insulating effect of the power generating cell 12 and the separator 16 can be raised. Besides, it is preferable that the fuel preheating pipe 43, the fuel distributor 13, the fuel short pipe 28, the oxidant preheating pipe 44, the oxidant distributor 14, and the oxidant short pipe 27 are made of one of stainless steel, nickel base alloy, and chromium base alloy, and the inner surface is subjected to silver plating, silver plating through nickel first plating, or platinum plating. By this, the inner parts of the oxidant preheating pipe 44, the oxidant distributor 14, and the oxidant short pipe 27 are not oxidized, and production of oxide scale (powder oxide) can be suppressed. On the other hand, although water vapor exists inside the fuel preheating pipe 43, the fuel distributor 13 and the fuel short pipe 28, which have reduction atmosphere, production of oxide scale by the water vapor can be suppressed. Besides, it is preferable that the inner surfaces of the fuel preheating pipe 43, the fuel distributor 13, and the fuel short pipe 28 are plated with nickel. By this, a reforming reaction of hydrocarbon is enabled inside the fuel preheating pipe 43, the fuel distributor 13, and the fuel short pipe 28.

On the other hand, since the many third air holes 24c are formed side by side at predetermined intervals on the lower surface of the separator 16 and the lower surface of the air end plate 21, the air is substantially uniformly discharged from the lower surface of the separator 16 and the lower surface of the air end plate 21. As a result, the power generating cell 12 can be uniformly heated and cooled by the air. Especially, when the power generating cell 12 is heated and exceeds a set temperature (for example, 650° C.) by generation of Joule heat during the power generation of the fuel cell module 10, the air having a temperature (for example 630° C.) slightly lower than the set temperature is discharged from the air supply passages 24 and 27, so that the power generating cell 12 can be uniformly cooled, and therefore, damage of the power generating cell 12 by local heating or cooling can be prevented. Besides, temperature control of the fuel cell 11 can be performed by control of the flow regulating valve 59 of the controller on the basis of the detection output of the temperature sensor 58. That is, when the temperature sensor 58 detects that the fuel cell 11 exceeds the set temperature (for example, 650° C.) during the operation of the fuel cell 11, the controller changes the opening degree of the flow regulating valve 59 on the basis of the detection output of the temperature sensor 58, mixes the cooling air passing through the cooling pipe 56 with the air passing through the air preheating pipe 44, and supplies the air having a temperature (for example, 630° C.) lower than the set temperature to the fuel cell 11.

Further, the fuel electrode current collecting bodies 17 made of stainless steel, nickel base alloy, or chromium base alloy, subjected to nickel plating, silver plating, silver plating through nickel first plating, or copper plating, or nickel, silver, silver alloy, platinum, or copper are respectively joined to the upper surfaces of the separators 16 and the fuel end plate 22, made of stainless steel, nickel base alloy, or chromium base alloy, and the air electrode current collecting bodies 18 made of stainless steel, nickel base alloy or chromium base alloy, subjected to silver plating, silver plating through nickel first plating, or platinum plating, or silver, silver alloy, or platinum are respectively joined to the lower surfaces of the separators 16 and the fuel end plate 22, made of stainless steel, nickel base alloy, or chromium base alloy, even if the separator 16 and the air end plate 21 are exposed to the air at a high temperature, that is, even if the separator 16 and the air end plate 21 are exposed to the high temperature oxidation atmosphere, since a joined portion between the separator 16 and the air electrode current collecting body 18, and a welded joined portion between the air end plate 22 and the air electrode current collecting body 18 are welded, oxidation of these joined portions can be prevented. As a result, not only electrical continuity between the separator 16 and the fuel electrode current collecting body 17, and electrical continuity between the fuel end plate 22 and the fuel electrode current collecting body 17, but also electrical continuity between the separator 16 and the air electrode current collecting body 18, and electrical continuity between the air end plate 21 and the air electrode current collecting body 18 can be kept for a long period of time, the assembling operation time of the fuel cell module 10 can be shortened by the joining, and the assembling operation property can be improved. Incidentally, silver soldering, spot welding, or laser welding can be enumerated as the joining method. Besides, when the separator 16, the air end plate 21, and the fuel end plate 22 made of stainless steel, nickel base alloy, or chromium base alloy is subjected to nickel plating, chromium plating, silver plating or silver plating through nickel first plating, electrical continuity between the separator 16, the air end plate 21, or the fuel end plate 22 and the fuel electrode current collecting body 17 or the air electrode current collecting body 18 can be further kept for a long period of time.

Incidentally, in the above embodiment, although the air is used as the oxidant gas, oxygen or other oxidant gases may be used.

Besides, in the above embodiment, as the fuel cell, although the solid oxide fuel cell is mentioned in which the power generating cell is constituted by sandwiching the solid electrolyte layer between the fuel electrode layer and the air electrode layer (oxidant electrode layer), a solid polymer fuel cell, a carbonate molten salt fuel cell or a phosphoric acid fuel cell may be used. Besides, in the above embodiment, although the separator is made of stainless steel, nickel base alloy, or chromium base alloy, it may be made of ceramic having conductivity, such as lanthanum chromite (Lao.9Sro.1CrO3).

Besides, in the above embodiment, although the first heaters are respectively inserted in the insertion holes of the separator, the air end plate, and the -fuel end plate, the first heater and a temperature sensor (temperature measurement thermocouple) may be alternately inserted. In this case, the first heater is controlled on the basis of the detection output of the temperature sensor, so that the temperature of the separator can be finely controlled.

Besides, in the above embodiment, although the tip of the water supply pipe is inserted in the fuel preheating pipe, and the spray is connected to the water supply pipe, the tip of the water supply pipe may be inserted in the upper part of the fuel preheating pipe, and a pump may be connected to the base end of the water supply pipe. In this case, the water supplied to the fuel preheating pipe is vaporized by the heat of the exhaust gas passing through the second exhaust pipe as it goes down the fuel preheating pipe. Further, the exhaust pipes 51 and 52 for guiding the fuel gas and the oxidant gas exhausted from the power generating cell 12 to the outside of the inner case 46 and the outer case 48 may be connected to a water vapor turbine. In this case, water is heated using the high temperature exhaust gas exhausted from the fuel cell module 10 to generate compressed water vapor, and the compressed water vapor is jetted to the turbine to rotate it, so that a generator is rotated and heat energy can be converted into electrical energy.

A gas supply structure to a fuel cell according to a second embodiment of the invention will be described on the basis of the drawings.

Figure 5:
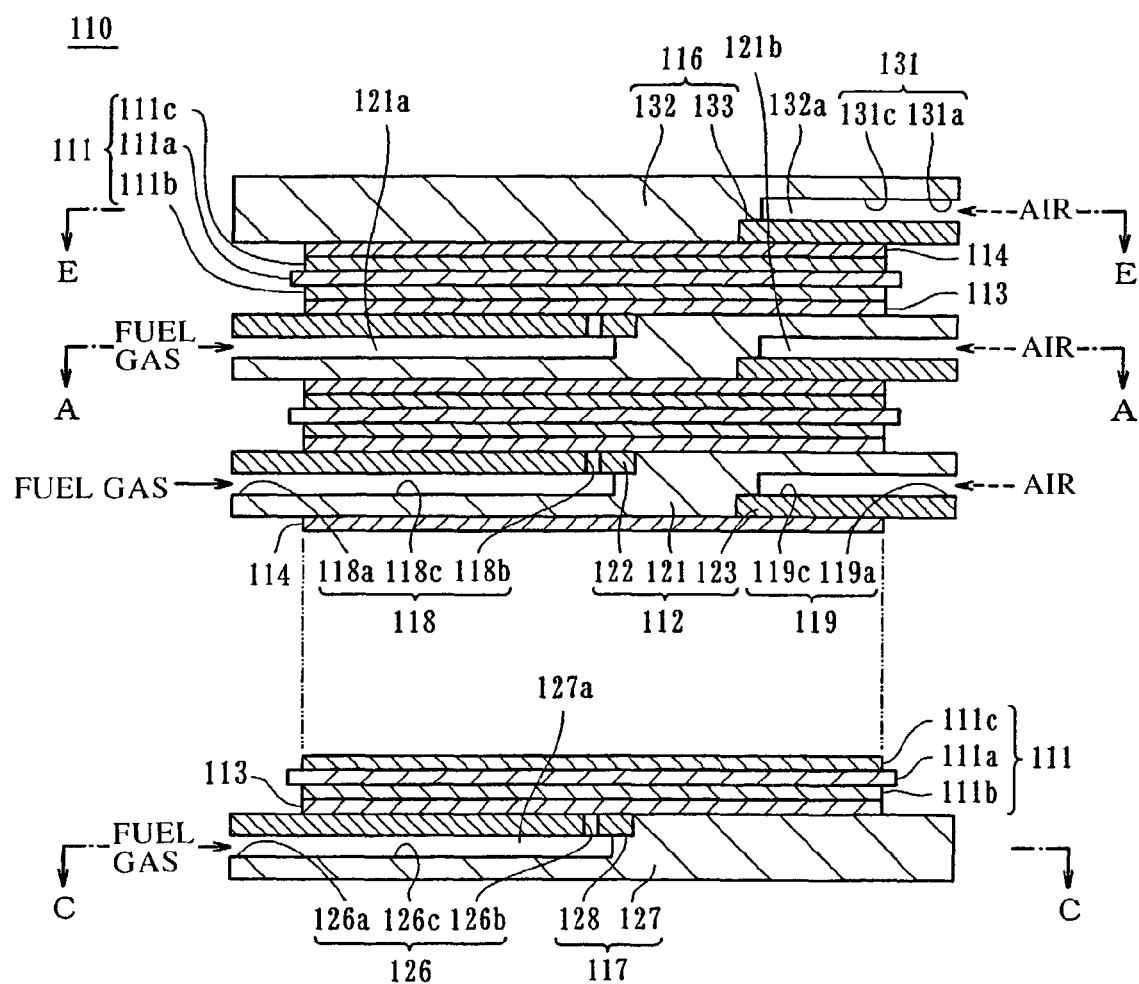
FIG. 5 is a longitudinal sectional view of a fuel cell according to a second embodiment of the invention.
Figure 6:
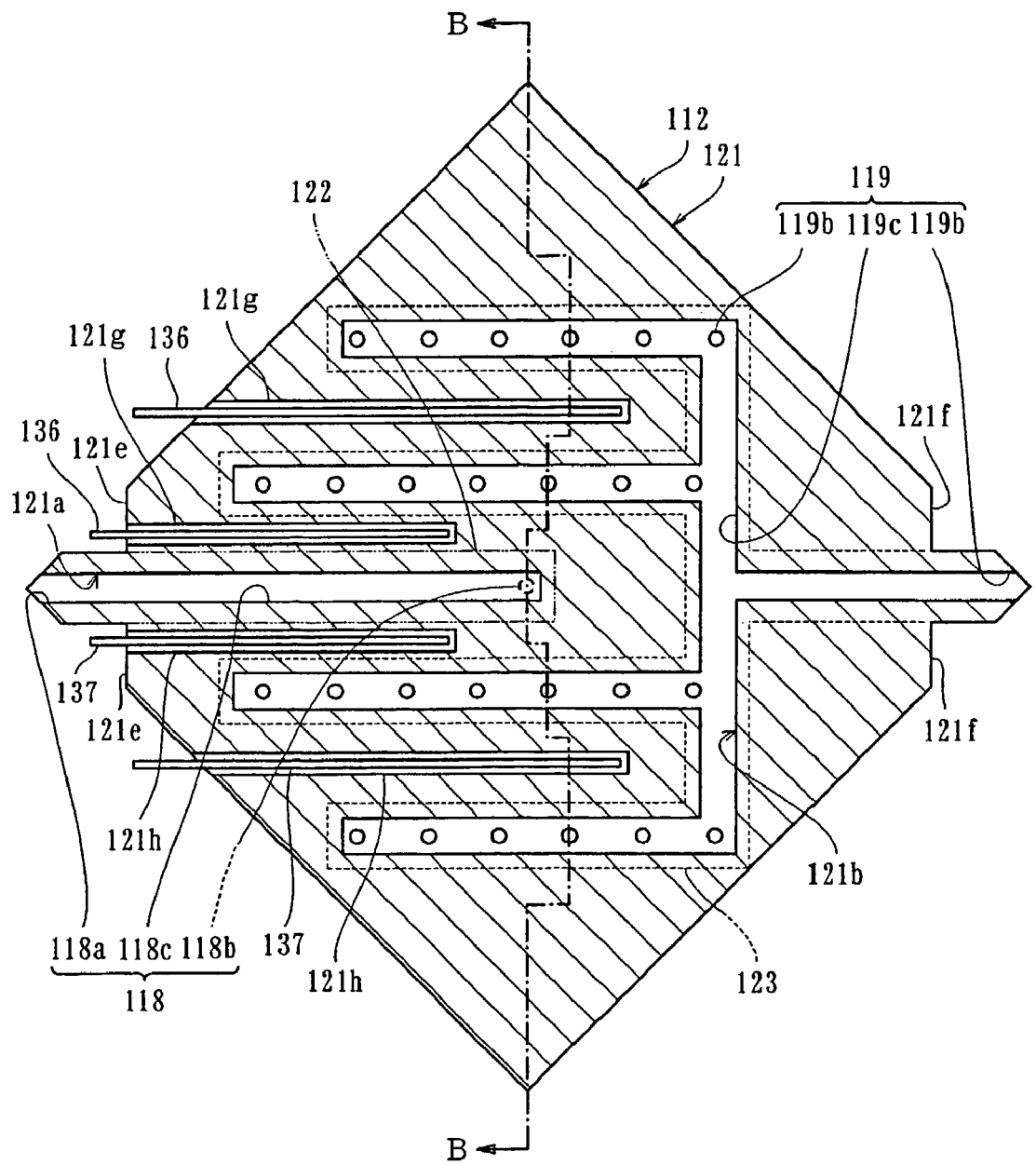
FIG. 6 is a sectional view taken along line A-A of FIG. 5.
Figure 7:
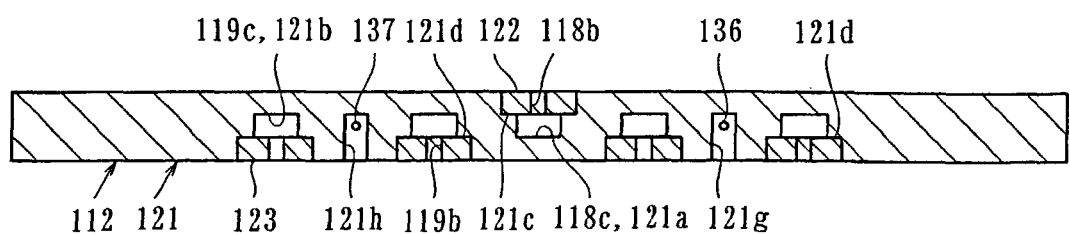
FIG. 7 is a sectional view taken along line B-B of FIG. 6.

Similarly to the fuel cell 11 shown in FIG. 1, a fuel cell 110 shown in FIG. 5 is constituted by laminating (n+1) power generating cells 111. A solid electrolyte layer 111a, a fuel electrode layer 111b, an air electrode layer (oxidant electrode layer) 111c, a separator 112, a fuel electrode current collecting body 113, an air electrode current collecting body (oxidant electrode current collecting body) 114, an air end plate (oxidant end plate) 116, and a fuel end plate 117 are respectively laminated similarly to the solid electrolyte layer 12a, the fuel electrode layer 12b, the air electrode layer (oxidant electrode layer) 12c, the separator 16, the fuel electrode current collecting body 17, the air electrode current collecting body (oxidant electrode current collecting body) 18, the air end plate (oxidant end plate) 21, and the fuel end plate 22 in FIG. 1. Each of the separator 112, the air end plate 116, and the fuel end plate 117 is formed to have a square plate shape with a diameter of the fuel electrode layer 111b or the like as a length of one side. Incidentally, the solid electrolyte layer, the fuel electrode layer, the air electrode layer, the fuel electrode current collecting body, and the air electrode current collecting body may be formed to have a polygonal plate shape such as a tetragonal plate shape, a hexagonal plate shape or an octagonal plate shape, not the disk shape. Besides, the separator, the air end plate, and the fuel end plate may be formed to have a disk shape or a polygonal plate shape such as a rectangular plate shape, a hexagonal plate shape or an octagonal plate shape, not the square plate shape. The solid electrolyte layer lila, the fuel electrode layer iiib, and the air electrode layer iiic are made of similar material to that of the first embodiment. It is preferable that the separator 112, the air end plate 116, and the fuel end plate 117 are made of stainless steel, nickel base alloy or chromium base alloy. Besides, the fuel electrode current collecting body 113 is made of stainless steel, nickel base alloy or chromium base alloy, or nickel, silver or copper to be porous, and the air electrode current collecting body 114 is made of stainless steel, nickel base alloy or chromium base alloy, or silver or platinum to be porous. The separator 112 is provided with a separator fuel passage 118 for introducing fuel gas from an outer peripheral surface of the separator 112 and discharging it from a surface of the separator 112 opposed to the fuel electrode current collecting body 113, and a separator air passage 119 (separator oxidant passage) for introducing air (oxidant gas) from the outer peripheral surface of the separator 112 and discharging it from a surface of the separator 112 opposed to the air electrode current collecting body 114 (FIGS. 5 to 7). The separator fuel passage 118 includes a single separator fuel introduction hole 118a formed in the outer peripheral surface of the separator 112, a single separator fuel discharge hole 118b formed at the center of a surface of the separator 112 opposed to the fuel electrode current collecting body 113, and a separator fuel continuous hole 118c formed in the separator 112 and connecting the separator fuel introduction hole 118a and the separator fuel discharge hole 118b. Besides, the separator air passage 119 includes a single separator air introduction hole 119a (separator oxidant introduction hole) formed in the outer peripheral surface of the separator 112, plural separator air discharge holes 119b (separator oxidant discharge hole) formed at predetermined intervals in the surface of the separator 112 opposed to the air electrode current collecting body 114, and a separator air continuous hole 119c (separator oxidant continuous hole) formed in the separator 112 and connecting the separator air introduction hole 119a and the separator air discharge hole 119b.

On the other hand, the separator 112 includes a separator substrate 121 in which a separator fuel concave groove 121a is formed on an upper surface and a separator air concave groove 121b (separator oxidant concave groove) is formed on a lower surface, a separator fuel cover 122 for covering the separator fuel concave groove 121a, and a separator air cover 123 (separator oxidant cover) for covering the separator air concave groove 121b. The separator fuel concave groove 121a is formed linearly from one corner portion of the separator substrate 121 toward the center, and the separator fuel cover 122 is linearly formed correspondingly to the separator fuel concave groove 121a. Besides, the separator fuel concave groove 121a is covered with the separator fuel cover 122 to form the separator fuel introduction hole 118a and the separator fuel continuous hole 118c, and the single separator fuel discharge hole 118b is formed in the separator fuel cover 122 to be positioned at the center of the separator substrate 121.

The separator air concave groove 121b is formed like a leaf vein branching from the other corner portion of the separator substrate 121 to the one corner portion, and the separator air cover 123 is formed like a leaf vein corresponding to the separator air concave groove 121b. The separator air concave groove 121b is covered with the separator air cover 123 to form the separator air introduction hole 119a and the separator air continuous hole 119c, and the plural separator air discharge holes 119b are formed in the separate air cover 123 at predetermined intervals. Incidentally, in order to fix the separator fuel cover 122 and the separator air cover 123 to the separator substrate 121, first, the separator fuel cover 122 is inserted to a step portion 121c (FIG. 7) of the separator fuel concave groove 121a, the separator air cover 123 is inserted to a step portion 121d (FIG. 7) of the separator air concave groove 121b, and in this state, the covers 122 and 123 are spot-welded to the step portions 121c and 121d. Next, the separator substrate 121 to which the separator fuel cover 122 and the separator air cover 123 are fixed, is plated with Ag. The separator fuel cover 122 and the separator air cover 123 can be fixed to the separator substrate 121 by the relatively simple operation as stated above. Besides, the separator fuel concave groove 121a and the separator air concave groove 121b are formed in the separator substrate 121 so as not to communicate with each other.

Figure 9:
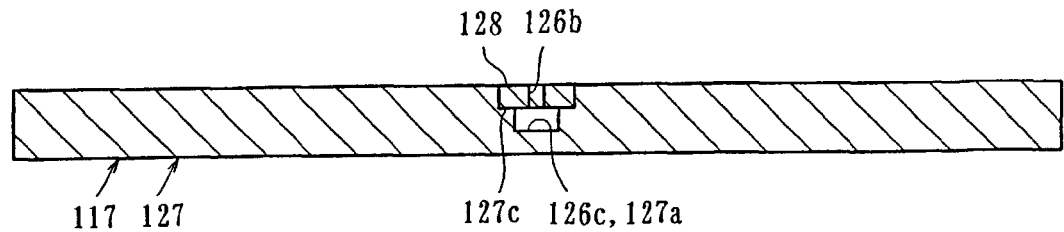
FIG. 9 is a sectional view taken along line D-D of FIG. 8.
Figure 8:
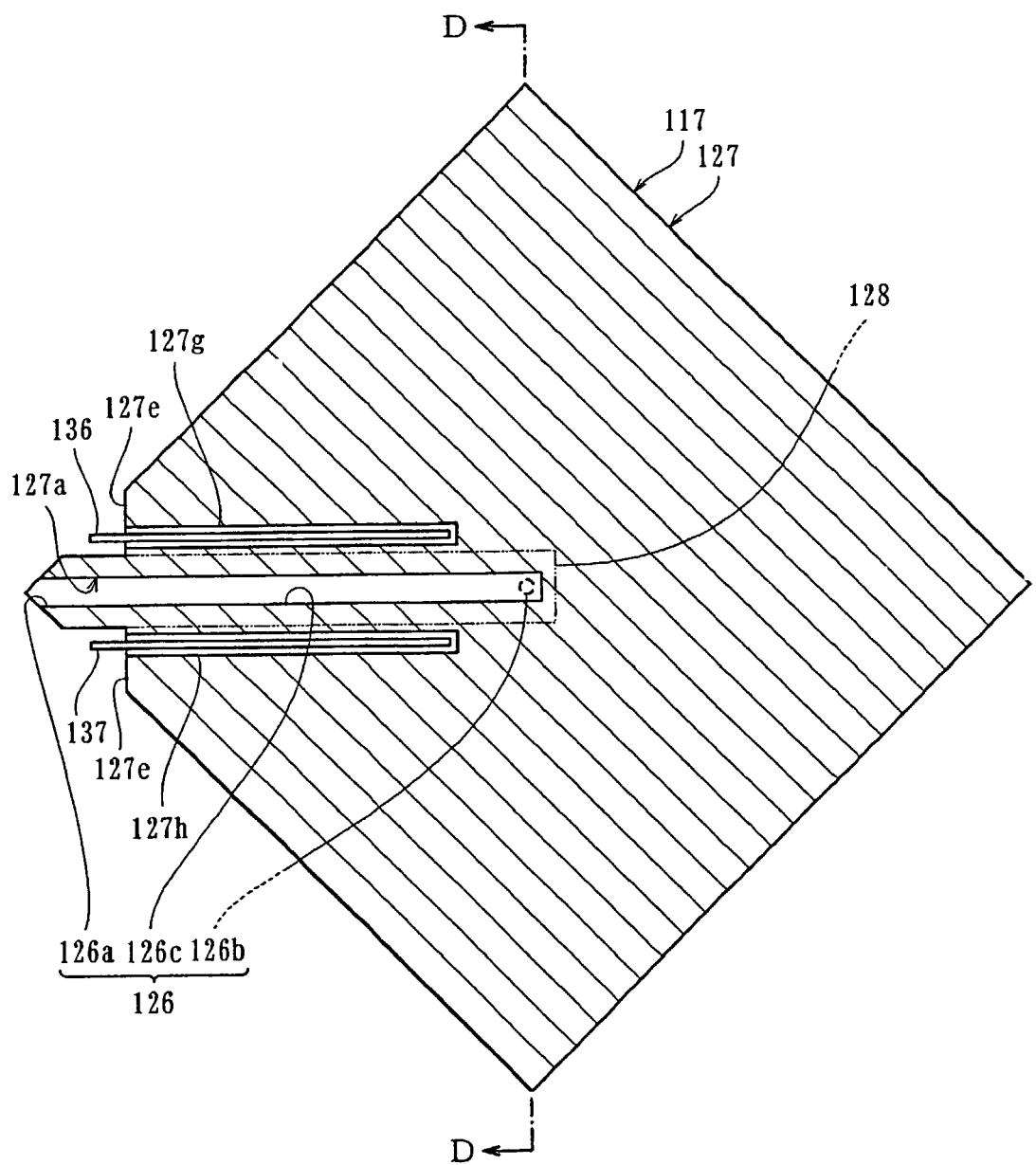
FIG. 8 is a sectional view taken along line C-C of FIG. 5.

As shown in FIG. 6 in detail, a pair of fuel notches 121e and 121e are formed at the one corner of the separator 112 in which the separator fuel introduction hole 118a is formed, and by these notches 121e and 121e, the one corner portion of the separator 112 is constructed such that it can be inserted into a fuel outlet of a not-shown fuel distributor. Besides, a pair of air notches 121f and 121f are formed at the other corner portion of the separator 112 in which the separator air introduction hole 119a is formed, and by these notches 121f and 121f, the other corner portion of the separator 112 is constructed such that it can be inserted into an air outlet of a not-shown air distributor. The fuel distributor is provided in the vicinity of the fuel cell 110 to extend in the laminating direction, and is constructed such that the fuel gas can be supplied to the respective separators 112 and the fuel end plate 117. Besides, the air distributor is provided to extend in the laminating direction of the fuel cell 110 at a side opposite to the fuel distributor with respect to the fuel cell 110, and is constructed such that air can be supplied to the respective separators 112 and the air end plate 116. An end plate fuel passage 126 for introducing the fuel gas from the outer peripheral surface of the fuel end plate 117 and discharging it from a surface of the fuel end plate 117 opposed to the fuel electrode current collecting body 113 is formed in the fuel end plate 117 (FIGS. 5, 8 and 9). The end plate fuel passage 126 includes a single end plate fuel introduction hole 126a formed in the outer peripheral surface of the fuel end plate 117, a single end plate fuel discharge hole 126b formed at the center of a surface of the fuel end plate 117 opposed to the fuel electrode current collecting body 113, and an end plate fuel continuous hole 126c formed in the fuel end plate 117 and connecting the end plate fuel introduction hole 126a and the end plate fuel discharge hole 126b.

Figure 10:
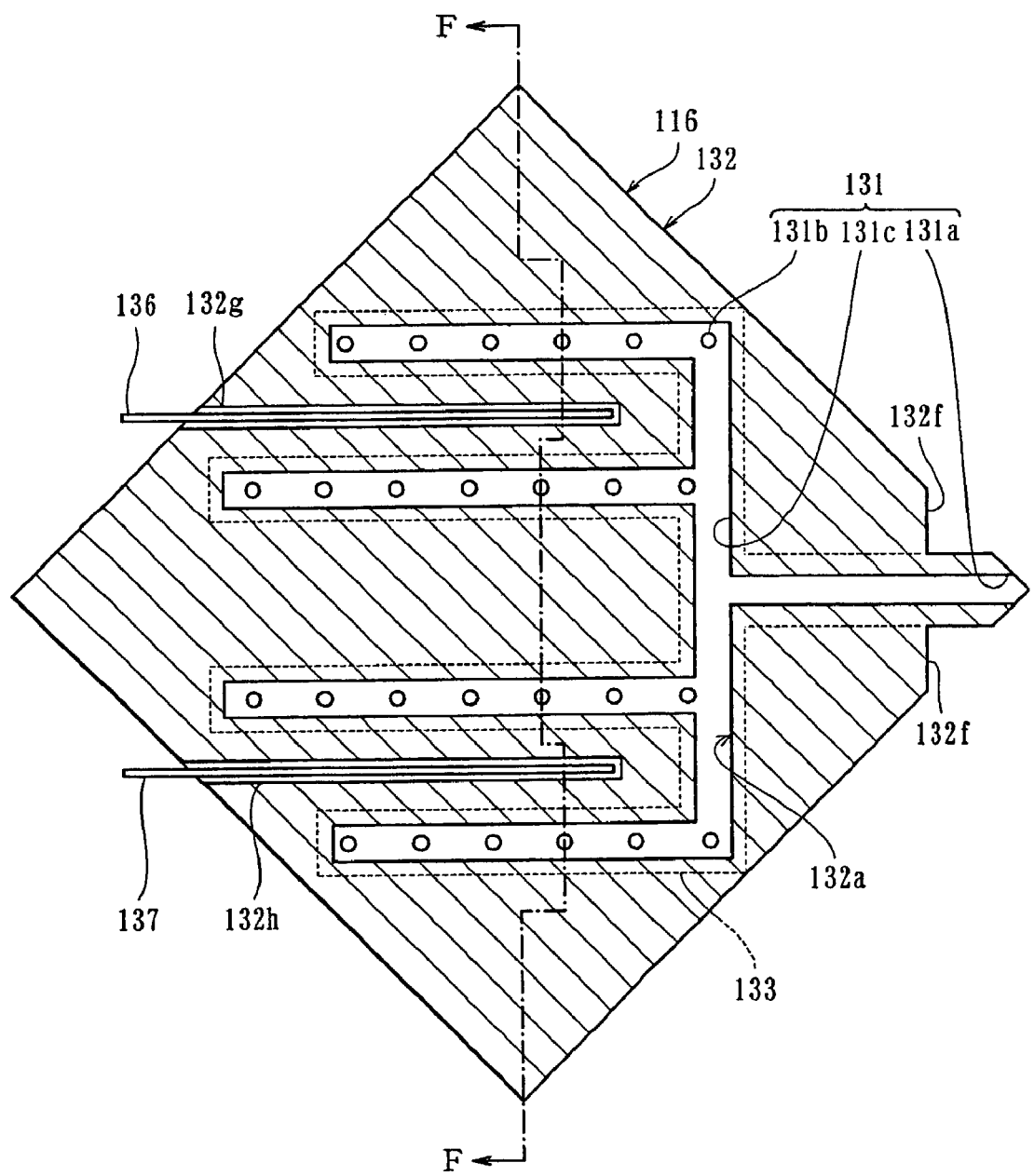
FIG. 10 is a sectional view taken along line E-E of FIG. 5.
Figure 11:
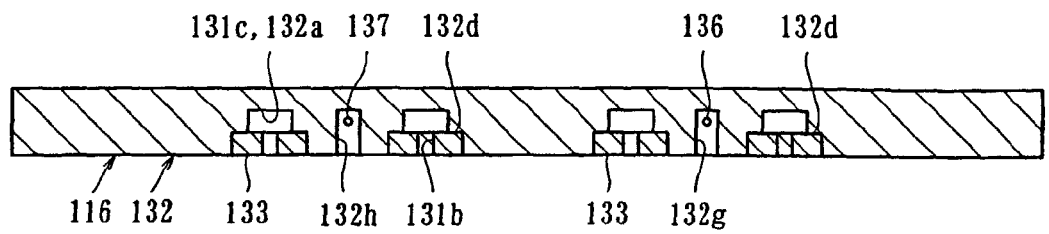
FIG. 11 is a sectional view taken along line F-F of FIG. 10.

On the other hand, the fuel end plate 117 includes an end plate fuel substrate 127 having an upper surface on which an end plate fuel concave groove 127a is formed, and an end plate fuel cover 128 covering the end plate fuel concave groove 127a. The end plate fuel concave groove 127a is formed linearly from one corner portion of the end plate fuel substrate 127 toward the center, and the end plate fuel cover 128 is linearly formed to correspond to the end plate fuel concave groove 127a. Besides, the end plate fuel concave groove 127a is covered with the end plate fuel cover 128 to form the end plate fuel introduction hole 126a and the end plate fuel continuous hole 126c, and the single end plate fuel discharge hole 126b is formed in the end plate fuel cover 128 to be positioned at the center of the end plate fuel substrate 127. Incidentally, in order to fix the end plate fuel cover 128 to the end plate fuel substrate 127, first, the end plate fuel cover 128 is inserted to a step portion 127c (FIG. 9) of the end plate fuel concave groove 127a, and the cover 128 is spot-welded to the step portion 127c in this state. Next, the end plate substrate 127 to which the end plate fuel cover 128 is fixed, is plated with Ag. As stated above, the end plate fuel cover 128 can be fixed to the end plate fuel substrate 127 by the relatively simple operation. Besides, as shown in FIG. 8 in detail, a pair of fuel notches 127e and 127e are formed at the one corner portion of the fuel end plate 117 in which the end plate fuel introduction hole 126a is formed, and by these notches 127e and 127e, the one corner portion of the fuel end plate 117 is constructed such that it can be inserted into a fuel outlet of the fuel distributor. An end plate air passage 131 (end plate oxidant passage) for introducing air from the outer peripheral surface of the air end plate 116 and discharging it from a surface of the air end plate 116 opposed to the air electrode current collecting body 114 is formed in the air end plate 116 (FIGS. 5, 10 and 11). The end plate air passage 131 includes a single end plate air introduction hole 131a (end plate oxidant introduction hole) formed in the outer peripheral surface of the air end plate 116, plural end plate air discharge holes 131b (end plate oxidant discharge hole) formed at predetermined intervals in a surface of the air end plate 116 opposed to the air electrode current collecting body 114, and an end plate air continuous hole 131c (end plate oxidant continuous hole) formed in the air end plate 116 and connecting the end plate air introduction hole 131a and the end plate air discharge hole 131b.

On the other hand, the air end plate 116 includes an end plate air substrate 132 (end plate oxidant substrate) having a lower surface on which an end plate air concave groove 132a (end plate oxidant concave groove) is formed, and an end plate air cover 133 (end plate oxidant cover) for covering the end plate air concave groove 132a. The end plate air concave groove 132a is formed like a leaf vein branching from the other corner portion of the end plate air substrate 132 to the one corner portion, and the end plate air cover 133 is formed like a leaf vein corresponding to the end plate air concave groove 132a. Besides, the end plate air concave groove 132a is covered with the end plate air cover 133 to form the end plate air introduction hole 131a and the end plate air continuous hole 131c, and the plural end plate air discharge holes 131b are formed at predetermined intervals in the end plate air cover 133. Incidentally, in order to fix the end plate air cover 133 to the end plate air substrate 132, first, the end plate air cover 133 is inserted to a step portion 132d (FIG. 11) of the end plate air concave groove 132a, and the cover 133 is spot-welded to the step portion 132d in this state.

Next, the end plate air substrate 132 to which the end plate air cover 133 is fixed, is plated with Ag. As stated above, the end plate air cover 133 can be fixed to the end plate air substrate 132 by the relatively simple operation. Besides, as shown in FIG. 10 in detail, a pair of air notches 132*f* and 132*f* are formed at the other corner portion of the air end plate 116 in which the end plate air introduction hole 131*a* is formed, and the other corner portion of the air end plate 116 can be inserted into the air outlet of the air distributor. Plural slits (see FIG. 4) spirally extending from the single separator fuel discharge hole 118*b* are formed on the surface of the separator 112 opposed to the fuel electrode current collecting body 113, and plural slits (see FIG. 4) spirally extending from the single end plate fuel discharge hole 126*b* are formed on the surface of the fuel end plate 117 opposed to the fuel electrode current collecting body 113. Besides, it is preferable to fill reforming particles (not shown) at a density at which the fuel gas can pass into the separator fuel continuous hole 118*c* of the separator fuel passage 118 and the end plate fuel continuous hole 126*c* of the end plate fuel passage 126. As the reforming particles, elements or oxides similar to the reforming particles in the first embodiment of the invention can be used. A thermocouple insertion groove 121*g* in which a thermocouple 136 can be inserted and a heater insertion groove 121*h* in which a heater 137 can be inserted, are respectively formed in the separator substrate 121 such that they do not communicate with the separator fuel concave groove 121*a* and the separator air concave groove 121*b* (FIGS. 6 and 7). Besides, a thermocouple insertion groove 127*g* in which a thermocouple 136 can be inserted and a heater insertion groove 127*h* in which a heater 137 can be inserted, are respectively formed in the end plate fuel substrate 127 such that they do not communicate with the end plate fuel concave groove 127*a* (FIG. 8). Further, a thermocouple insertion groove 132*g* in which a thermocouple 136 can be inserted and a heater insertion groove 132*h* in which a heater 137 can be inserted, are respectively formed in the end plate air substrate 132 such that they do not communicate with the end plate air concave groove 132*a* (FIGS. 10 and 11). The detection output of the thermocouple 136 is connected to the control input of a not-shown controller, and the control output of the controller is connected to the heater 137. The operation of the fuel cell 110 constructed as stated above will be described. When the fuel cell 110 is started, the controller activates the heater 137. By this, the separator 112, the fuel end plate 117, and the air end plate 116 are heated by the heater 137 and the temperature of the fuel cell 110 is raised to a starting temperature. When the fuel cell 110 reaches the starting temperature, since the thermocouple 136 detects the starting temperature, the controller stops the heater 137 on the basis of the detection output of the thermocouple 136. When fuel gas (for example, methane ($CH_4$)), together with water vapor ($H_2O$), is introduced into the separator fuel introduction hole 118*a* and the end plate fuel introduction hole 126*a*, the fuel gas and the water vapor pass through the separator fuel continuous hole 118*c* and the end plate fuel continuous hole 126*c* toward the separator fuel discharge hole 118*b* and the end plate fuel discharge hole 126*b*, respectively. Since the fuel cell 110 during the operation has a high temperature, the fuel gas absorbs heat from the separator 112 and the fuel end plate 117 while it passes through the separator fuel continuous hole 118*c* and the end plate fuel continuous hole 126*c*, and the fuel gas reaches an optimum temperature for the reaction in the fuel electrode layer 111*b*, and is reformed by the reforming particles filled in the separator fuel continuous hole 118*c* and the end plate fuel continuous hole 126*c* (reformed into, for example, hydrogen gas ($H_2$)).

The reformed fuel gas is discharged from the separator fuel discharge hole 118*b* and the end plate fuel discharge hole 126*b* toward the center of each of the fuel electrode current collecting bodies 113, passes through pores in each of the fuel electrode current collecting bodies 113 and is quickly supplied to the center of each of the fuel electrode layers 111*b*, and is further guided by the slits formed on the surface of the separator substrate 121 opposed to the fuel electrode current collecting body 113 and the surface of the end plate fuel substrate 127 opposed to the fuel electrode current collecting body 113, and spirally flows from the center of each of the fuel electrode layers lib to the outer peripheral edge. At the same time, when air is introduced into the separator air introduction hole 119*a* and the end plate air introduction hole 131*a*, the air passes through the separator air continuous hole 119*c* and the end plate air continuous hole 131*c*, and is substantially uniformly discharged like a shower from the separator air discharge hole 119*b* and the end plate air discharge hole 131*b* toward each of the air electrode layers 111*c*, and further flows in each of the air electrode layers 111*c* along each of the solid electrolyte layers 111*a*. A mechanism in which the fuel gas and oxygen in the air are moved and reacted in the fuel electrode layer 111*b*, the air electrode layer 111*c*, and the solid electrolyte layer 111*a* to generate electric power, is similar to the first embodiment of the invention. As described above, the fuel gas is guided by the slits formed on the surface of the separator substrate 121 opposed to the fuel electrode current collecting body 113 and the surface of the end plate fuel substrate 127 opposed to the fuel electrode current collecting body 113 and spirally flows from the center of each of the fuel electrode layers 111*b* to the outer peripheral edge, so that the reaction passage of the fuel gas becomes long, and the collision frequency between the fuel gas and each of the fuel electrode layers 111*b* is increased. Besides, since the air is substantially uniformly discharged like a shower from the separator air discharge hole 119*b* and the end plate air discharge hole 131*b* toward each of the air electrode layers 111*c*, each of the power generating cells 111 can be uniformly heated and cooled by the air, and damage of each of the power generating cells 111 can be prevented.

The separator 112 is formed by covering the separator fuel concave groove 121*a* of the separator substrate 121 with the separator fuel cover 122 and by covering the separator air concave groove 121*b* with the separator air cover 123, the fuel end plate 117 is formed by covering the end plate fuel concave groove 127*a* of the end plate fuel substrate 127 with the end plate fuel cover 128, and further, the air end plate 116 is formed by covering the end plate air concave groove 132*a* of the end plate air substrate 132 with the end plate air cover 133, so that the thickness of each of the separator 112, the fuel end plate 117 and the air end plate 116 can be made very thin. As a result, the fuel cell 110 can be made compact in the laminating direction of the power generating cell 111.

Besides, during the power generation of the fuel cell 110, since Joule heat is generated in the fuel cell 110 and the temperature of the fuel cell 110 is raised, the controller supplies the air having a temperature slightly lower than the operation temperature of the fuel cell 110 on the basis of the detection output of the thermocouple 136 to the separator air passage 119 and the end plate air passage 131. By this, temperature control of the separator 112 and the air end plate 116 is performed.

On the other hand, even if a part of the separator fuel cover 122 comes off the separator substrate 121, or a part of the end plate fuel cover 128 is comes off the end plate fuel substrate 127, the fuel gas passing through the separator fuel passage 118 and the end plate fuel passage 126 does not mix with the air and is supplied to the fuel electrode layer 111*b* of each of the power generating cells 111. Besides, even if a part of the separator air cover 123 comes off the separator substrate 121, or a part of the end plate air cover 133 comes off the end plate air substrate 132, the air passing through the separator air passage 119 and the end plate air passage 131 do not mix with the fuel gas, and is supplied to the air electrode layer 111c of each of the power generating cells 111. Further, the fuel electrode current collecting bodies 113 made of stainless steel, nickel base alloy or chromium base alloy, subjected to nickel plating, silver plating, or copper plating, or nickel, silver or copper are respectively joined to the upper surface of the separator 112 and the upper surface of the fuel end plate 117, and the air electrode current collecting bodies 114 made of stainless steel, nickel base alloy or chromium base alloy, subjected to silver plating or platinum plating, or silver or platinum are respectively joined to the lower surface of the separator 112 and the lower surface of the air end plate 116.

Besides, when the separator 112, the fuel end plate 117, and the air end plate 116 are subjected to one of or both of nickel plating and silver plating (in the case where silver plating is performed, it is necessary to perform nickel plating as first plating), electrical continuity between the separator 112, the fuel end plate 117, or the air end plate 116 and the fuel electrode current collecting body 113 or the air electrode current collecting body 114 can be kept further for a long period of time. Besides, in this embodiment, although the air is used as the oxidant gas, oxygen or other oxidant gases may be used.

Figure 12:
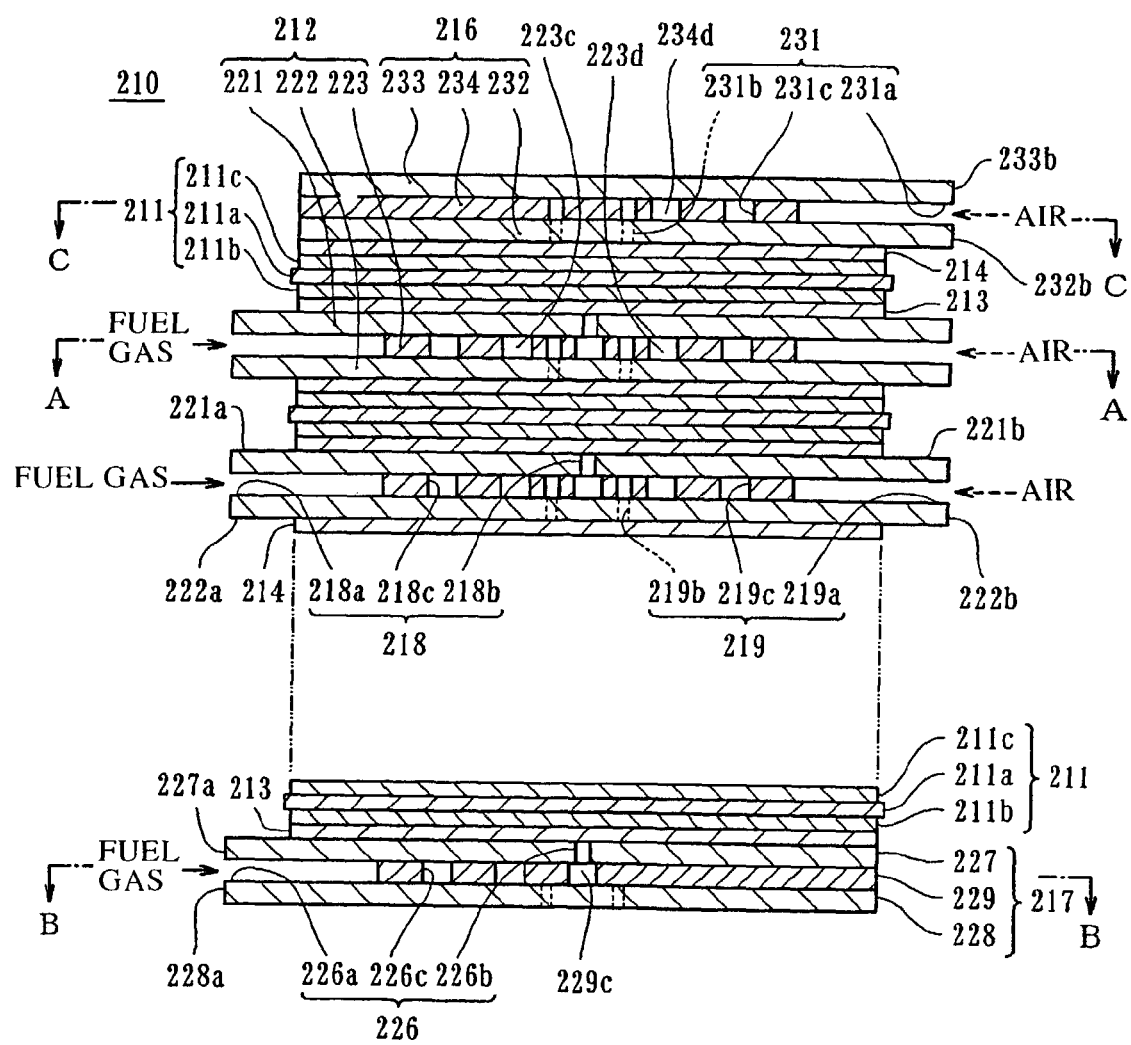
FIG. 12 is a longitudinal sectional view of a fuel cell according to a third embodiment of the invention.
Figure 13:
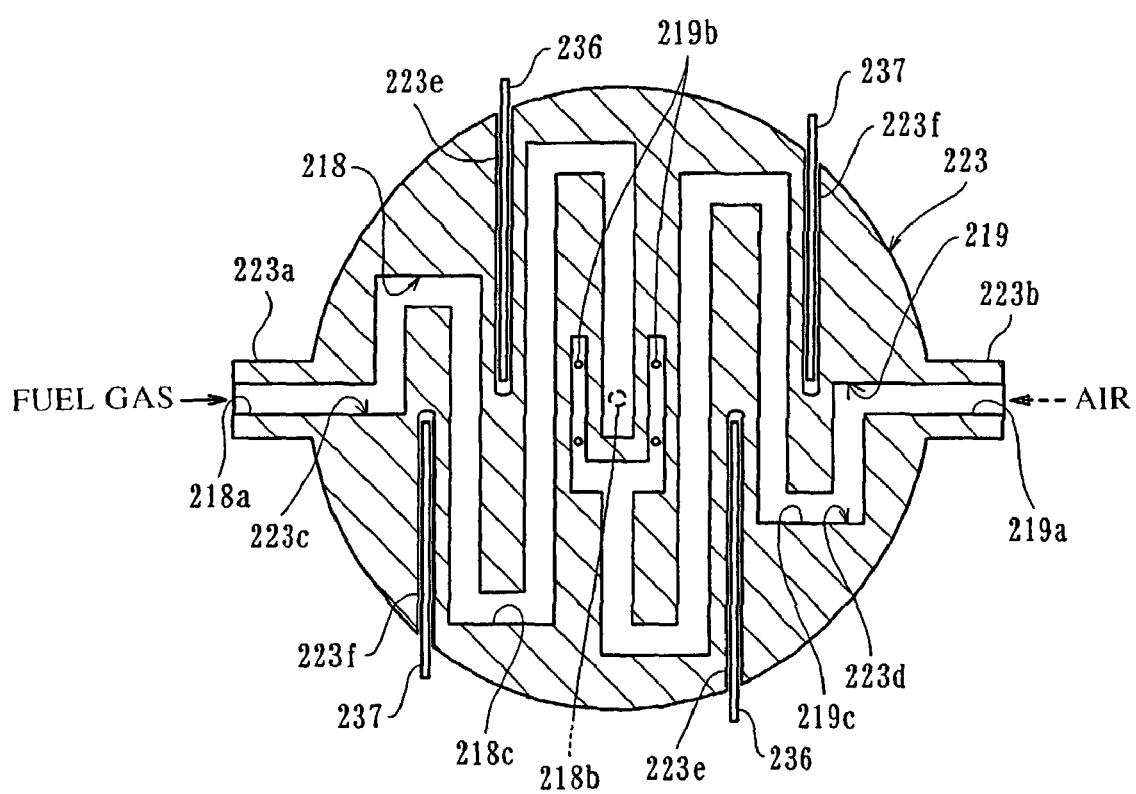
FIG. 13 is a sectional view taken along line A-A of FIG. 12.

Further, the separator fuel discharge hole may be formed in the separator fuel cover to be positioned at the center of the separator substrate, the separator air discharge hole may be formed in the separator air cover to be positioned at the center of the separator substrate, and the plural slits spirally extending from the separator air discharge hole may be formed on the surface of the separator opposed to the air electrode layer. In this case, since the fuel gas spirally flows from the center of the fuel electrode layer along the slits, the reaction passage of the fuel gas becomes long, and the collision frequency between the fuel gas and the fuel electrode layer is increased. Besides, since the air spirally flows along the slits from the center of the air electrode layer, the reaction passage of the air becomes long, and the collision frequency between the air and the air electrode layer is increased. As a result, the output of the fuel cell can be improved. A gas supply structure to a fuel cell according to a third embodiment of the invention will be described on the basis of the drawings. Similarly to the fuel cell 11 shown in FIG. 1, a fuel cell 210 shown in FIG. 12 is constituted by laminating (n+1) power generating cells 211. A solid electrolyte layer 211a, a fuel electrode layer 211b, an air electrode layer (oxidant electrode layer) 211c, a separator 212, a fuel electrode current collecting body 213, an air electrode current collecting body (oxidant electrode current, collecting body) 214, an air end plate (oxidant end plate) 216, and a fuel end plate 217 are laminated similarly to the solid electrolyte layer 12a, the fuel electrode layer 12b, the air electrode layer (oxidant electrode layer) 12c, the separator 16, the fuel electrode current collecting body 17, the air electrode current collecting body (oxidant electrode current collecting body) 18, the air end plate (oxidant end plate) 21, and the fuel end plate 22 in FIG. 1. Each of the separator 212, the air end plate 216, and the fuel end plate 217 is formed into a disk having substantially the same diameter as the fuel electrode layer 211b or the like. Incidentally, the solid electrolyte layer, the fuel electrode layer, the air electrode layer, the separator, the fuel electrode current collecting body, the air electrode current collecting body, the air end plate, and the fuel end plate may be formed to have a polygonal plate shape such as a tetragonal plate shape, a hexagonal plate shape or an octagonal plate shape, not the disk shape. The solid electrolyte layer 211a, the fuel electrode layer 211b, and the air electrode layer 211c are made of similar material to that of the first embodiment of the invention. It is preferable that the separator 212, the air end plate 216 and the fuel end plate 217 are made of stainless steel, nickel base alloy, or chromium base alloy. Besides, the fuel electrode current collecting body 113 is made of stainless steel, nickel base alloy or chromium base alloy, or nickel, silver or copper to be porous, and the air electrode current collecting body 214 is formed of stainless steel, nickel base alloy or chromium base alloy, or silver or platinum to be porous. The separator 212 is provided with a separator fuel passage 218 for introducing fuel gas from an outer peripheral surface of the separator 212 and discharging it from a surface of the separator 212 opposed to the fuel electrode current collecting body 213, and a separator air passage 219 (separator oxidant passage) for introducing air (oxidant gas) from an outer peripheral surface of the separator 212 and discharging it from a surface of the separator 212 opposed to the air electrode current collecting body 214 (FIGS. 12 and 13). The separator fuel passage 218 includes a single separator fuel introduction hole 218a formed in the outer peripheral surface of the separator 212, a single separator fuel discharge hole 218b formed at the center of the surface of the separator 212 opposed to the fuel electrode current collecting body 213, and a separator fuel continuous hole 218c formed in the separator 212 and connecting the separator fuel introduction hole 218a and the separator fuel discharge hole 218b. Besides, the separator air passage 219 includes a single 20 separator air introduction hole 219a (separator oxidant introduction hole) formed in the outer peripheral surface of the separator 212, four separator air discharge holes 219b (separator oxidant discharge hole) formed at the center of the surface of the separator 212 opposed to the air electrode current collecting body 214, and a separator air continuous hole 219c formed in the separator 212 and connecting the separator air introduction hole 219a and the separator air discharge hole 219b.

On the other hand, the separator 212 includes a separator fuel thin plate 221 in which the single separator fuel discharge hole 219b is formed at the center, and a separator fuel protrusion 221a and a separator air protrusion 221b are formed to be opposed to each other on the outer peripheral edge, a separator air thin plate 222 (separator oxidant thin plate) in which four separator air discharge holes 219b are formed at the center, and a separator fuel protrusion 222a and a separator air protrusion 222b are formed to be opposed to each other on the outer peripheral edge, and a separator grooved thin plate 223 which is sandwiched between the separator fuel thin plate 221 and the separator air thin plate 222 and in which a separator fuel protrusion 223a and a separator air protrusion 223b are formed to be opposed to each other on an outer peripheral edge. That is, the separator 212 is formed by laminating and bonding the separator fuel thin plate 221, the separator grooved thin plate 223, and the separator air thin plate 222. The laminating and bonding of these thin plates 221 to 223 is carried out by spot welding or thermocompression bonding, and in the case of the thermocompression bonding, it is preferable that the 25 respective thin plates 221 to 223 are plated with Ni before the thermocompression bonding, and they are plated with Ag after the thermocompression bonding.

Besides, a separator fuel groove 223c stretching in a zigzag line from the separator fuel protrusion 223a to the center is formed in the separator grooved thin plate 223, and the separator fuel groove 223c becomes the separator fuel introduction hole 218a and the separator fuel continuous hole 218c in the separator fuel passage 218 by laminating and bonding the separator fuel thin plate 221 and the separator air thin plate 222 to the separator grooved thin plate 223. Besides, a separator air groove 223d stretching in a zigzag line from the separator air protrusion 223b to the center is formed in the separator grooved thin plate 223, and the separator air groove 223d becomes the separator air introduction hole 219a and the separator air continuous hole 219c in the separator air passage 219 by laminating and bonding the separator fuel thin plate 221 and the separator air thin plate 222 to the separator grooved thin plate 223. The separator fuel groove 223c and the separator air groove 223d are formed so as not to communicate with each other. That is, even after the grooves 223c and 223d are formed, the separator grooved thin plate 223 is formed into one piece which is not divided.

Figure 14:
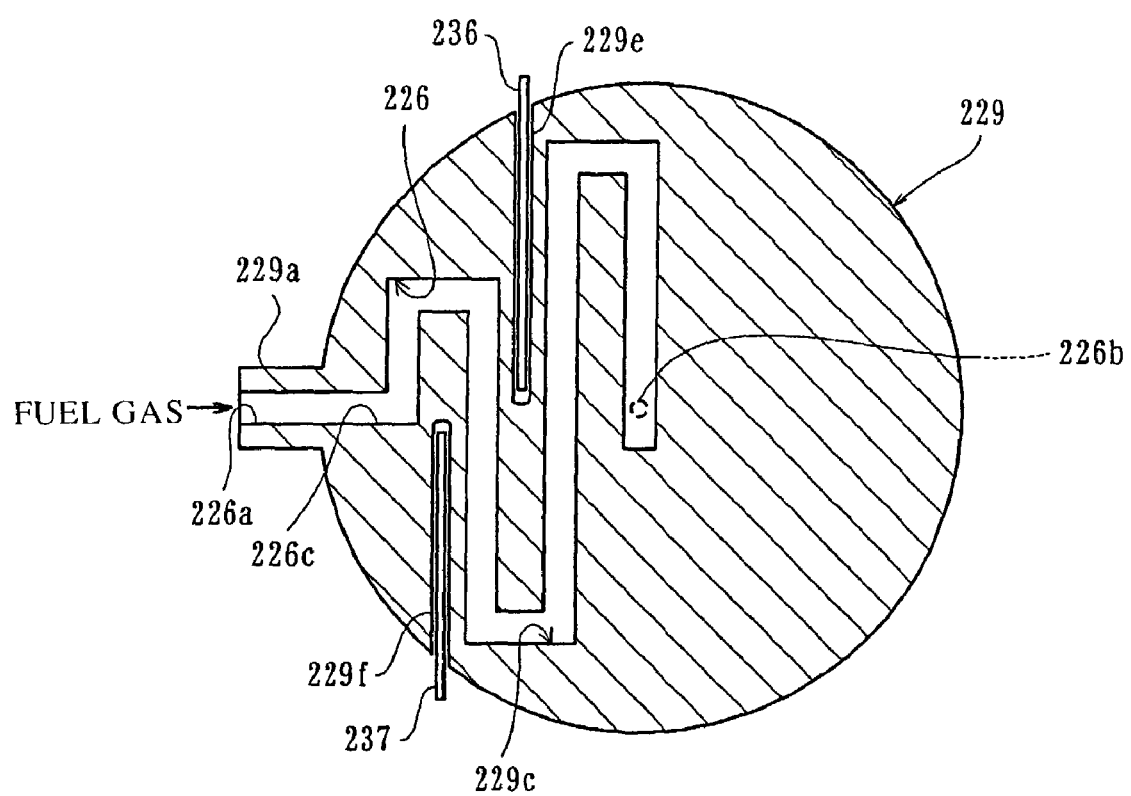
FIG. 14 is a sectional view taken along line B-B of FIG. 12.

An end plate fuel passage 226 for introducing fuel gas from an outer peripheral surface of the fuel end plate 217 and discharging it from a surface of the fuel end plate 217 opposed to the fuel electrode current collecting body 213 is formed in the fuel end plate 217 (FIGS. 12 and 14). The end plate fuel passage 226 includes a single end plate fuel introduction hole 226a formed in an outer peripheral surface of the fuel end plate 217, a single end plate fuel discharge hole 226b formed at the center of the surface of the fuel end plate 217 opposed to the fuel electrode current collecting body 213, and an end plate fuel continuous hole 226c formed in the fuel end plate 217 and connecting the end plate fuel introduction hole 226a and the end plate fuel discharge hole 226b.

On the other hand, the fuel end plate 217 includes an end plate fuel thin plate 227 in which the single end plate fuel discharge hole 226b is formed at the center and the end plate fuel protrusion 227a is formed at the outer peripheral edge, a fuel shut-off thin plate 228 in which an end plate fuel protrusion 228a is formed at an outer peripheral edge, and an end plate fuel grooved thin plate 229 which is sandwiched between the end plate fuel thin plate 227 and the fuel shut-off thin plate 228 and in which the fuel protrusion 229a is formed. That is, it is formed by laminating and bonding the end plate fuel thin plate 227, the end plate fuel grooved thin plate 229, and the fuel shut-off thin plate 228. Laminating and bonding of the thin plates 227 to 229 is performed by spot welding or thermocompression bonding, and it is preferable that the respective thin plates 227 to 229 are plated with Ni before the thermocompression bonding, and is plated with Ag after the thermocompression bonding.

Figure 15:
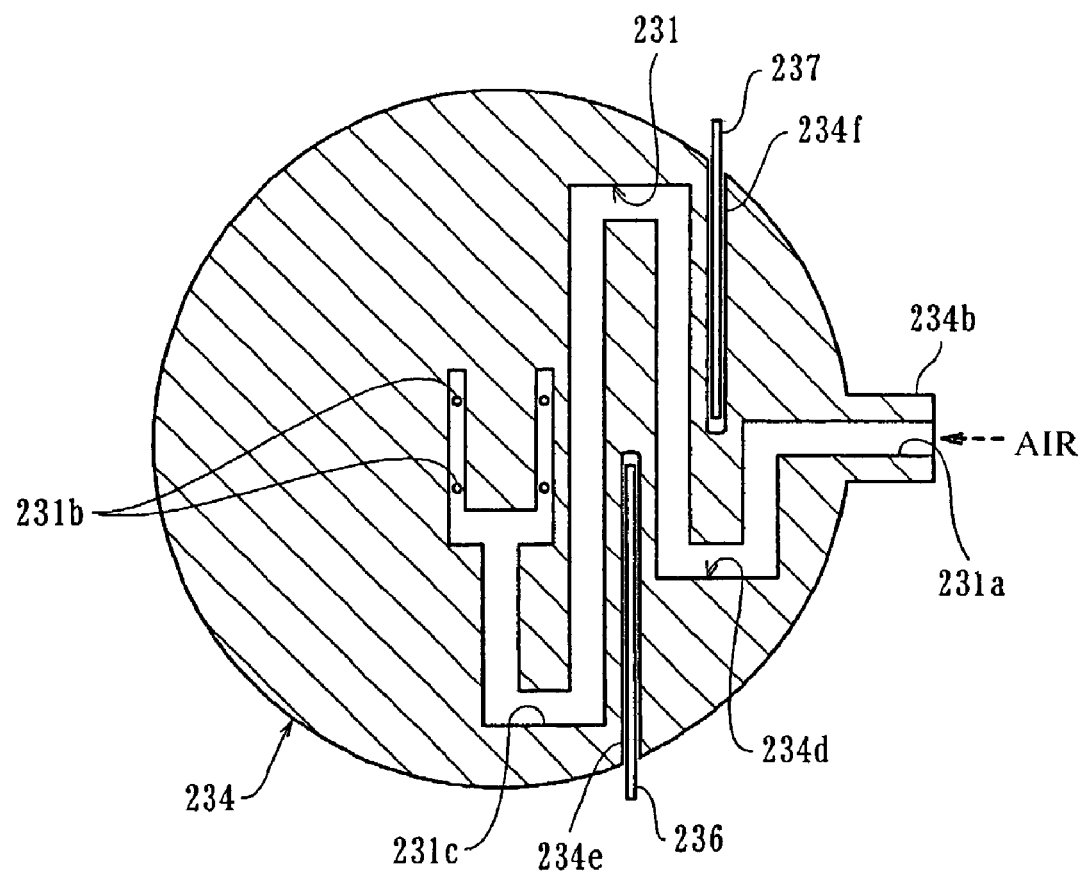
FIG. 15 is a sectional view taken along line C-C of FIG. 12.

Besides, an end plate fuel groove 229c stretching in a zigzag line from the end plate fuel protrusion 229a to the center is formed in the end plate fuel grooved thin plate 229, and the end plate fuel groove 229c becomes the end plate fuel introduction hole 226a and the end plate fuel continuous hole 226c in the end plate fuel passage 226 by laminating and bonding the end plate fuel thin plate 227 and the fuel shut-off thin plate 228 to the end plate fuel grooved thin plate 229. An end plate air passage 231 (end plate oxidant passage) for introducing air from an outer peripheral surface of the air end plate 216 and discharging it from a surface of the air end plate 216 opposed to the air electrode current collecting body 214 is formed in the air end plate 216 (FIGS. 12 and 15). The end plate air passage 231 includes a single end plate air introduction hole 231a (end plate oxidant introduction hole) formed in an outer peripheral surface of the air end plate 216, four end plate air discharge holes 231b (end plate oxidant discharge hole) formed at the center of a surface of the air end plate 216 opposed to the air electrode current collecting body 214, and an end plate air continuous hole 231c formed in the air end plate 216 and connecting the end plate air introduction hole 231a and the end plate air discharge hole 231b.

On the other hand, the air end plate 216 includes an end plate air thin plate 232 (end plate oxidant thin plat) in which the four end plate fuel discharge holes 231b are formed at the center and an end plate air protrusion 232b is formed at an outer peripheral edge, an air shut-off thin plate 233 (oxidant shut-off thin plate) in which an end plate air protrusion 233b is formed at an outer peripheral edge, and an end plate air grooved thin plate 234 (end plate oxidant grooved thin plate) which is sandwiched between the end plate air thin plate 232 and the air shut-off thin plate 233 and in which the end plate air protrusion 234b is formed at an outer peripheral edge (FIGS. 12 and 15). That is, the air end plate 216 is formed by laminating and bonding the end plate air thin plate 232, the end plate air grooved thin plate 234, and the air shut-off thin plate 233. Laminating and bonding of the thin plates 232 to 234 is performed by spot welding or thermocompression bonding, and in the case of the thermocompression bonding, it is preferable that the respective thin plates 232 to 234 are plated with Ni before the thermocompression bonding, and is plated with Ag after the thermocompression bonding. Besides, an end plate air groove 234d stretching in a zigzag line from the end plate air protrusion 234b to the center is formed in the end plate air grooved thin plate 234, and the end plate air groove 234d becomes the end plate air introduction hole 231a and the end plate air continuous hole 231c in the end plate air passage 231 by laminating and bonding the end plate air thin plate 232 and the fuel shut-off thin plate 233 to the end plate air grooved thin plate 234.

Plural slits (see FIG. 4) spirally extending from the single separator fuel discharge hole 218b are respectively formed on the surface of the separator fuel thin plate 221, that is, on the surface of the separator fuel thin plate 221 opposed to the fuel electrode current collecting body 213, and plural slits (not shown) spirally extending from the four separator air discharge holes 219b are respectively formed on the surface of the separator air thin plate 222, that is, on the surface of the separator air thin plate 222 opposed to the air electrode current collecting body 214. Besides, plural slits (see FIG. 4) spirally extending from the single end plate fuel discharge hole 226b are respectively formed on the surface of the end plate fuel thin plate 227, that is, on the surface of the end plate fuel thin plate 227 opposed to the fuel electrode current collecting body 213, and plural slits (not shown) spirally extending from the four end plate air discharge hole 231b are respectively formed on the surface of the end plate air thin plate 232, that is, on the surface of the end plate air thin plate 232 opposed to the air electrode current collecting body 214. Incidentally, it is preferable to fill reforming particles into the separator fuel continuous hole 218c of the separator fuel passage 218 and the end plate fuel continuous hole 226c of the end plate fuel passage 226 at such a density that the fuel gas can flow. As the reforming particles, elements or oxides similar to the reforming particles in the first embodiment of the invention can be used.

A thermocouple insertion groove 223e in which a thermocouple 236 can be inserted and a heater insertion groove 223f in which a heater 237 can be inserted are formed in the separator grooved thin plate 223 so that they do not communicate with the separator fuel groove 223c and the separator air groove 223d (FIG. 13). Besides, a thermocouple insertion groove 229e in which a thermocouple 236 can be inserted and a heater insertion groove 229f in which a heater 237 can be inserted are formed in the end plate fuel grooved thin plate 229 so that they do not communicate with the end plate fuel groove 229c (FIG. 14). Further, a thermocouple insertion groove 234e in which a thermocouple 236 can be inserted and a heater insertion groove 234f in which a heater 237 can be inserted are formed in the end plate air grooved thin plate 234 so that they do not communicate with the end plate air groove

234*d* (FIG. 15). The detection output of the thermocouple 236 is connected to the control input of a not-shown controller, and the control output of the controller is connected to the heater 237. Incidentally, when the separator grooved thin plate is formed by electric discharge machining in a state where a number of plate members are stacked, the number of machining steps can be reduced. Besides, when the end plate fuel grooved thin plate and the end plate air grooved thin plate are also respectively formed in the same manner as the above, the number of machining steps can be reduced.

The operation of the fuel cell 210 constructed as stated above will be described. When the fuel cell 210 is started, the controller activates the heater 237. By this, the separator 212, the fuel end plate 217, and the air end plate 216 are heated by the heater 237 and the temperature of the fuel cell 210 is raised to a starting temperature. When the fuel cell 210 reaches the starting temperature, the thermocouple 236 detects the starting temperature, so that the controller stops the heater 237 on the basis of the detection output of the thermocouple 236. When the fuel gas (for example, methane gas (CH)), together with water vapor ($H_2O$), is introduced into the separator fuel introduction hole 218*a* and the end plate fuel introduction hole 226*a*, the fuel gas and the water vapor go toward the separator fuel discharge hole 218*b* and the end plate fuel discharge hole 226*b* while meandering through the separator fuel continuous hole 218*c* and the end plate fuel continuous hole 226*c*. Since the fuel cell 210 during the operation has a high temperature, the fuel gas absorbs heat from the separator 212 and the fuel end plate 217 while it passes through the separator fuel continuous hole 218*c* and the end plate fuel continuous hole 226*c*, and the fuel gas reaches an optimum temperature for a reaction in the fuel electrode layer 211*b*, and is reformed by the reforming particles filled in the separator fuel continuous hole 218*c* and the end plate fuel continuous hole 226*c* (for example, reformed into hydrogen gas ($H_2$)). The reformed fuel gas is discharged from the separator fuel discharge hole 218*b* and the end plate fuel discharge hole 226*b* toward the center of each of the fuel electrode current collecting bodies 213, passes through pores in each of the fuel electrode current collecting bodies 213 to be quickly supplied to the center of each of the fuel electrode layers 211*b*, and is further guided by the slits formed on the surface of the separator fuel thin plate 221 and the surface of the end plate fuel substrate 227 to spirally flow from the center of each of the fuel electrode layers 211*b* to the outer peripheral edge. At the same time, when air is introduced into the separator air introduction hole 219*a* and the end plate air introduction hole 231*a*, the air passes through the separator air continuous hole 219*c* spreading in a zigzag line and the end plate air continuous hole 231*c*, and is discharged from the separator air discharge hole 219*b* and the end plate air discharge hole 231*b* toward the center of the air electrode current collecting body 214, passes through pores in each of the air electrode current collecting bodies 214 to be quickly supplied to the center of each of the air electrode layers 211*c*, and is further guided by the slits formed on the surface of the separator air thin plate 222 and the surface of the end plate air thin plate 232 to spirally flow from the center of each of the air electrode layers 211*c* toward the outer peripheral edge.

A mechanism in which the fuel gas and oxygen in the air are moved and reacted in the fuel electrode layer 211*b*, the air electrode layer 211*c*, and the solid electrolyte layer 211*a* to generate electric power, is similar to the first embodiment of the invention. As described above, since the fuel gas is guided by the slits formed on the surface of the separator fuel thin plate 221 and the surface of the end plate fuel thin plate 227 and spirally flows from the center of each of the fuel electrode layers 211*b* to the outer peripheral edge, the reaction passage of the fuel gas becomes long, and the collision frequency between the fuel gas and the fuel electrode layer 211*b* is increased. Besides, since the oxidant gas is guided by the slits formed on the surface of the separator air thin plate 222 and the surface of the end plate air thin plate 232 and spirally flows from the center of each of the air electrode layers 211*c* to the outer peripheral edge, the reaction passage of the oxidant gas becomes long, and the collision frequency between the oxidant gas and the oxidant electrode layer 211*c* is increased. As a result, the performance of the fuel cell 210 can be improved. The separator 212 is formed by laminating and bonding the three thin plates 221 to 223, the fuel end plate 217 is formed by laminating and bonding the three thin plates 227 to 229, and the air end plate 216 is formed by laminating and bonding the three thin plates 232 to 234, so that the thickness of each of the separator 212, the fuel end plate 217, and the air end plate 216 can be made very thin. As a result, the fuel cell 210 can be made compact in the laminating direction of the power generating cells 211.

Since Joule heat is generated in the fuel cell 210 during power generation of the fuel cell 210, and the temperature of the fuel cell 210 is raised, the controller supplies the air having a temperature slightly lower than the operation temperature of the fuel cell 210 to the separator air passage 219 and the end plate air passage 231 on the basis of the detection output of the thermocouple 236. By this, temperature control of the separator 212 and the air end plate 216 is performed.

Further, it is desirable that the fuel electrode current collecting body 213 made of stainless steel, nickel base alloy or chromium base alloy, subjected to nickel plating, silver plating or copper plating, or nickel, silver or copper is joined to the upper surface of the separator 212 and the upper surface of the fuel end plate 217, and the air electrode current collecting body 214 made of stainless steel, nickel base alloy or chromium base alloy, subjected to silver plating or platinum plating, or silver or platinum is joined to the lower surface of the separator 212 and the lower surface of the air end plate 216.

Besides, when the separator 212, the fuel end plate 217, and the air end plate 216 are subjected to one of or both of nickel plating and silver plating (in the case where the silver plating is performed, it is necessary to perform nickel plating as first plating), electrical continuity between the separator 212, the fuel end plate 217 or the air end plate 216 and the fuel electrode current collecting body 213 or the air electrode current collecting body 214 can be kept further for a long period of time. Besides, in this embodiment, although the air is used as the oxidant gas, oxygen or other oxidant gases may be used.

Figure 16:
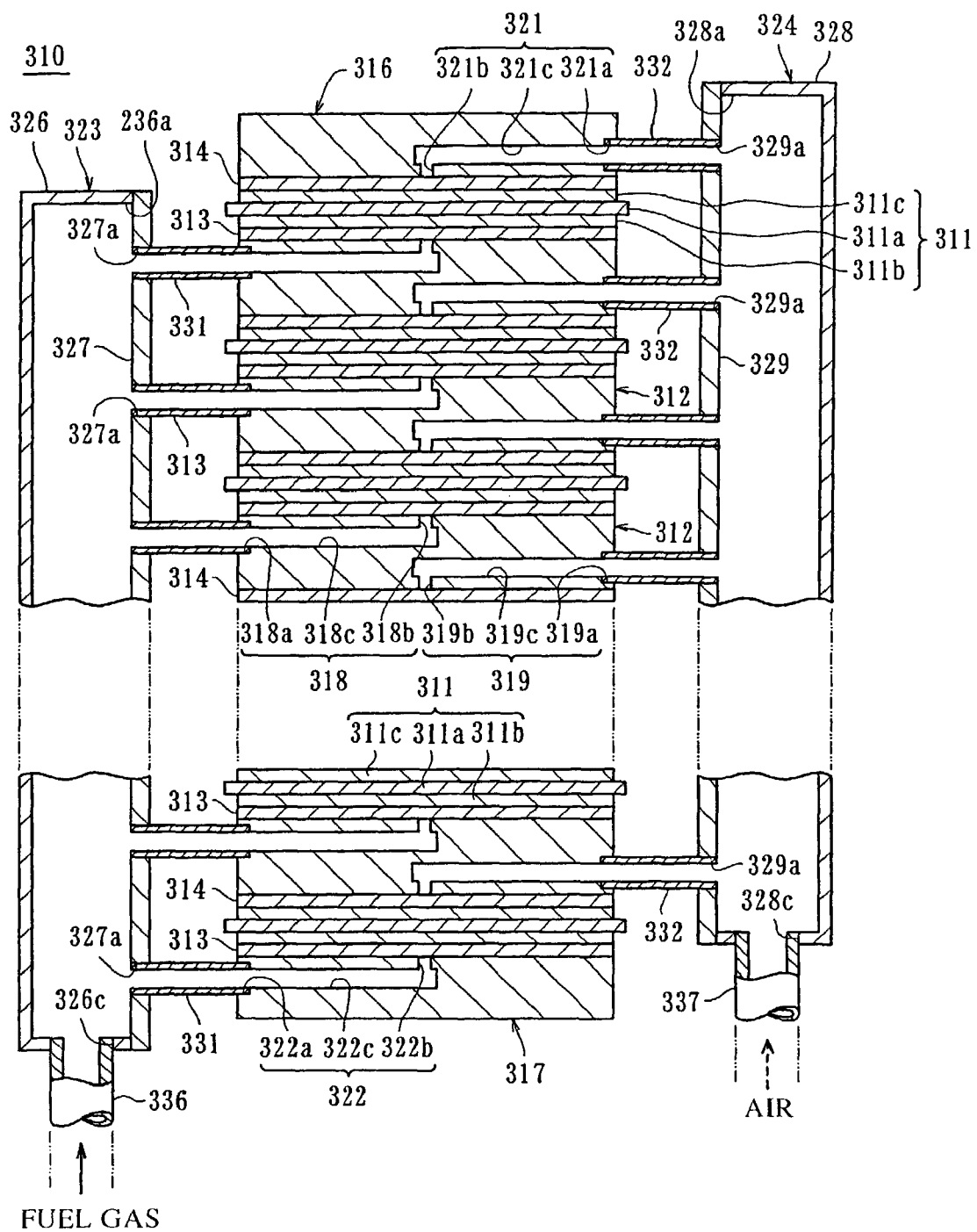
FIG. 16 is a longitudinal sectional view of a fuel cell module according to a fourth embodiment of the invention.

Further, the separator fuel discharge hole may be formed at the center of the separator fuel thin plate, and the separator oxidant discharge hole may be formed in the separator oxidant thin plate so that air is substantially uniformly discharged like a shower toward the oxidant electrode layer opposed to the separator oxidant thin plate. In this case, when the fuel gas is introduced into the separator fuel passage, the fuel gas is discharged from the separator fuel discharge hole to the center of each of the fuel electrode layers, and spirally flows from the center of the fuel electrode layer along the slits. By this, the reaction passage of the fuel gas becomes long, and the collision frequency between the fuel gas and the fuel electrode layer is increased, and the output of the fuel cell can be improved. When the air is introduced into the separator air passage at the same time, the air is substantially uniformly discharged like a shower from the separator air discharge hole to the air electrode layer, and flows in the air electrode layer along the solid electrolyte layer. By this, the power generating cell can be uniformly heated and cooled by the air, and damage of the power generating cell due to local heating or cooling can be prevented. A distributor structure of a fuel cell module according to a fourth embodiment of the invention will be described on the basis of the drawings. Similarly to the fuel cell 11 shown in FIG. 1, a fuel cell 310 shown in FIG. 16 is constituted by laminating (n+1) power generating cells 311. A solid electrolyte layer 311a, a fuel electrode layer 311b, an air electrode layer (oxidant electrode layer) 311c, a separator 312, a fuel electrode current collecting body 313, an air electrode current collecting body (oxidant electrode current collecting body) 314, an air end plate (oxidant end plate) 316, and a fuel end plate 317 are respectively laminated similarly to the solid electrolyte layer 12a, the fuel electrode layer 12b, the air electrode layer (oxidant electrode layer) 12c, the separator 16, the fuel electrode current collecting body 17, the air electrode current collecting body (oxidant electrode current collecting body) 18, the air end plate (oxidant end plate) 21, and the fuel end plate 22 in FIG. 1. Each of the separator 312, the air end plate 316, and the fuel end plate 317 is formed into a square plate shape with a diameter of the fuel electrode layer '311b as a length of one side. Incidentally, the solid electrolyte layer, the fuel electrode layer, the air electrode layer, the fuel electrode current collecting body, and the air electrode current collecting body may be formed to have a polygonal plate shape such as a tetragonal plate shape, a hexagonal plate shape or an octagonal shape, not the disk shape. Besides, the separator, the air end plate, and the fuel end plate may be formed to have a disk shape, or a polygonal plate shape such as a rectangular plate shape, a hexagonal plate shape or an octagonal plate shape. The solid electrolyte layer 311a, the fuel electrode layer 311b, the air electrode layer 311c, the separator 312, the air end plate 316, the fuel end plate 317, the fuel electrode current collecting body 313, and the air electrode current collecting body 314 are made of similar material to those of the first embodiment of the invention.

The separator 312 is provided with a separator fuel passage 318 for introducing fuel gas from an outer peripheral surface of the separator 312 and discharging it from a surface of the separator 312 opposed to the fuel electrode current collecting body 313, and a separator air passage 319 (separator oxidant passage) for introducing air (oxidant gas) from an outer peripheral surface of the separator 312 and discharging it from a surface of the separator 312 opposed to the air electrode current collecting body 314. The separator fuel passage 318 includes a separator fuel inlet 318a facing the outer peripheral surface of the separator 312, a separator fuel outlet 318b facing the center of the fuel electrode current collecting body 313 adjacent to the separator 312, and a separator fuel continuous hole 318c provided in the separator 312 and connecting the separator fuel inlet 318a and the separator fuel outlet 318b. Besides, the separator air passage 319 includes a separator air inlet 319a facing the outer peripheral surface of the separator 312, a separator air outlet 319b facing the center of the air electrode current collecting body 314 adjacent to the separator 312, and a separator air continuous hole 319c provided in the separator 312 and connecting the separator air inlet 319a and the separator air outlet 319b. Incidentally, the separator fuel passage 318 and the separator air passage 319 are constructed so as not to communicate with each other.

Figure 17:
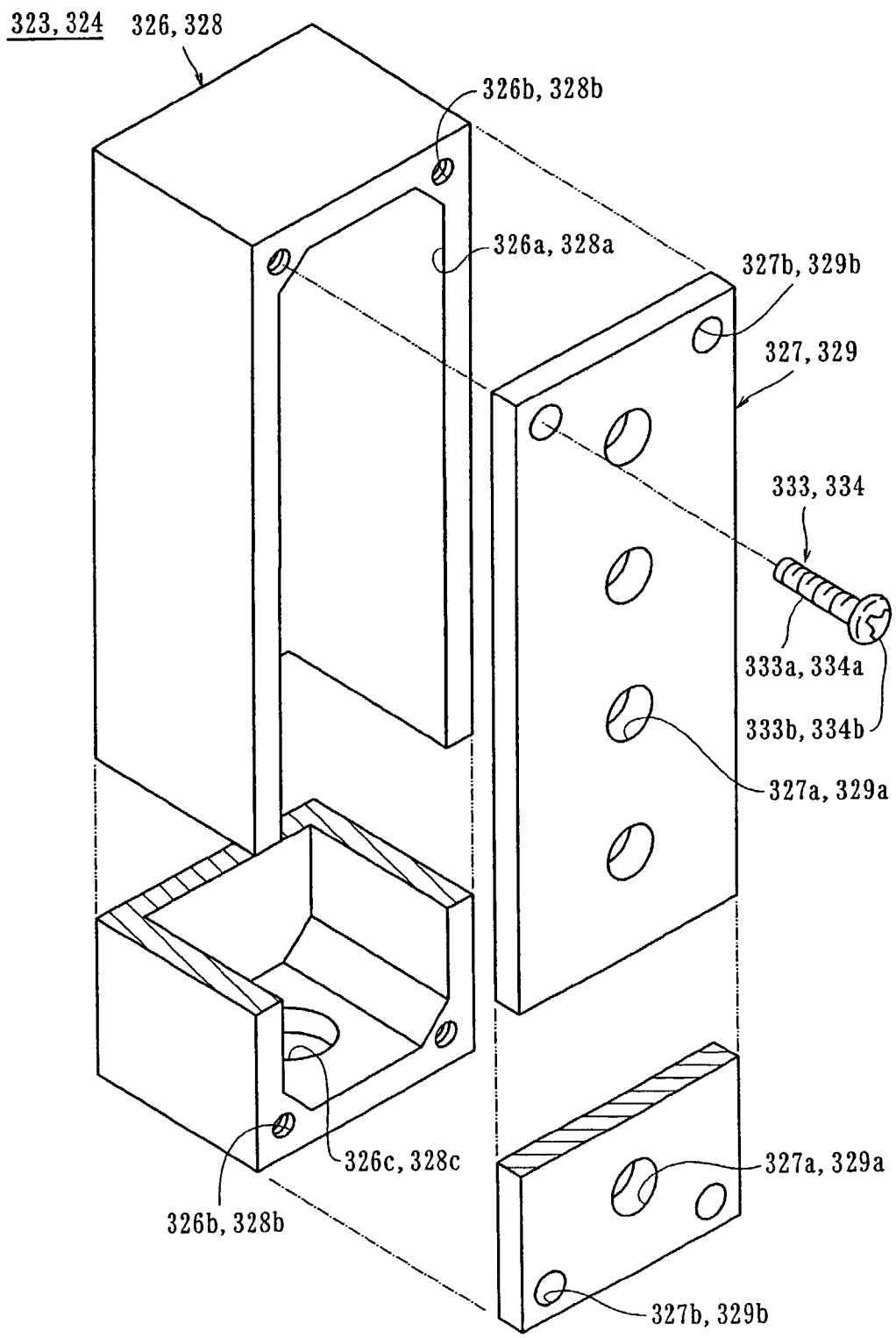
FIG. 17 is an exploded perspective view of a first example of a fuel distributor and an air distributor of the fuel cell module.

An end plate air passage 321 (end plate oxidant passage) for introducing air from an outer peripheral surface of the air end plate 316 and discharging it from a surface of the air end plate 316 opposed to the air electrode current collecting body 314 is formed in the air end plate 316, and an end plate fuel passage 322 for introducing fuel gas from an outer peripheral surface of the fuel end plate 317 and discharging it from a surface of the fuel end plate 317 opposed to the fuel electrode current collecting body 313 is formed in the fuel end plate 317. The end plate air passage 321 includes an end plate air inlet 321a facing the outer peripheral surface of the air end plate 316, an end plate air outlet 321b facing the center of the air electrode current collecting body 314 adjacent to the air end plate 316, and an end plate air continuous hole 321c provided in the air end plate 316 and connecting the end plate air inlet 321a and the end plate air outlet 321b. The end plate fuel passage 322 includes an end plate fuel inlet 322a facing the outer peripheral surface of the fuel end plate 317, an end plate fuel outlet 322b facing the center of the fuel electrode current collecting body 313 adjacent to the air end plate 317, and an end plate fuel continuous hole 322c provided in the fuel end plate 322 and connecting the end plate fuel inlet 322a and the end plate fuel outlet 322b. On the other hand, as shown in FIGS. 16 and 17, at the sides of the laminated power generating cells 311, a fuel distributor 323 and an air distributor 324 (oxidant distributor) extend in the laminating direction and are provided in the vicinities of the power generating cells 311. The fuel distributor 323 is constructed so as to supply the fuel gas to the separator fuel passage 318 and the end plate fuel passage 322 through a fuel short pipe 331, and the air distributor 324 is constructed so as to supply the air to the separator air passage 319 and the end plate air passage 321 through an air short pipe 332 (oxidant short pipe).

The fuel distributor 323 is electrically insulated from the fuel short pipe 331. That is, in this embodiment, the fuel distributor 323 is provided with a fuel distributor main body 326 which includes a fuel side opening 326a in a surface opposed to the power generating cell 311 and is made of metal material to have a box shape, and a single plate-like fuel cover 327 closing fuel side opening 326a and made of ceramic having electric insulation. The fuel distributor main body 326 includes four fuel side tapped holes 326b which are formed at peripheral edge corner portions of the fuel side opening 326a and to which fuel side fixing screws 333 can be fitted, and a fuel permeation hole 326c which is formed at the center of a bottom wall and to which a fuel supply pipe 336 is connected. The fuel cover 327 includes fuel connection holes 327a which are provided to be opposed to the separator fuel inlet 318a and the end plate fuel inlet 322a and to which the fuel short pipes 331 can be inserted, and four fuel side open holes 327b which are formed at the peripheral corner portions to be opposed to the four fuel side tapped holes 326b and in which the fuel side fixing screws 333 can be inserted.

Incidentally, a hole diameter of the fuel side open hole 327b is formed to be larger than a screw portion 333a of the furl side fixing screw 333 so as to absorb a difference in the amount of deformation due to thermal expansion and thermal contraction between the fuel distributor main body 326 and the fuel cover 327. The air distributor 324 is electrically insulated from the air short pipe 332. That is, in this embodiment, the air distributor 324 is provided with an air distributor main body 328 (oxidant distributor main body) which includes an air side opening 328a (oxidant side opening) in a surface opposed to the power generating cell 311 and is made of metal material to have a box shape, and a single plate-like air cover 329 oxidant cover) closing the air side opening 328a and made of ceramic having electrical insulation. The air distributor main body 328 includes four air side tapped holes 328b (oxidant side tapped holes) which are formed at peripheral edge corner portions of the air side opening 328a and to which air side fixing screws 334 can be fitted, and an air permeation hole 328c which is formed at the center of a bottom wall and to which an air supply pipe 337 is connected.

Besides, the air cover 329 includes air connection holes 329*a* (oxidant connection holes) which are provided to face the separator air inlet 319*a* and the end plate air inlet 321*a* and in which the air short pipe 332 can be inserted, and four air side open holes 329*b* (oxidant side open hole) which are formed at the peripheral corner portions to face the four air side tapped holes 328*b* and in which air side fixing screws 334 can be loosely inserted. Incidentally, a hole diameter of the air side open hole 329*b* is formed to be larger than a screw portion 334*a* of the air side fixing screw 334 so as to absorb a difference in the amount of deformation due to thermal expansion and thermal contraction between the air distributor main body 328 and the fuel cover 329. The fuel distributor main body 326, the air distributor main body 328, the fuel short pipe 331, and the air short pipe 332 are made of metal material such as stainless steel, nickel base alloy or chromium base alloy, and the fuel cover 327 and the air cover 329 are made of ceramic (electrical insulation material) such as alumina or magnesia. Incidentally, the fuel distributor main body and the air distributor main body may also be made of ceramic (electrical insulation material). It is preferable that a not-shown fuel seal member is interposed between the peripheral edge of the fuel side opening 326*a* of the fuel distributor main body 326 and the peripheral edge of the fuel cover 327, and a not-shown air seal member (oxidant seal member) is interposed between the peripheral edge of the air side opening 328*a* of the air distributor main body 328 and the peripheral edge of the air cover 329. As the seal member, alumina short fiber assembly (alumina wool), silica sol hardened after application, and the like can be enumerated.

Besides, it is preferable that a washer (not shown) made of relatively soft alumina short fiber assembly (alumina wool) is used for the fuel side fixing screw 333 and the air side fixing screw 334. By using the washer, since the head portion 333*b* of the fuel side fixing screw 333 is not in direct contact with the fuel cover 327 but is in contact through the soft washer, the brittle fuel cover 327 is not damaged, and further, since the head portion 334*b* of the air side fixing screw 334 is not in direct contact with the air cover 329 but is in contact through the soft washer, the brittle air cover 329 is not damaged. Further, it is preferable that a connection portion between the fuel short pipe 331 and the separator fuel inlet 318*a*, a connection portion between the fuel short pipe 331 and the end plate fuel inlet 322*a*, a connection portion between the fuel short pipe 331 and the fuel connection hole 327*a*, a connection portion between the air short pipe 332 and the separator air inlet 319*a*, a connection portion between the air short pipe 332 and the end plate air inlet 321*a*, and a connection portion between the air short pipe 332 and the air connection hole 329*a* are respectively sealed with a sealing member of glass, cement or the like.

Figure 18:
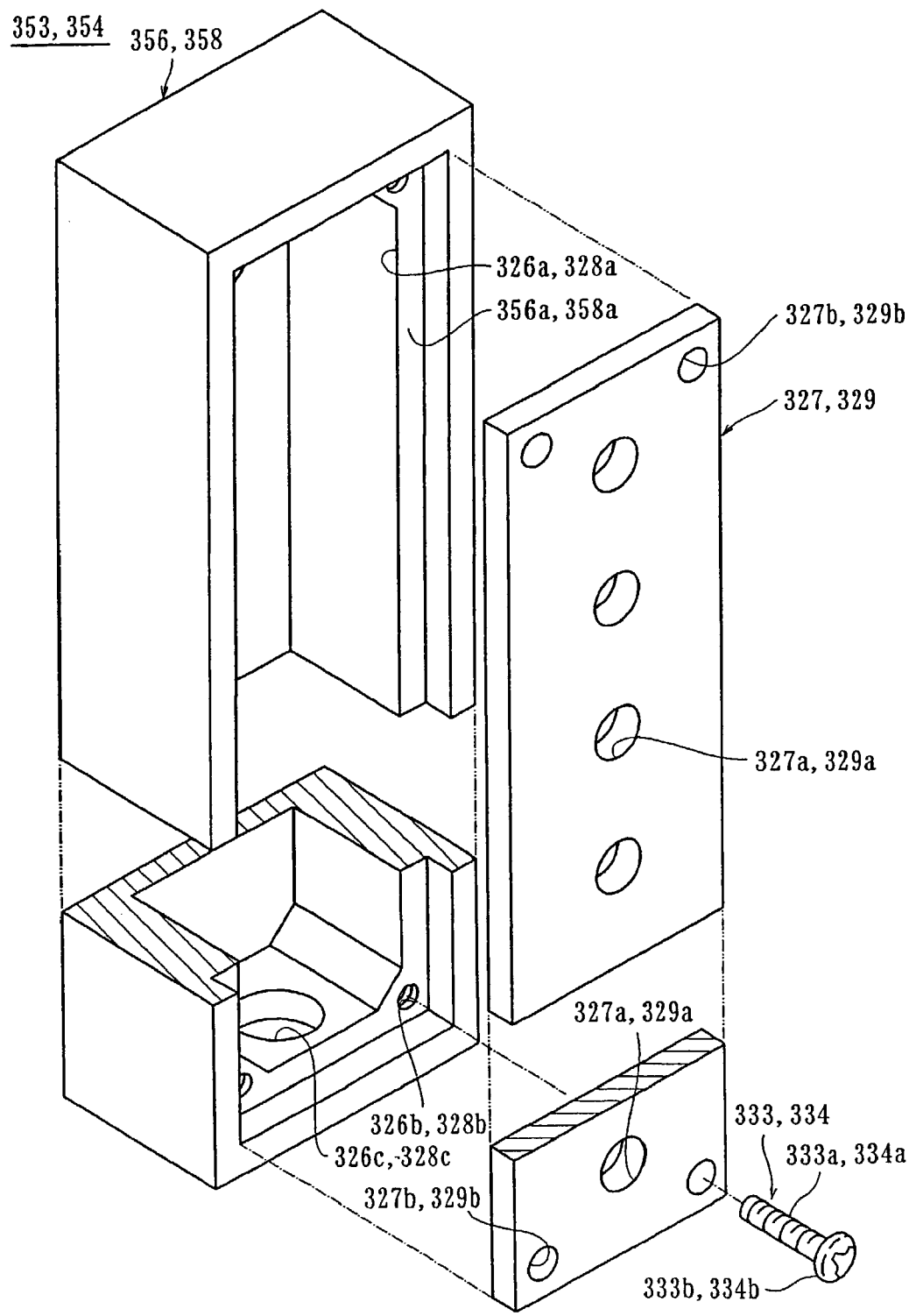
FIG. 18 is an exploded perspective view showing a second example of a fuel distributor and an air distributor.

The operation of the fuel cell 310 constructed as stated above will be described. When the fuel gas (H, CO, etc.) is introduced through the fuel supply pipe 336 into the fuel distributor 323, the fuel gas passes through the fuel short pipe 331 and the separator fuel passage 318 to be discharged from the separator fuel outlet 318*b* toward the center of the fuel electrode current collecting body 313, and passes through the fuel short pipe 331 and the end plate fuel passage 322 to be discharged from the end plate fuel outlet 322*b* toward the center of the fuel electrode current collecting body 313. By this, the fuel gas passes through the pores in the fuel electrode current collecting body 313 and is quickly supplied to the center of the fuel electrode layer 311*b*, and further flows from the center of the fuel electrode layer 311*b* toward the outer peripheral edge. When the air is introduced through the air supply pipe 337 into the air distributor 324 at the same time, the air passes through the air short pipe 332 and the separator air passage 319 to be discharged from the separator air outlet 319*b* toward the center of the air electrode current collecting body 314, and passes through the air short pipe 332 and the end plate air passage 321 to be discharged from the end plate air outlet 321*b* toward the center of the air electrode current collecting body 314. By this, the air passes through the pores in the air electrode current collecting body 314 and is quickly supplied to the center of the air electrode layer 311*c*, and further flows from the center of the air electrode layer 311*c* to the outer peripheral edge. A mechanism in which the fuel gas and oxygen in the air are moved and reacted in the fuel electrode layer 311*b*, the air electrode layer 311*c*, and the solid electrolyte layer 311*a* to generate electric power, is similar to the first embodiment of the invention. On the other hand, since each of the fuel short pipes 331 made of metal material is connected to the fuel cover 327 separators 312, the air end plate 316, and the fuel end plate 317 is not electrically short-circuited by the fuel distributor 323 or the air distributor 324. That is, the respective separators 312 and the fuel end plate 317 connected to the fuel distributor 323 through the fuel short pipes 331 are respectively electrically insulated, and the respective made of electrical insulation material, each of the separators 312 and the air end plate 316 connected to the air distributor 324 through the air short pipes 332 are respectively electrically insulated. Besides, the above electrical insulation can be secured in such a relatively simple structure that the fuel side opening 326*a* of the fuel distributor main body 326 made of metal material is closed with the fuel cover 327 made of electrical insulation material, and the air side opening 328*a* of the air distributor main body 328 made of metal material is closed with the air cover 329 made of electrical insulation material. When the power generation operation of the fuel cell 310 is performed at 500° C. or higher, the power generation efficiency is improved. Thus, by the repetition of start and stop of the power generation operation, a heat cycle from room temperature to 500° C. or higher is exerted on the fuel cell 310. Especially, the fuel cover 327 made of ceramic having a low thermal expansion coefficient is fixed to the fuel distributor main body 326 made of metal having a large thermal expansion coefficient by the fuel side fixing screw 333, and the air cover 329 made of ceramic having a low thermal expansion coefficient is fixed to the air distributor main body 328 made of metal having a large thermal expansion coefficient by the air side fixing screw 334, so that a large force is apt to be exerted on the periphery of the fuel side fixing screw 333 of the fuel cover 327, and the periphery of the air side fixing screw 334 of the air cover 329. However, the hole diameter of the fuel side open hole 327*b* in which the screw portion 333*a* of the fuel side fixing screw 333 is loosely inserted, is formed to be a size larger than the screw portion 333*a*, and the hole diameter of the air side open hole 329*b* in which the screw portion 334*a* of the air side fixing screw 334 is loosely inserted, is formed to be a size larger than the screw portion 334*a*, a difference in the amount of deformation due to thermal expansion and thermal contraction between the fuel distributor main body 326 and the fuel cover 327, and a difference in the amount of deformation due to thermal expansion and thermal contraction between the air distributor main body 328 and the air cover 329 can be respectively absorbed by the relatively large gaps formed between the open holes 327*b* and 329*b* and the screw portions 333*a* and 334*a*. As a result, a large force is not exerted on the fuel cover 326 and the air cover 329, and the fuel cover 327 and the air cover 329 are not damaged. FIG. 18 shows a second example of a fuel distributor and an air distributor of the invention. In FIG. 18, the same symbols as those of FIG. 17 designate the same parts. In this second embodiment, a fuel side step portion 356a capable of receiving a fuel cover 327 is formed in a fuel side opening 326a of a fuel distributor main body 356 of a fuel distributor 353, and an air side step portion 358a capable of receiving an air cover 329 is formed in an air side opening 328a of an air distributor main body 358 of an air distributor 354. It is preferable that a not-shown fuel seal member is interposed between a peripheral edge of the fuel side opening 326a of the fuel distributor main body 356 and a peripheral edge of the fuel cover 327, and a not-shown air seal member (oxidant seal member) is interposed between a peripheral edge of the air side opening 328a of the air distributor main body 358 and a peripheral edge of the air cover 329. As the seal member, a seal member made of glass or cement, alumina short fiber assembly (alumina wool), or silica sol hardened after application can be enumerated. The structure other than the above is the same as the first embodiment shown in FIG. 17. In the fuel cell constructed as stated above, when the fuel cover 327 is received at the fuel side step portion 356a of the fuel distributor main body 356, not only the back peripheral edge of the fuel cover 327, but also the side of the fuel cover 327 comes in contact with the fuel distributor main body 356, so that the seal effect of the fuel gas in the fuel distributor 353 becomes high, and when the seal member made of glass is filled between the fuel cover 327 and the fuel distributor main body 356, the seal effect of the fuel gas in the fuel distributor 353 becomes further high. Besides, when the air cover 329 is received at the air side step portion 358a of the air distributor main body 358, not only the back peripheral edge of the air cover 329, but also the side of the air cover 329 comes in contact with the air distributor main body 358, so that the seal effect of the air in the air distributor 354 becomes high, and when the seal member made of glass is filled between the air cover 327 and the air distributor main body 356, the seal effect in the air distributor 354 becomes further high. Since the operation other than the above is substantially the same as the operation of the first embodiment, a repetitive description is omitted.

Figure 19:
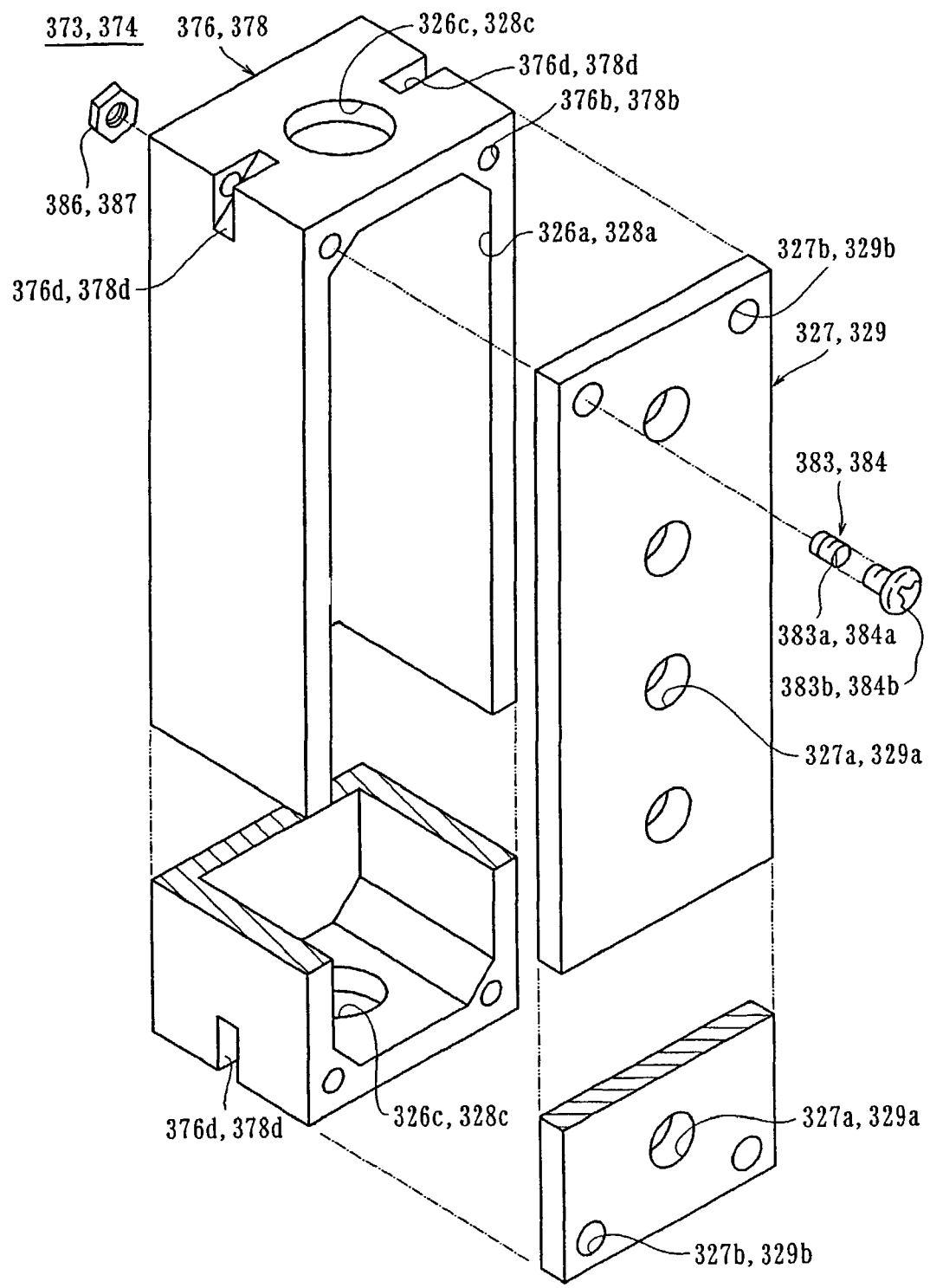
FIG. 19 is an exploded perspective view showing a third example of a fuel distributor and an air distributor.

Incidentally, when the fuel cover is received at the fuel side step portion of the fuel distributor main body and the seal member made of glass or cement is filled between the fuel cover and the fuel distributor main body, since this seal member has not only a seal function but also a bonding function, a fuel fixing screw may not be used. Besides, when the air cover is received at the air side step portion of the air distributor main body and the air seal member (oxidant seal member) made of glass or cement is filled between the air cover and the air distributor main body, since this seal member has not only a seal function but also a bonding function, an air fixing screw may not be used. FIG. 19 shows a third example of a fuel distributor and an air distributor of the invention. In FIG. 19, the same symbols as those of FIG. 17 designate the same parts. In this third embodiment, a fuel side through hole 376b is formed in a fuel distributor main body 376, and a fuel side open hole 327b is formed in a fuel cover 327, and further, a fuel side fixing screw 383 inserted through the fuel side open hole 327b and the fuel side through hole 376b is fitted to a fuel side nut 386 so that the fuel cover 327 is fixed to the fuel distributor main body 376. Besides, an air side through hole 378b (oxidant—through hole) is formed in an air distributor main body 378, and an air side open hole 329b (oxidant side open hole) is formed in an air cover 329, and further, an air side fixing screw 384 inserted through the air side open hole 329b and the air side through hole 378b is fitted to an air side nut 387 (oxidant side nut) so that the air cover 329 is fixed to the air distributor main body 378. A hole diameter of the fuel side open hole 327b or the fuel side through hole 376b is formed to be larger than a screw portion 383a of the fuel side fixing screw 383 so as to absorb a difference in the amount of deformation due to thermal expansion and thermal contraction between the fuel distributor main body 376 and the fuel cover 327, and a hole diameter of the air side open hole 329b or the air side through hole 378b is formed to be larger than a screw portion 384a of the air side fixing screw 384 so as to absorb a difference in the amount of deformation due to thermal expansion and thermal contraction between the air distributor main body 378 and the air cover 329. Besides, a fuel side slit 376d for exposing the screw portion 383a of the fuel side fixing screw 383 inserted through the fuel side through hole 376b is formed at each of four corner portions of the fuel distributor main body 376, and an air side slit 378d (oxidant side slit) for exposing the screw portion 384a of the air side fixing screw 384 inserted through the air side through hole 378b is formed at four corner portions of the air distributor main body 378.

Further, a pair of fuel permeation holes 326c and 326c for introducing the fuel gas into the fuel distributor main body 376 are formed in an upper and a lower surfaces of the fuel distributor main body 376, and a pair of air permeation holes 328c and 328c for introducing the air into the air distributor main body 378 are formed in an upper and a lower surfaces of the air distributor main body 378. Incidentally, symbols 383b and 384b designate head portions of the fuel side fixing screw and the air side fixing screw. The structure other than the above is the same as the first example shown in FIG. 17.

In the fuel cell constructed as stated above, a heat cycle of a large temperature difference is exerted on the fuel distributor 373 by the repetition of start and stop of a power generation operation, since the hole diameter of the fuel side open hole 327b or the fuel side through hole 376b is formed to be larger than the outer diameter of the screw portion 383a of the fuel side fixing screw 383, a difference in the amount of deformation due to thermal expansion and thermal contraction between the fuel distributor main body 376 and the fuel cover 327 can be absorbed by the relatively large gap formed between the fuel side open hole 327b or the fuel side through hole 376b and the fuel side fixing screw 383. Besides, although a heat cycle of a large temperature difference is exerted on the air distributor 374 similarly to the above, since the hole diameter of the air side open hole 329b or the air side through hole 378b is formed to be larger than the outer diameter of the screw portion 384a of the air side fixing screw 384, a difference in the amount of deformation due to thermal expansion and thermal contraction between the air distributor main body 378 and the air cover 329 can be absorbed by the relatively large gap formed between the air side open hole 329b or the air side through hole 378b and the fuel side fixing screw 384. As a result, a large force is not exerted on the fuel cover 327 and the air cover 329, and the fuel cover 327 and the air cover 329 are not damaged. When the fuel cell and the fuel distributor 373 are made to have a high temperature to activate the fuel cell in a state where the fuel cover 327 is fixed to the fuel distributor main body 376 by using the fuel side fixing screw 383 and the fuel side nut 386, there is a case where the fuel side fixing screw 383 and the fuel side nut 386 are burned, and the fuel side nut 386 is not removed from the fuel side fixing screw 383. At this time, the fuel side fixing screw 383 is easily drawn from the fuel side through hole 376b and the fuel side open hole 327b by cutting the screw portion 383a of the fuel side fixing screw 383 exposed from the fuel side slit 376d by use of a metalworking saw or the like. As a result, since the fuel cover 327 can be removed from the fuel distributor main body 376, an inspection of the fuel distributor 373 can be easily made.

On the other hand, when the fuel cell and the air distributor 374 are made to have a high temperature to activate the fuel cell in a state where the air cover 329 is fixed to the air distributor main body 378 by using the air side fixing screw 384 and the air side nut 387, there is a case where the air side fixing screw 384 and the air side nut 387 are burned, and the air side nut 387 is not removed from the air side fixing screw 384. At this time, the air side fixing screw 384 is easily drawn from the air side through hole 378b and the air side open hole 329b by cutting the air side fixing screw 384 exposed from the air side slit 378d by use of a metalworking saw or the like. As a result, since the air cover 329 can be removed from the air distributor main body 378, an inspection of the air distributor 374 can be easily made.

Figure 20:
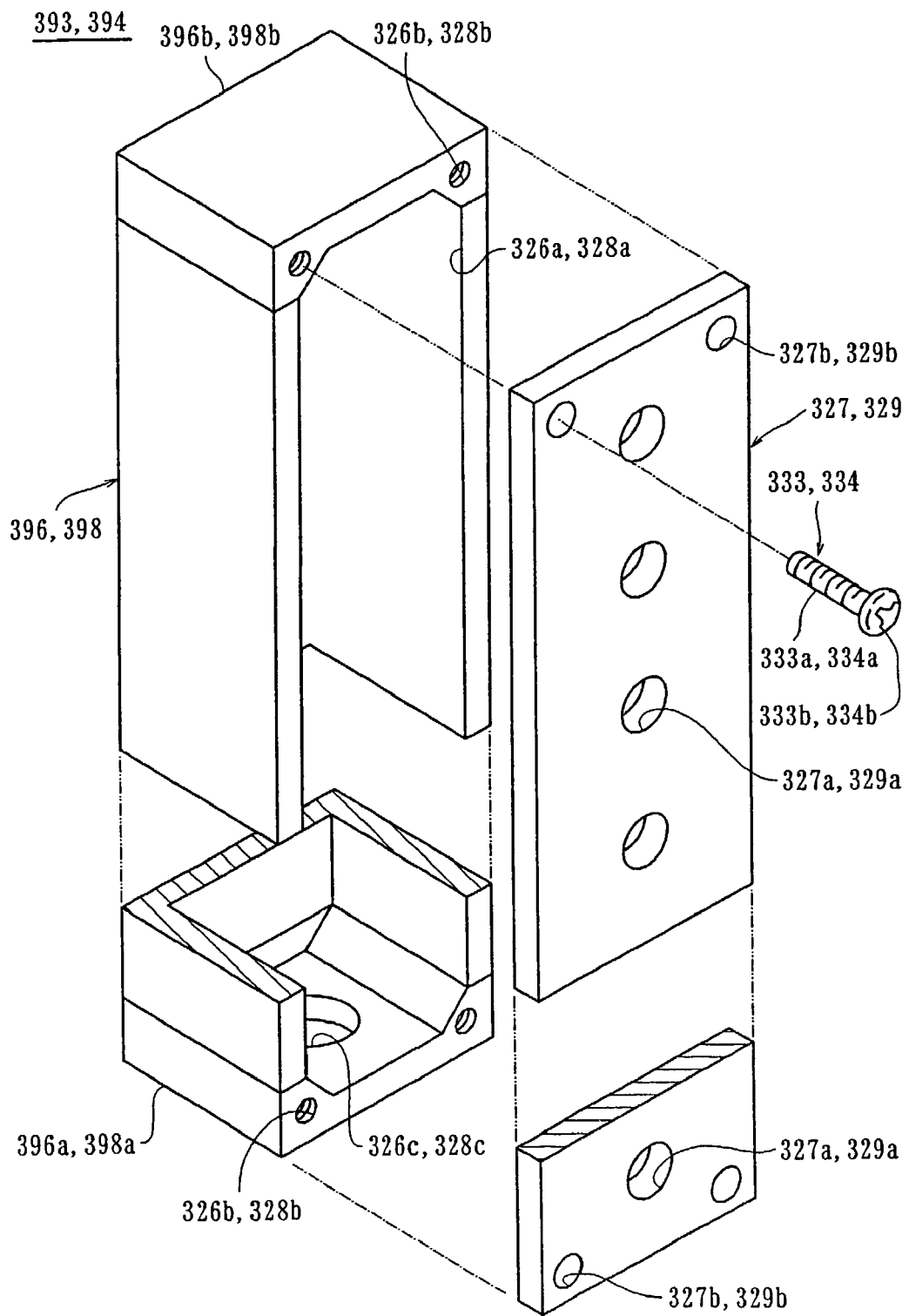
FIG. 20 is an exploded perspective view showing a fourth example of a fuel distributor and an air distributor.

Further, since the pair of fuel permeation holes 326c and 326c are formed in the upper and the lower surfaces of the fuel distributor main body 376, and the pair of air permeation holes 328c and 328c are formed in the upper and the lower surfaces of the air distributor main body 378, substantially the same flow of fuel gas can be supplied to the separator fuel passage of each of the separators, and substantially the same flow of air can be supplied to the separator air passage of each of the separators. FIG. 20 shows a fourth example of a fuel distributor and an air distributor of the invention. In FIG. 20, the same symbols as those of FIG. 17 designate the same parts. In the fourth embodiment, a fuel distributor main body 396 is formed into a rectangular tube shape with one open side and both open ends, and an air distributor main body 398 is formed into a rectangular tube shape with one open side and both open ends. A pair of fuel side closing plates 396a and 396b are fixed to both ends of the fuel distributor main body 396 by welding or bolts, and a pair of air side closing plates 398a and 398b are fixed to both ends of the air distributor main body 398 by welding or bolts. The structure other than the above is the same as the first embodiment. In the distributor structure of the fuel cell constructed as stated above, in the case where the fuel distributor main body 396 and the air distributor main body 398 are molded, a large metal mold becomes unnecessary, and further, when a material shaped into the rectangular tube by extrusion molding or drawing molding is used, it is not necessary to shave a block, and therefore, the manufacturing cost of the distributor main bodies 396 and 398 can be reduced. Since the operation other than the above is substantially the same as the first embodiment, a repetitive description is omitted.

Incidentally, although the air is used as the oxidant gas in the first to fourth embodiments of the distributor structure of the invention, oxygen or other oxidant gases may be used. Besides, although the solid oxide fuel cell in which the power generating cell is constituted by the solid electrolyte layer sandwiched between the fuel electrode layer and the air electrode layer (oxidant electrode layer), is cited as the fuel cell in the first to fourth embodiments, a solid polymer fuel cell, a carbonate molten salt fuel cell, a phosphoric acid fuel cell or the like may be used.

INDUSTRIAL APPLICABILITY

As described above, according to the fuel cell module of the first embodiment of the invention,
(1) the power generation efficiency can be improved by causing the whole surface of the power generating cell contributing to power generation to contribute to power generation;
(2) the power generating cell can be uniformly heated and cooled by making the oxidant gas substantially uniformly flow over the whole of the oxidant electrode layer;
(3) the power generation efficiency can be improved by controlling the flow of the fuel gas in the fuel electrode layer, and by increasing the collision frequency between the fuel gas and the fuel electrode layer;
(4) the heating-up time at the time of start-up can be shortened, and damage of the power generating cell can be prevented by uniform temperature rising;
(5) the power generation efficiency can be improved by supplying the fuel gas and the oxidant gas having temperature suitable for power generation;
(6) one of or both of the fuel electrode current collecting body and the oxidant electrode current collecting body are joined to the separator made of stainless steel, the oxidant end plate and the fuel end plate, and the joined portions are welded to prevent oxidation of the joined portions, so that it is possible to obtain long electrical continuity between the separator, the oxidant end plate or the fuel end plate and the fuel electrode current collecting body or the oxidant electrode current collecting body; and
(7) the number of parts can be reduced and miniaturization can be realized by eliminating a reformer for reforming the fuel gas.

Further, according to the gas supply structure to the fuel cell of the second and third embodiments of the invention, the thickness of the separator can be made thin, and consequently, the fuel cell can be made compact in the laminating direction of the power generating cells, and further, the fuel gas and the oxidant gas supplied to the power generating cells can be controlled to have the optimum temperature for power generation. Furthermore, according to the distributor structure of the fuel cell module of the fourth embodiment of the invention, the whole surface of the power generating cell can be made to contribute to power generation, and the respective separators connected to the distributor can be electrically insulated by the relatively simple structure, and further, the increase of the assembling operation time of the fuel short pipe and the oxidant short pipe can be prevented, and damage of the fuel short pipe and the like due to thermal stress can be prevented.

The invention claimed is:
1. A fuel cell module comprising a fuel cell having a plurality of power generating cells, each of the power generating cells including an electrolyte layer having first and second surfaces, a fuel electrode layer disposed on the first surface of the electrolyte layer, and an oxidant electrode layer disposed on the second surface of the electrolyte layer, wherein the power generating cells are laminated together and the number of power generating cells is (n+1), where n is a positive integer, the fuel cell module further comprising:
  a total of n plate-shaped separators, each of which is made of a conductive material and is interposed between the fuel electrode layer of an ith (i=1, 2, . . . , n) power generating cell and the oxidant electrode layer of an (i+1)th power generating cell adjacent to the fuel electrode layer;
  a porous fuel electrode current collecting body having conductivity and being interposed between the fuel electrode layer of the ith power generating cell and a jth (j=1, 2, . . . , n) one of the n separators;
  a porous oxidant electrode current collecting body having conductivity and being interposed between the oxidant electrode layer of the (i+1)th power generating cell and the jth one of the n separators;
  a single plate-shaped oxidant end plate made of conductive material and being laminated on the oxidant electrode layer of the first power generating cell through the oxidant electrode current collecting body; and a single plate-shaped fuel end plate made of conductive material and being laminated on the fuel electrode layer of the (n+1)th power generating cell through the fuel electrode current collecting body, wherein:

each of the n separators includes an enclosed fuel supply passage provided within an interior of the separator so as to extend between a fuel inlet port provided in an outer peripheral surface of the separator and an outlet port facing the fuel electrode current collecting body and provided at or near a central part of the separator, wherein fuel gas is introduced to the fuel inlet port and discharged from the outlet port toward the fuel electrode current collecting body, and each of the n separators includes oxidant supply passages for introducing oxidant gas from an outer peripheral surface of the separator and discharging it from a surface of the separator to the oxidant electrode current collecting body, whereby fuel gas that is discharged from each separator passes through the inside of the fuel electrode current collecting body to the fuel electrode layer of the power generating cell, and oxidant gas discharged from each separator passes through the inside of the oxidant electrode current collecting body to the oxidant electrode layer of the power generating cell;

the single oxidant end plate includes oxidant supply passages for discharging the oxidant gas from a surface of the oxidant end plate to the oxidant electrode current collecting body;

the single fuel end plate includes a fuel supply passage for discharging the fuel gas from or near a central part of the fuel end plate toward the fuel electrode current collecting body;

a fuel distributor is disposed near the fuel cell for supplying, via a fuel short pipe, the fuel gas to the fuel supply passages;

an oxidant distributor is disposed near the fuel cell for supplying, via an oxidant short pipe, the oxidant gas to the oxidant supply passages;

a pair of electrode terminals are electrically connected to the oxidant end plate and the fuel end plate, respectively; and wherein the oxidant supply passages of each of the n separators and the single oxidant end plate includes an enclosed base passage provided within the interior of the separator or the single oxidant end plate extending in a first direction orthogonal to a thickness direction of the separator or the single oxidant end plate, an enclosed first air passage provided within the interior of the separator or the single oxidant end plate so as to extend in a second direction orthogonal to the first direction and orthogonal to the thickness direction, the first air passage extending from a first end to a second end, wherein the first and second ends of the first air passage are closed, and wherein the base passage extends from an air inlet port provided at the outer peripheral surface of the separator or at an outer peripheral surface of the single oxidant end plate to the enclosed first air passage so as to be in communication with the enclosed first air passage, a plurality of enclosed second air passages provided within the interior of the separator or the single oxidant end plate, each of the second air passages extending in the first direction from a first end to a second end so as to intersect the first air passage, wherein the first and second ends of each of the second air passages are closed, and a plurality of holes for discharging the oxidant gas to the oxidant electrode current collecting body, the holes being arranged throughout a surface of the separator or the single oxidant end plate so as to be in communication with the second air passages and so as to discharge the oxidant gas substantially uniformly to the whole surface of the oxidant electrode current collecting body from the surface of the separator or the single oxidant end plate in a shower-like manner.

2. A fuel cell module as set forth in claim 1, wherein plural insertion holes are formed in one of or not less than two of the n separators, the single oxidant end plate and the single fuel end plate so that they do not communicate with any of the fuel supply passages and the oxidant supply passages, and one of or both of a first heater and a temperature sensor are inserted in the plural insertion holes.

3. A fuel cell module as set forth in claim 1, wherein plural weight lightening holes are formed in one of or not less than two of the n separators, the single oxidant end plate, and the single fuel end plate so that they do not communicate with any of the fuel supply passages and the oxidant supply passages.

4. A fuel cell module as set forth in claim 1, wherein plural slits spirally extending from the center of each of the separators and the fuel end plate are formed on surfaces of the n separators opposed to the fuel electrode current collecting bodies and on a surface of the fuel end plate opposed to the fuel electrode current collecting body.

5. A fuel cell module as set forth in claim 1, wherein:

the fuel short pipe is inserted in the fuel distributor through a fuel insulating pipe, a gap of an insertion portion between the fuel insulating pipe and the fuel short pipe is sealed with a fuel sealing member having electrical insulation, the oxidant short pipe is inserted in the oxidant distributor through an oxidant insulating pipe, and a gap of an insertion portion between the oxidant insulating pipe and the oxidant short pipe is sealed with an oxidant sealing member having electrical insulation.

6. A fuel cell module as set forth in claim 1, further comprising:

a fuel preheating pipe for supplying the fuel gas to the fuel distributor, the fuel preheating pipe being wound around an outer peripheral surface of the fuel cell; and an oxidant preheating pipe for supplying the oxidant gas to the oxidant distributor, the oxidant preheating pipe being wound around the outer peripheral surface of the fuel cell, wherein the fuel cell, together with the fuel preheating pipe and the oxidant preheating pipe, is received in an inner case; and an exhaust pipe for guiding the fuel gas and the oxidant gas exhausted from the power generating cell to the outside of the inner case, the exhaust pipe being connected to the inner case.

7. A fuel cell module as set forth in claim 6, wherein the oxidant preheating pipe is connected to or near a central part of the oxidant distributor in a longitudinal direction.

8. A fuel cell module as set forth in claim 6, further comprising a second heater wound around the outer peripheral surface of the fuel cell and received in the inner case.

9. A fuel cell module as set forth in claim 6, wherein at least an inner surface of the inner case is subjected to silver plating, silver plating through nickel first plating, or platinum plating.

10. A fuel cell module as set forth in claim 6, wherein the outer surface of the inner case is coated with a heat insulating material, the fuel preheating pipe, the oxidant preheating pipe and the exhaust pipe are wound around the outer peripheral surface of the inner case, and the inner case, together with the fuel preheating pipe, the oxidant preheating pipe, and the exhaust pipe, is received in an outer case.

11. A fuel cell module as set forth in claim 10, wherein at least an inner surface of the outer case is subjected to silver plating, silver plating through nickel first plating, or platinum plating.

12. A fuel cell module as set forth in claim 6, wherein reforming particles are filled in the fuel preheating pipe at such a density that the fuel gas can flow.

13. A fuel cell module as set forth in claim 12, wherein the reforming particle is made of one kind of or not less than two kinds of elements or oxides selected from a group consisting of Ni, NiO, $Al_2O_3$, $SiO_2$, MgO, CaO, $Fe_2O_3$, $Fe_3O_4$, $V_2O_3$, $NiAl_2O_4$, $ZrO_2$, SiC, $Cr_2O_3$, $ThO_2$, $Ce_2O_3$, $B_2O_3$, $MnO_2$, ZnO, Cu, BaO, and $TiO_2$.

14. A fuel cell module as set forth in 1, wherein the fuel electrode current collecting body is made of stainless steel, nickel base alloy or chromium base alloy, subjected to nickel plating, silver plating, silver plating through nickel first plating, or copper plating, or nickel, silver, silver alloy, platinum, or copper, the n separators and the single fuel end plate are made of stainless steel, nickel base alloy or chromium base alloy, and the fuel electrode current collecting bodies are joined to the respective separators and the fuel end plate.

15. A fuel cell module as set forth in claim 1, wherein:
the oxidant electrode current collecting body is made of stainless steel, nickel base alloy or chromium base alloy, subjected to silver plating, silver plating through nickel first plating, or platinum plating, or silver, silver alloy, or platinum;
the n separators and the single oxidant end plate are made of one of stainless steel, nickel base alloy, or chromium base alloy; and
the oxidant electrode current collecting bodies are respectively joined to the respective separators and the oxidant end plate.

16. A fuel cell module as set forth in claim 1, wherein one surface or not less than two surfaces of the n separators, the single oxidant end plate and the single fuel end plate are subjected to nickel plating, chromium plating, silver plating, or silver plating through nickel first plating.

17. A fuel cell module as set forth in claim 1, wherein one of or not less than two of the fuel preheating pipe, the fuel distributor, the fuel short pipe, the oxidant preheating pipe, the oxidant distributor, and the oxidant short pipe are made of stainless steel, nickel base alloy or chromium base alloy, and inner surfaces are subjected to silver plating, silver plating through nickel first plating, or platinum plating.

18. A fuel cell module as set forth in claim 1, wherein one of or not less than two of the fuel preheating pipe, the fuel distributor, the fuel short pipe, the oxidant preheating pipe, the oxidant distributor, and the oxidant short pipe are made of stainless steel, nickel base alloy or chromium base alloy, and outer surfaces are subjected to silver plating, silver plating through nickel first plating, or platinum plating.

19. A fuel cell module as set forth in claim 1, wherein the inner surfaces of the fuel preheating pipe, the fuel distributor, and the fuel short pipe are plated with nickel.

20. A fuel cell module as set forth in claim 10, wherein a tip of a water supply pipe is inserted in an upper part of the fuel preheating pipe, and a spray or a pump is connected to a base end of the water supply pipe.

21. A fuel cell module as set forth in claim 6, wherein a water separator is connected to a lowermost end of the fuel preheating pipe.

22. A fuel cell module as set forth in claim 10, wherein exhaust pipes for guiding the fuel gas and the oxidant gas exhausted from the power generating cell to the outside of the inner case and the outer case are connected to a water vapor turbine.

23. A fuel cell module as set forth in claim 1, wherein the holes are arranged along horizontal and vertical directions in the surface of the separator or the single oxidant end plate, and wherein a concentration of the holes decreases as a distance from a center of the surface of the separator or the single oxidant end plate increases along the surface of the separator or the single oxidant end plate, such that the oxidant gas flows uniformly to a whole surface of the power generating cell.

* * * * *